United States Patent
Ogawa

(10) Patent No.: US 6,226,253 B1
(45) Date of Patent: May 1, 2001

(54) DISK DRIVING APPARATUS

(75) Inventor: Hisashi Ogawa, Musashino (JP)

(73) Assignee: Shinwa Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/292,404

(22) Filed: Apr. 14, 1999

(30) Foreign Application Priority Data

Apr. 15, 1998 (JP) .................................................. 10-104328

(51) Int. Cl.$^7$ .................................................. G11B 17/04
(52) U.S. Cl. .......................................................... 369/178
(58) Field of Search ............................... 369/178, 34, 36, 369/77.1–77.2, 75.1–75.2

(56) References Cited

U.S. PATENT DOCUMENTS

| 5,907,531 | * | 5/1999 | Fujita et al. | 369/178 |
| 6,009,068 | * | 12/1999 | Silverstein | 369/178 |
| 6,014,353 | * | 1/2000 | Kong et al. | 369/178 |

FOREIGN PATENT DOCUMENTS 2620146   3/1997   (JP) .

* cited by examiner

Primary Examiner—Allen T. Cao
(74) Attorney, Agent, or Firm—Dennis G. LaPointe; Louise A. Foutch; Mason & Assoc., P.A.

(57) ABSTRACT

A disk driving apparatus which functions as a disk changer and employs a slot-in method that calls for inserting or removing a disk CD through a disk insertion/removal opening 315,316. The disk driving apparatus has reduced dimensions and is more convenient to insert or remove disks into or from the apparatus. Included is a plurality of trays 11 which are adapted to support a removable disk CD thereon and are arranged one above another in such a manner as to be capable of moving up and down. A single-tray disk insertion/removal opening 315 is provided and dedicated to one of the trays 11, i.e. the uppermost tray or the bottommost tray. A common disk insertion/removal opening 316 is provided and adapted to be shared by all the other trays than said tray 11 located at the top or the bottom. A carrier mechanism is provided and adapted to move any desired tray 11 to a loading position that corresponds to the common disk insertion/removal opening 316. The apparatus also includes loading mechanisms 319,320, each of which serves to carry a disk CD back and forth between the corresponding disk insertion/removal opening 315,316 and the tray 11 that is targeted for said disk.

36 Claims, 27 Drawing Sheets

# DISK DRIVING APPARATUS

BACKGROUND OF THE INVENTION

The present invention relates to a disk driving apparatus which employs a slot-in method and is adapted to selectively drive one of disks set in a plurality of trays.

Examples of conventional disks on which information can be recorded include a compact disk (hereinafter referred to as CD), and examples of disk driving apparatus for playing CDs include a CD changer adapted to play a CD or CDs selected from among a plurality of CDs.

An example of CD changers of this type is shown in Japanese Patent Publication No. 2620146, which concerns a CD changer having a main body that houses a plurality of trays arranged one above another and a driving arm adapted to rotate around a vertically extending arm shaft so as to approach or move away from the trays, said arm shaft disposed at a side of the trays. The driving arm is provided with a turn table for chucking the CD, a driving unit for rotating the turn table and a head unit for performing playback of a CD.

The CD changer described above selects a tray or a CD and performs playback by moving the trays to form a driving space under the selected tray, while raising or lowering the driving arm to such a height that the arm can enter the driving space, and then inserting the driving arm into the driving space to play the CD within the space defined by the selected tray.

As for the manner of setting or removing CDs into or from the CD drive apparatus, various methods are employed conventionally, including a method which calls for moving a tray back and forth from the front of the main body of the CD drive apparatus, and what is generally called a slot-in method, which calls for inserting or removing a CD into or from a disk insertion/removal opening formed at the front of the main body of the CD drive apparatus. Compared with the method that calls for moving the tray back and forth, the slot-in method has benefits in that it is capable of simplifying the structure of the tray itself as well as the mechanism to move the tray back and forth.

However, in cases where the slot-in method is employed for a CD changer, a plurality of disk insertion/removal openings in a number corresponding to the number of trays have to be arranged on the front side of the body of the changer. Furthermore, in case of an in-vehicle CD changer (a CD changer to be mounted in a vehicle) or the like, the entire front side has to be open instead of providing a disk insertion/removal opening for each tray, because the dimension along which the trays are stacked is limited. For this reason, a front door has to be provided to open or close the front of the body of the changer. In case of an in-vehicle CD changer, however, it is not always possible to provide a sufficient space to open the front door.

OBJECT AND SUMMARY OF THE INVENTION

Therefore, an object of the present invention is to provide a disk driving apparatus which has functions as a disk changer, has reduced dimensions and is easier to conduct insertion and removal of disks while employing a slot-in method that calls for inserting or removing a disk through a disk insertion/removal opening.

A disk driving apparatus according to the invention includes a plurality of vertically arranged trays, each of which permits a disk to be set thereon and removed therefrom and is capable of moving up and down; a disk insertion/removal opening shared by said plurality of trays and adapted to permit a disk to be inserted or removed therethrough; a carrier mechanism for moving a desired tray to a loading position corresponding to said disk insertion/removal opening; and a loading mechanism for carrying a disk back and forth between the disk insertion/removal opening and the tray located at said loading position. In other words, a disk driving apparatus according to the invention is a disk driving apparatus having the function of a disk changer and employing a slot-in method which calls for inserting or removing a disk into or from the apparatus through a disk insertion/removal opening, wherein the apparatus includes a disk insertion/removal opening shared by a plurality of trays so that a disk can be inserted into or removed from a desired tray through said common disk insertion/removal opening. As the common disk insertion/removal opening is shared by a plurality of trays, the dimensions of the apparatus can be reduce. As a disk can be inserted or removed at the same position, the apparatus is more convenient to operate.

In another embodiment, the invention includes a plurality of vertically arranged trays, each of which permits a disk to be set thereon and removed therefrom and is capable of moving up and down; a single-tray disk insertion/removal opening dedicated to one of said trays which is located at either one of the two vertical ends of the combination of the trays; a common disk insertion/removal opening to be shared by all the other trays than said tray that is located at either one of the two vertical ends of the combination of the trays; a carrier mechanism for moving a desired tray to a loading position corresponding to said common disk insertion/removal opening; a single-tray loading mechanism for carrying a disk back and forth between said single-tray disk insertion/removal opening and the tray corresponding to the single-tray loading mechanism; and a common loading mechanism for carrying a disk back and forth between the common disk insertion/removal opening and the tray located at said loading position. In other words, the disk driving apparatus has the function of a disk changer and employs a slot-in method which calls for inserting or removing a disk into or from the apparatus through a disk insertion/removal opening, wherein the apparatus includes a common disk insertion/removal opening shared by a plurality of trays so that a disk can be inserted into or removed from a desired tray through said common disk insertion/removal opening. As the common disk insertion/removal opening is shared by a plurality of trays, the dimensions of the apparatus can be reduce. As a disk can be inserted or removed at the same position, the apparatus is more convenient to operate. As the apparatus also has a single-tray disk insertion/removal opening dedicated to one of the trays, the apparatus is capable of handling a single disk easily. Thus, the invention offers a disk driving apparatus that is more convenient to operate by providing a common disk insertion/removal opening and a single-tray disk insertion/removal opening which are arranged along the height of the trays 11.

A disk driving apparatus according to another embodiment is a disk driving apparatus as described above, wherein the disk driving apparatus is also provided with a single loading motor; a loading transmission mechanism for transmitting the driving force from the loading motor to the loading mechanisms, thereby permitting the loading mechanisms to perform conveying action; a single-tray ejecting means and a common ejecting means, each of which is adapted to deliver and receive a disk to and from the corresponding loading mechanism, said disk set on a tray corresponding to the ejecting arm in question; and a selective transmission mechanism adapted to selectively transmit the driving force from said loading motor to either the single-tray ejecting means or the common ejecting means, thereby permitting the ejecting means to perform ejecting action. Therefore, a disk driving apparatus according to this embodiment has such an effect that a single loading motor is capable of operating the loading mechanisms and, through the selective transmission mechanism, operating either one of the ejecting arms, i.e. the single-tray ejecting means or the common ejecting means.

A disk driving apparatus according to another embodiment is a disk driving apparatus as described immediately above, wherein the disk driving apparatus is provided with a single-tray shutter and a common shutter, each of which is adapted to close the corresponding disk insertion/removal opening and be opened when a disk is inserted or removed therethrough, and the selective transmission mechanism is adapted to selectively transmit the driving force from said loading motor to either the single-tray shutter or the common shutter, thereby closing or opening the shutter to which the force is transmitted. Therefore, a disk driving apparatus according to this embodiment has such an effect that a single loading motor is capable of operating the loading mechanisms and the ejecting means and also opening or closing either one of the shutters, i.e. the single-tray shutter or the common shutter, all of said operation being conducted through the selective transmission mechanism.

A disk driving apparatus according to again another embodiment is a disk driving apparatus as described in any one of the above described embodiments, wherein each loading mechanism is provided with rotatable rollers, holding members adapted to hold a disk in such a manner that the disk is sandwiched between the holding members and the rollers, and flexible supporting means for elastically supporting the holding members such that the distance between each roller and the corresponding holding member does not exceed the thickness of a disk. Therefore, the invention as claimed in this embodiment permits the thickness of each holding member to be set thinner than the minimum diameter of each roller and is thus capable of providing a disk driving apparatus which is thinner than a conventional apparatus that calls for supporting a disk by sandwiching it only between a pair of rollers compared with a configuration which calls for supporting a disk by sandwiching it only between a pair of roller members.

A disk driving apparatus according to another embodiment is a disk driving apparatus as described in the preceding paragraph, wherein the two rollers that comprise each pair of rollers are spaced apart, respectively to the two lateral sides of the apparatus, and arranged along an imaginary line extending perpendicular to the direction in which a disk is carried by the corresponding loading mechanism, and the holding members that comprise each pair of holding members, too, are spaced apart and arranged along an imaginary line extending perpendicular to the loading direction. Therefore, when a disk supported at the home position on a tray is brought close to the position where the outer edge of the disk is located between the laterally arranged rollers of the corresponding loading mechanism and also between the laterally arranged holding members of the corresponding loading mechanism, the disk may be detached from the rollers and the holding members and permitted to rotate. Thus, compared with a configuration which calls for installing rollers and holding members at the center in addition to the rollers and the holding members disposed at both sides and, therefore, disposing each roller and each holding member at a sufficient distance from the edge of the disk, a disk driving apparatus according to this embodiment is capable of reducing the dimension along which a disk is carried.

A disk driving apparatus according to still another embodiment is a disk driving apparatus as described in any one of the above described embodiments, wherein the disk driving apparatus further includes a holding means for applying constant force to a disk carried by a loading mechanism to a tray so that the disk is directed to the home position on the tray and held there. Therefore, according to the configuration of a disk driving apparatus of this embodiment, the holding means moves a disk to the home position on the target tray and held the disk there.

A disk driving apparatus according to another embodiment is a disk driving apparatus as described in any one of the above described embodiments, wherein the disk driving apparatus further includes a driving arm for driving a disk, and a selector mechanism adapted to select a tray targeted for driving a disk from among the plurality of trays and move the driving arm to a selection position corresponding to the selected tray; and wherein the carrier mechanism is adapted to move the trays, thereby forming a driving space which is located either immediately above or below the tray selected by the selector mechanism and into which the driving arm may be inserted. Thus, according to the configuration of a disk driving apparatus of this embodiment, the carrier mechanism moves a tray to the position intended for loading of a disk and the position intended for driving the disk A disk driving apparatus according to a still further embodiment includes a turn table having a seating portion for receiving a disk thereon, and a boss around which the center hole of the disk on the seating portion is fitted; a chucking device incorporated in the turn table and having chucking members and a biasing means, said chucking members adapted to advance out of the boss so as to chuck a disk and retreat from the boss to release the disk from the chucked state, and the biasing means adapted to apply constant force to the chucking members in such a direction as to advance the chucking members; and a releasing means for applying chuck-releasing force from the outside of the turn table to the chucking device so that the chucking action of the chucking device is stopped against the force applied by the biasing means. Thus, the invention as described herein simplifies the configuration of a disk driving apparatus by eliminating the need of a separate mechanism for holding a disk between the turn table and the holding mechanism.

The above, and other objects, feature and advantages of the present invention will become apparent from the following description read in conjunction with accompanying drawings, in which like reference numerals designate the same element.

BREEF DESCRIPTION OF THE DRAWINGS

Figure 6:
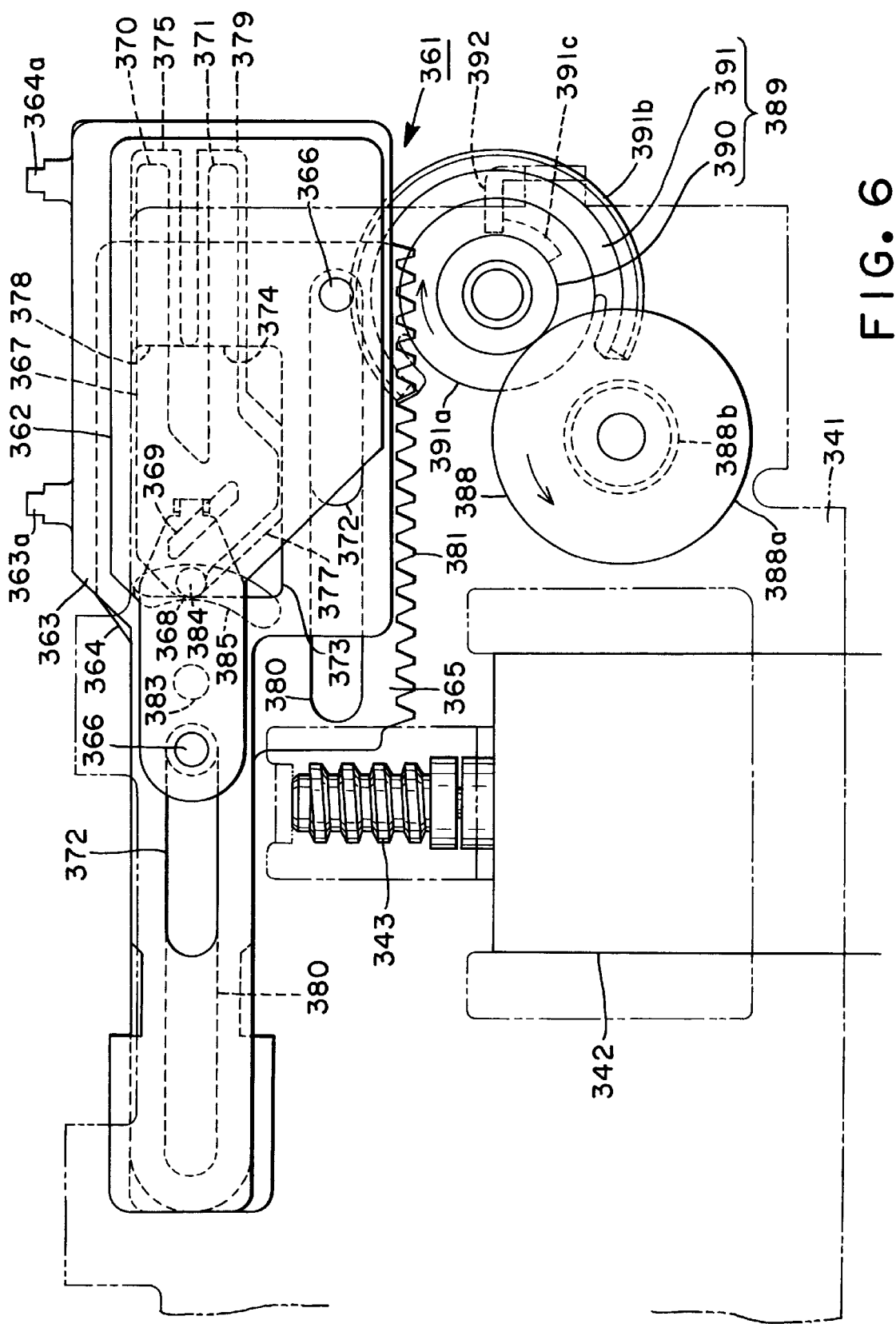
FIG. 6 is an enlarged side view of a part of said disk driving apparatus.

FIG. 8 corresponds to a part of the side view of FIG. 6, wherein (a) is a schematic illustration to explain how a disk is loaded through the common disk insertion/removal opening, and (b) is a schematic illustration to explain how a disk is loaded through the single-tray disk insertion/removal opening.

Figure 9:
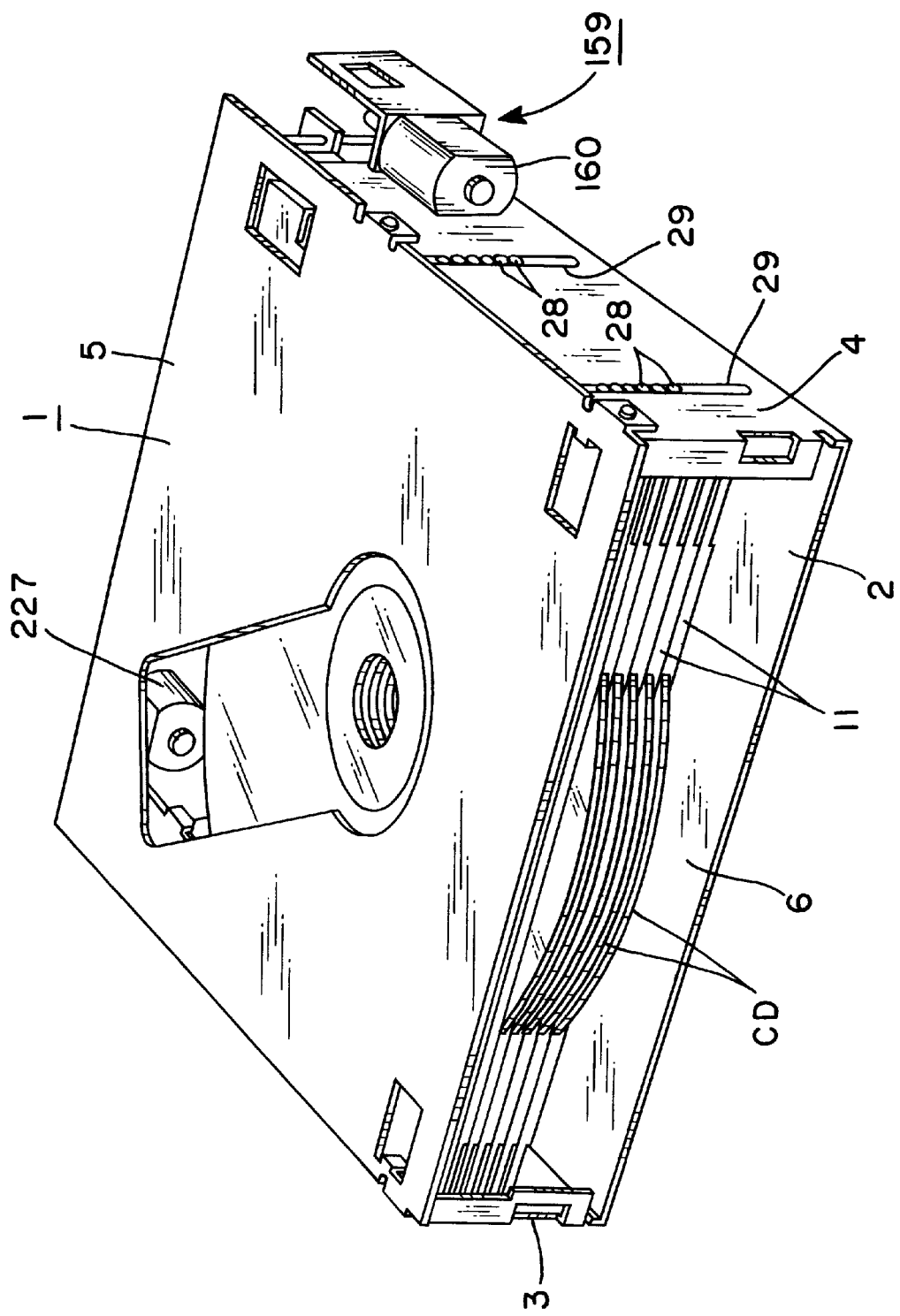

FIG. 9 is a perspective view of said disk driving apparatus.

Figure 10:
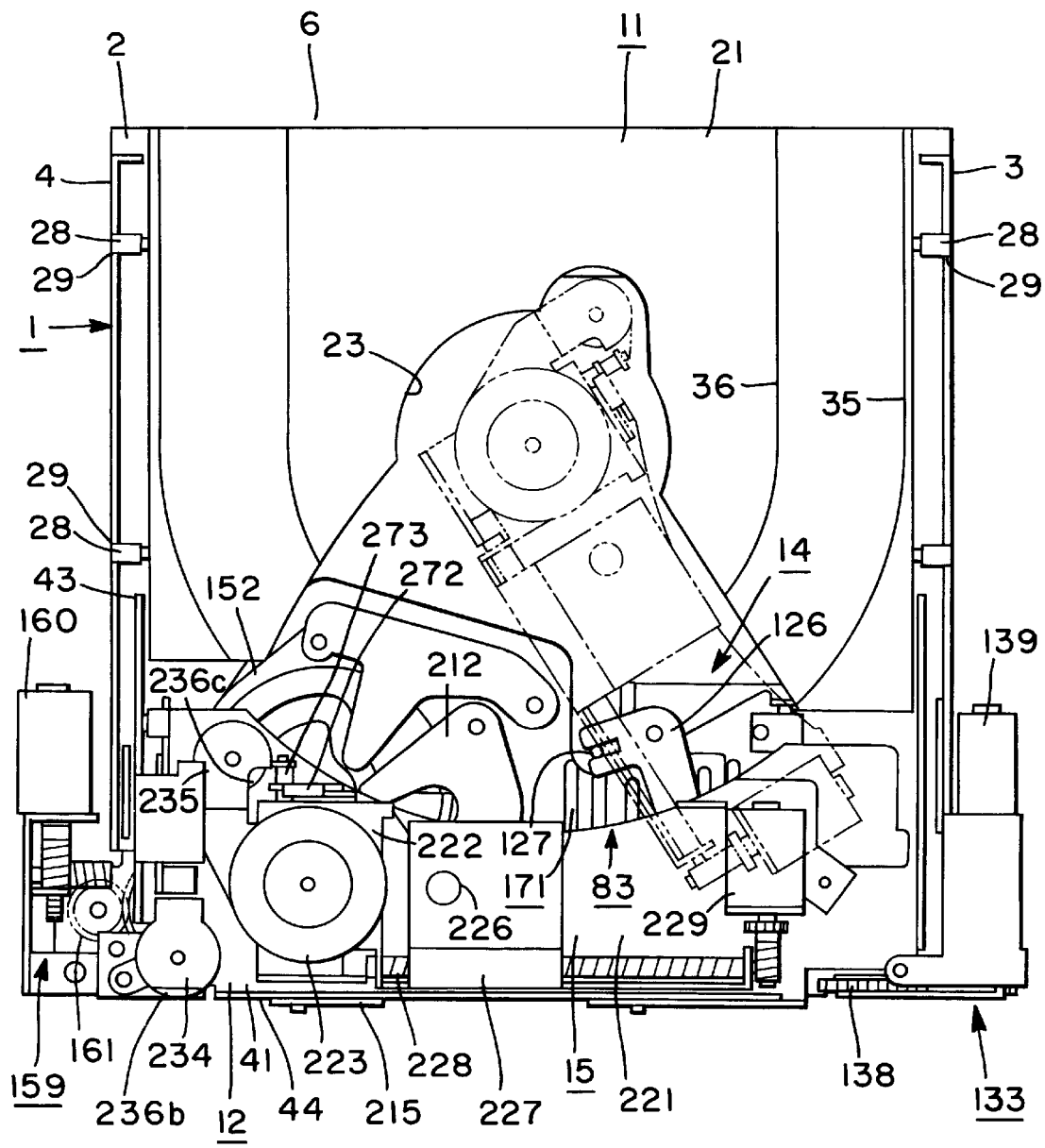

FIG. 10 is a top view of said disk driving apparatus without the top plate.

Figure 11A:
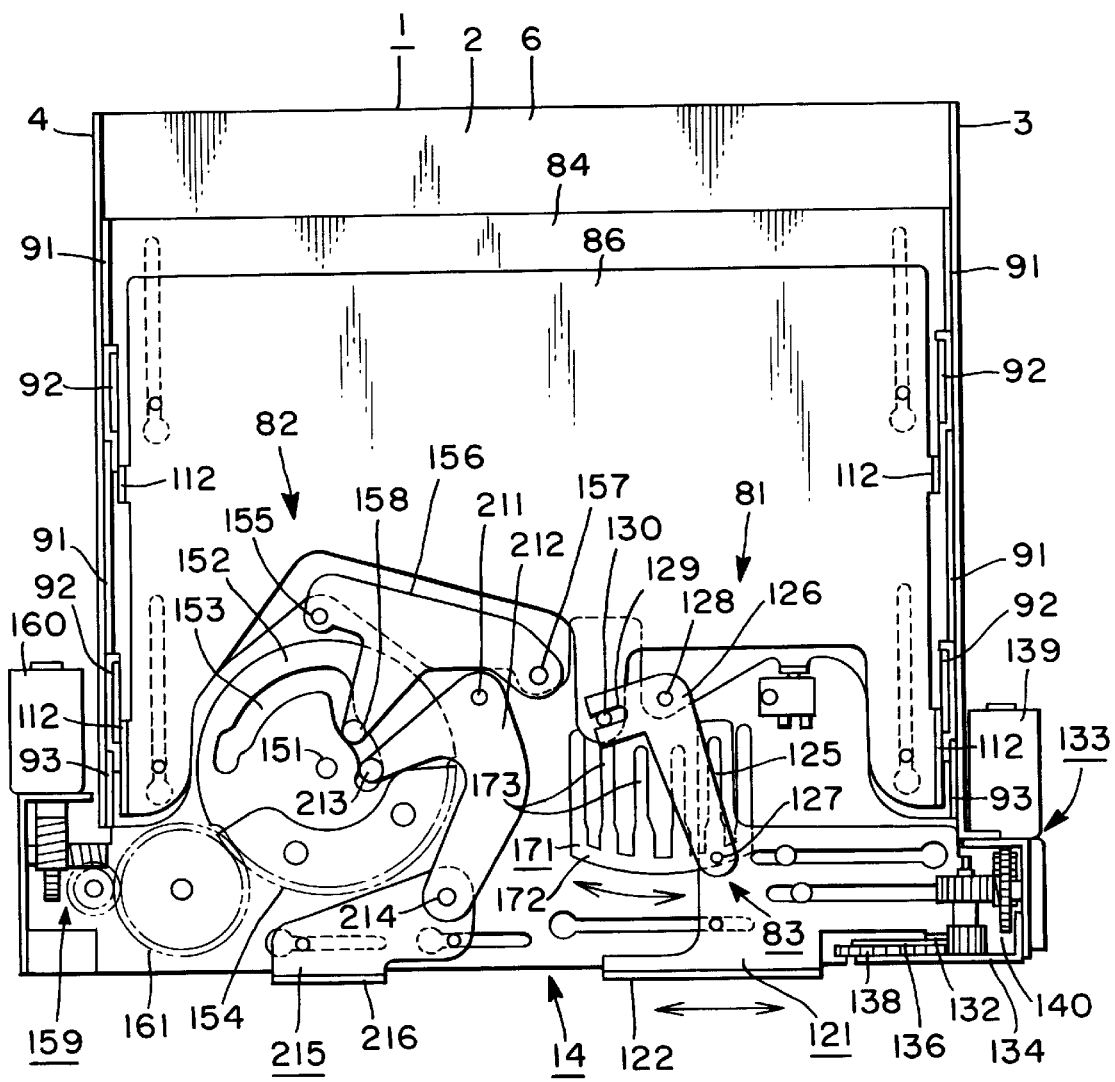

FIGS. 11(a) and (b) respectively represent a top view and a back view of the disk selecting unit in the standby state.

Figure 12:
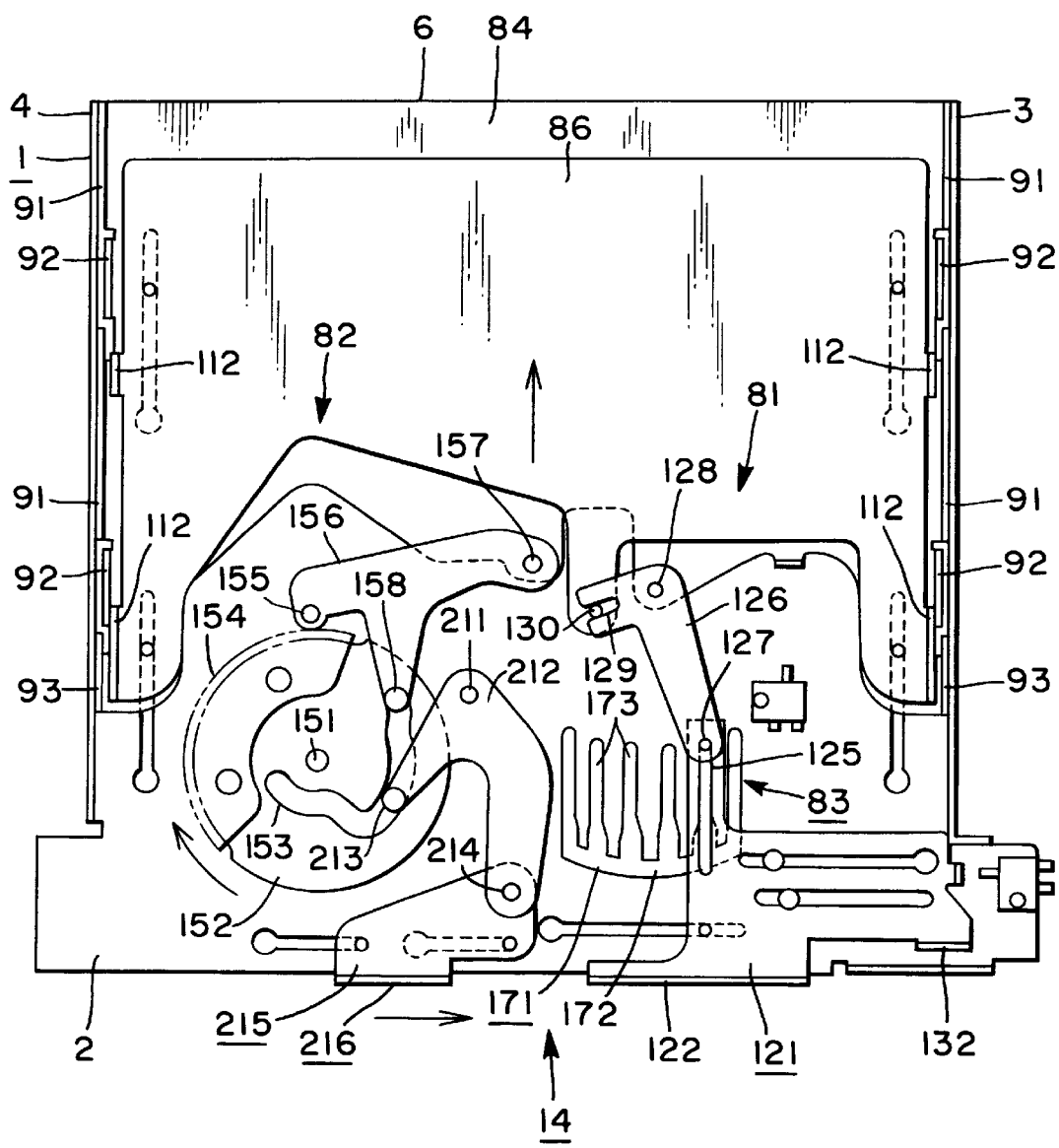

FIG. 12 is a top view of said disk selecting unit.

Figure 13:
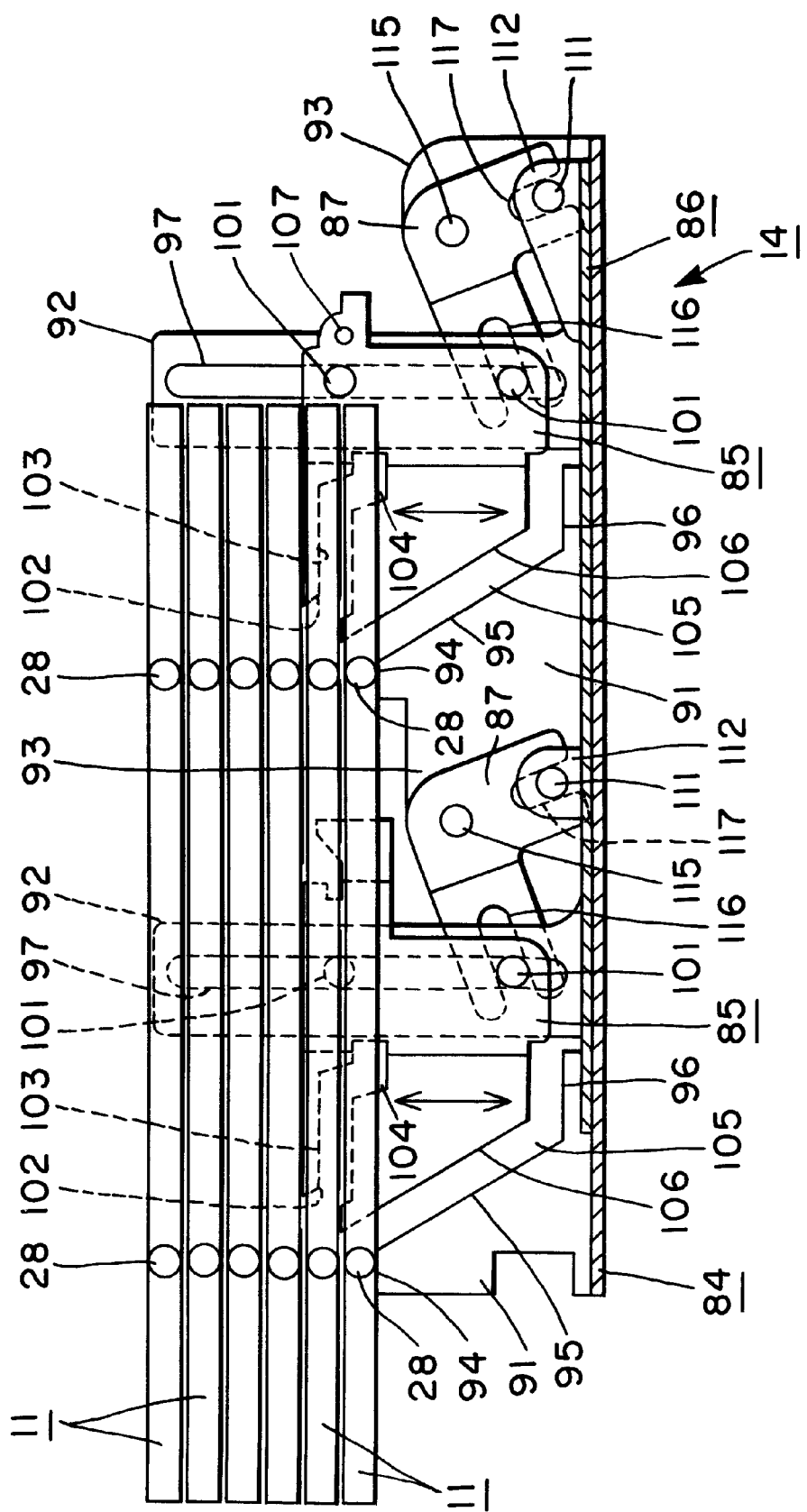

FIG. 13 is a sectional view of the carrier mechanism of said disk selecting unit in the standby state.

Figure 14:
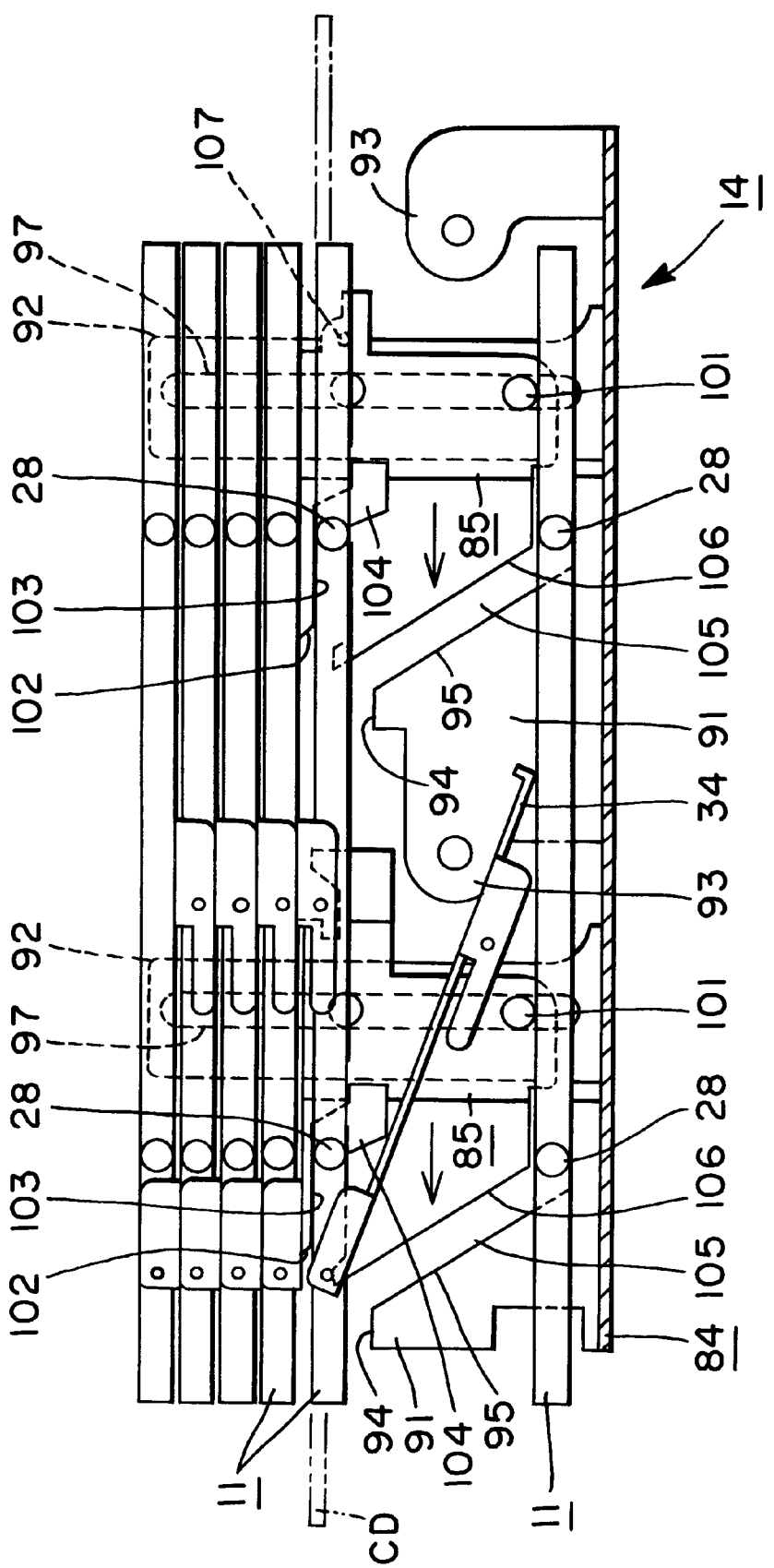

FIG. 14 is a sectional view illustrating how a selected tray is moved by said carrier mechanism of the disk selecting unit.

Figure 15:
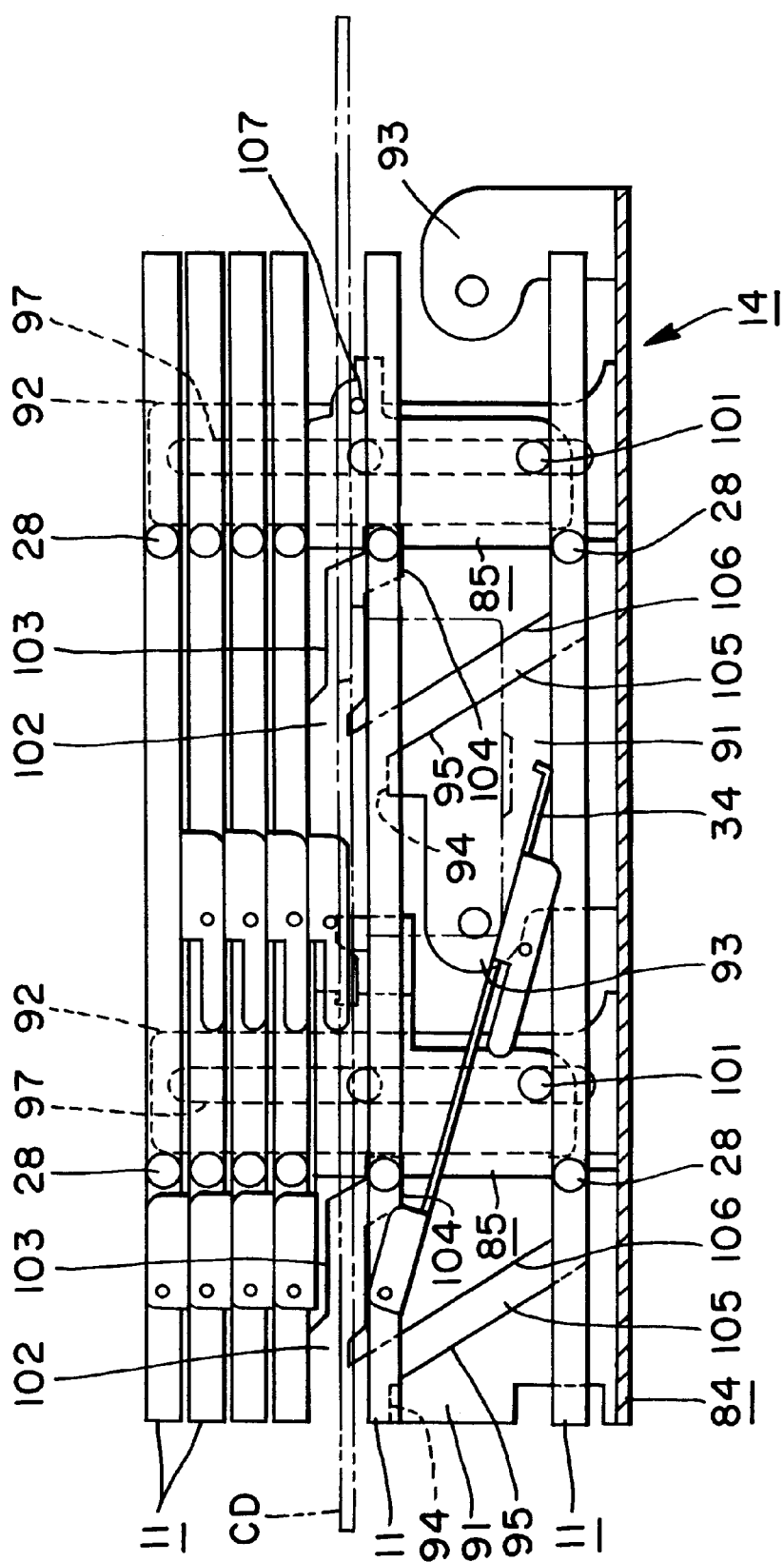

FIG. 15 is a sectional view illustrating the state when by said carrier mechanism of the disk selecting unit has completed transfer of a selected tray.

Figure 16A:
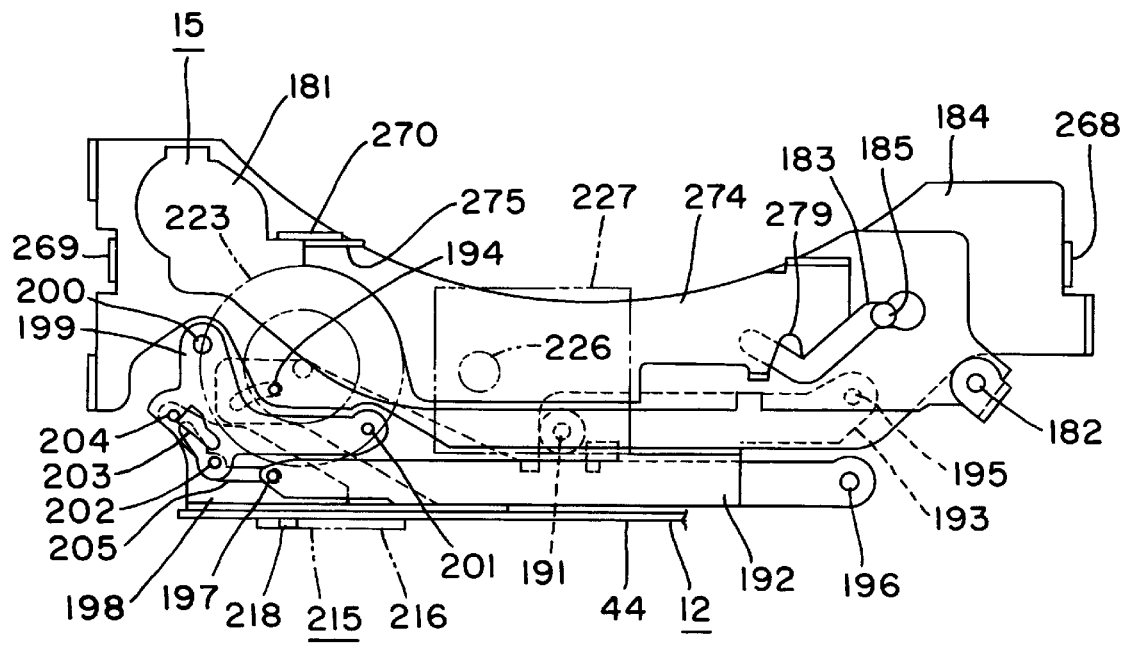

FIGS. 16(a) and (b) respectively represent a top view and a back view of the driving arm unit in the standby state.

Figure 17A:
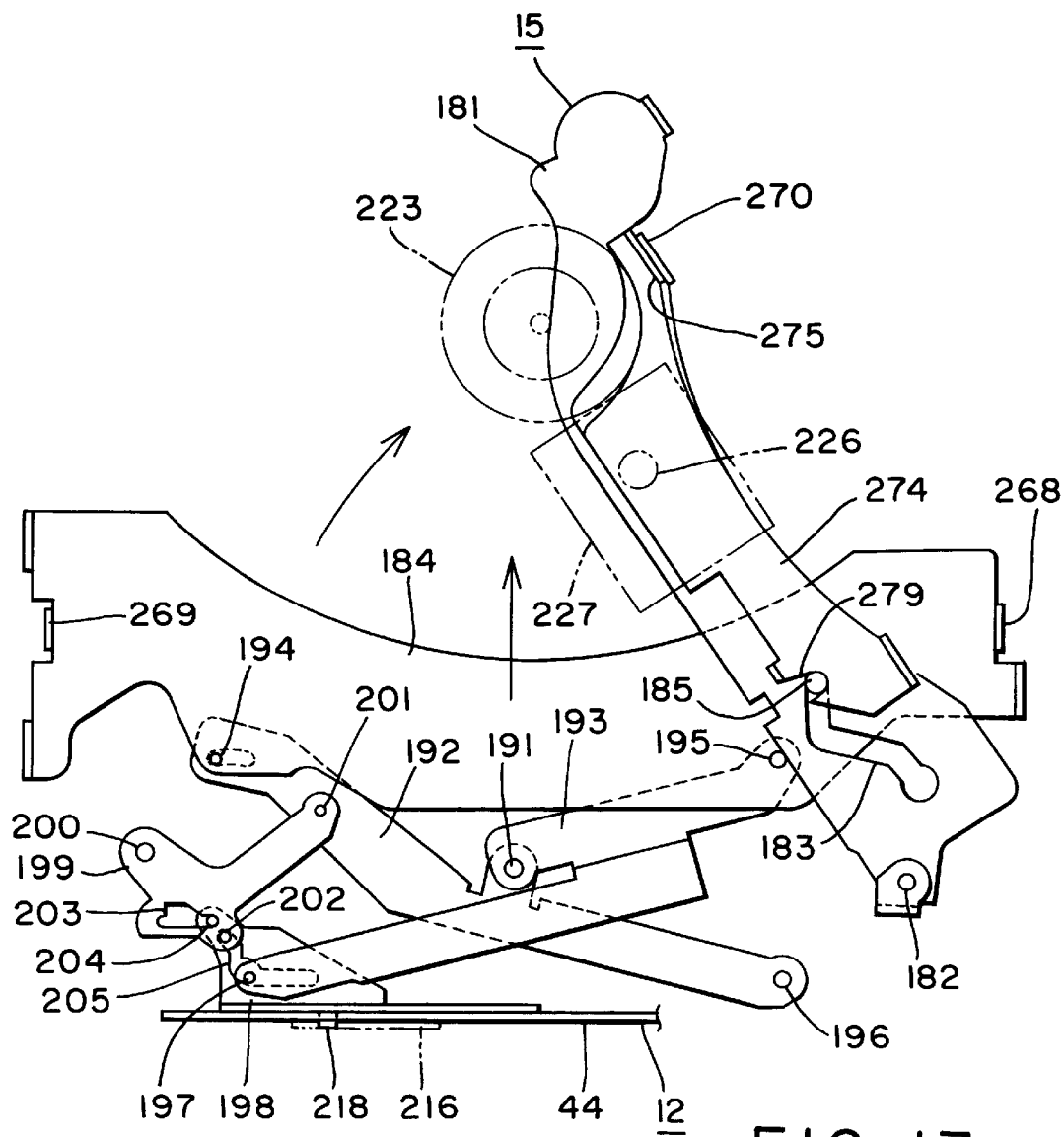

FIGS. 17(a) and (b) respectively represent a top view of the driving arm unit in the playback mode and a back view of a part of the driving arm unit in the playback mode.

Figure 18:
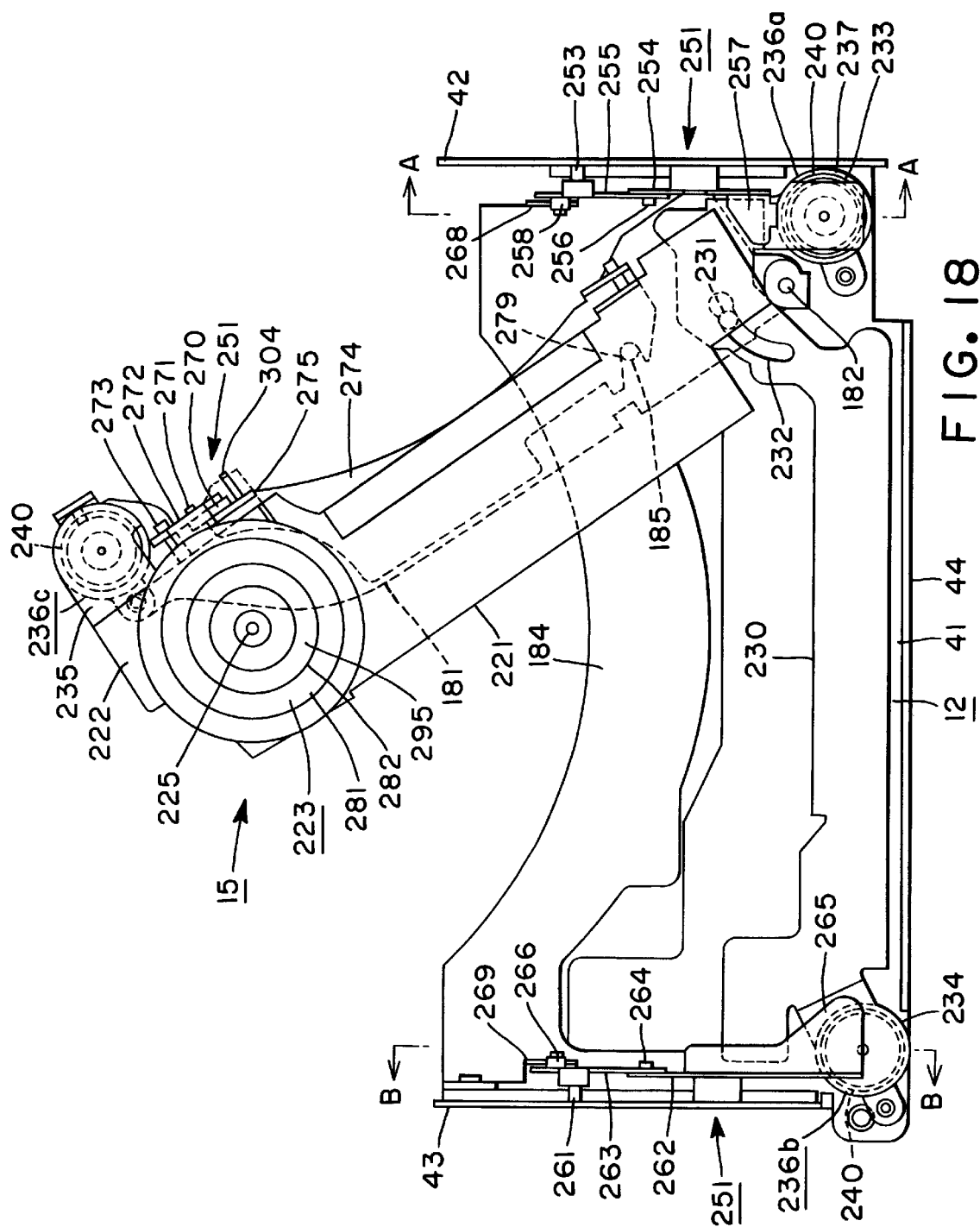

FIG. 18 is a top view of the upper part of the selector plate of said disk driving apparatus.

Figure 19:
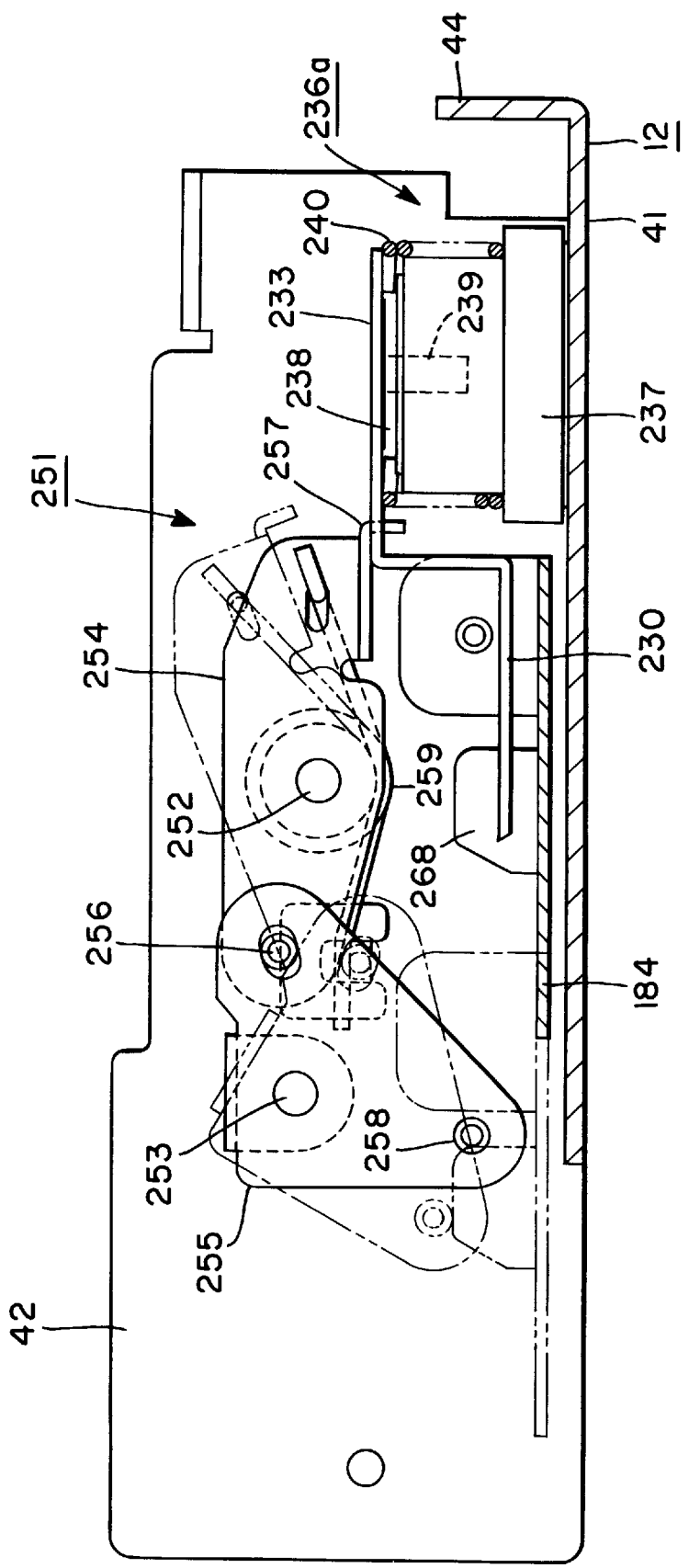

FIG. 19 is a sectional view of the said selector plate, corresponding to the plane along the line A—A of FIG. 18.

Figure 20:
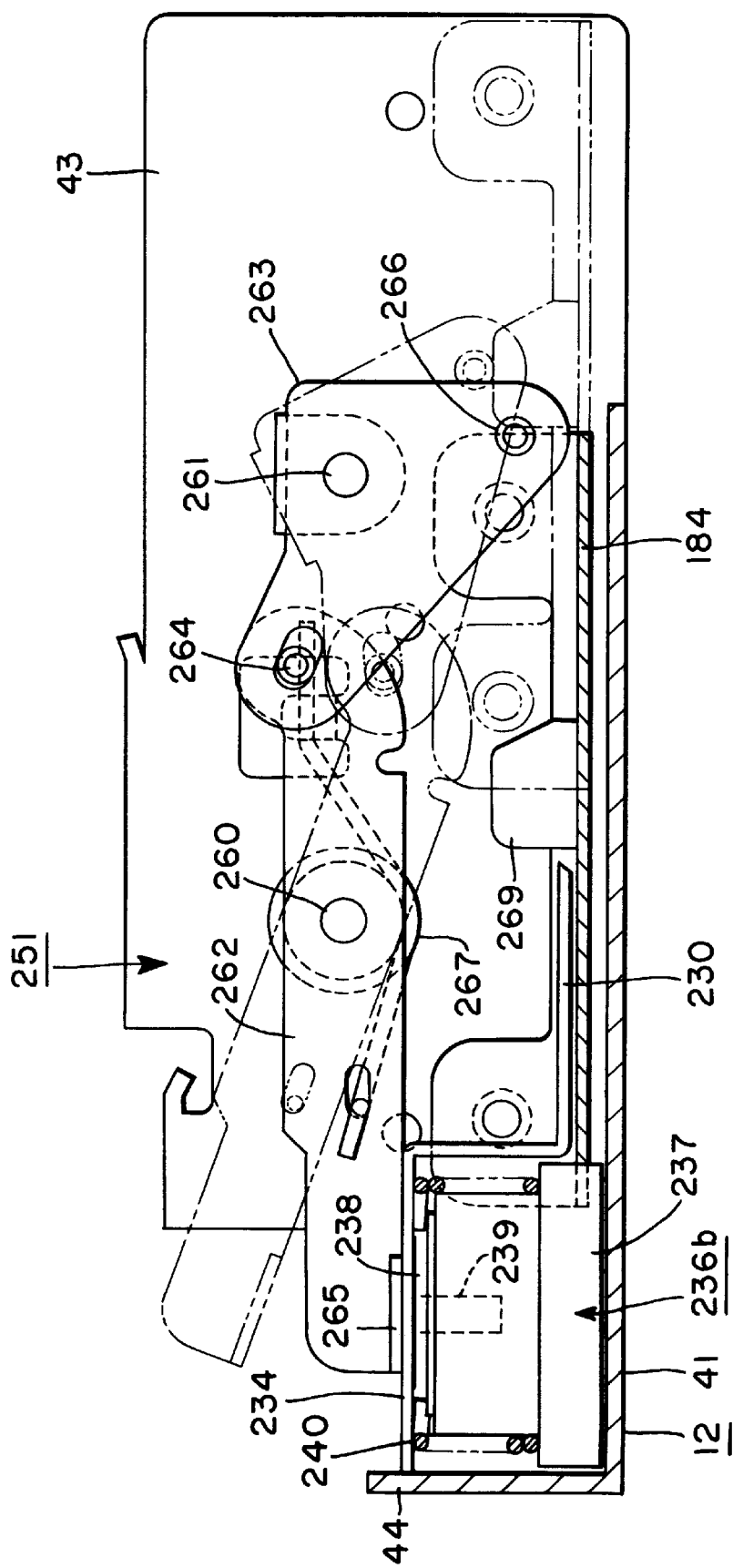

FIG. 20 is a sectional view of the said selector plate, corresponding to the plane along the line B—B of FIG. 18.

Figure 21:
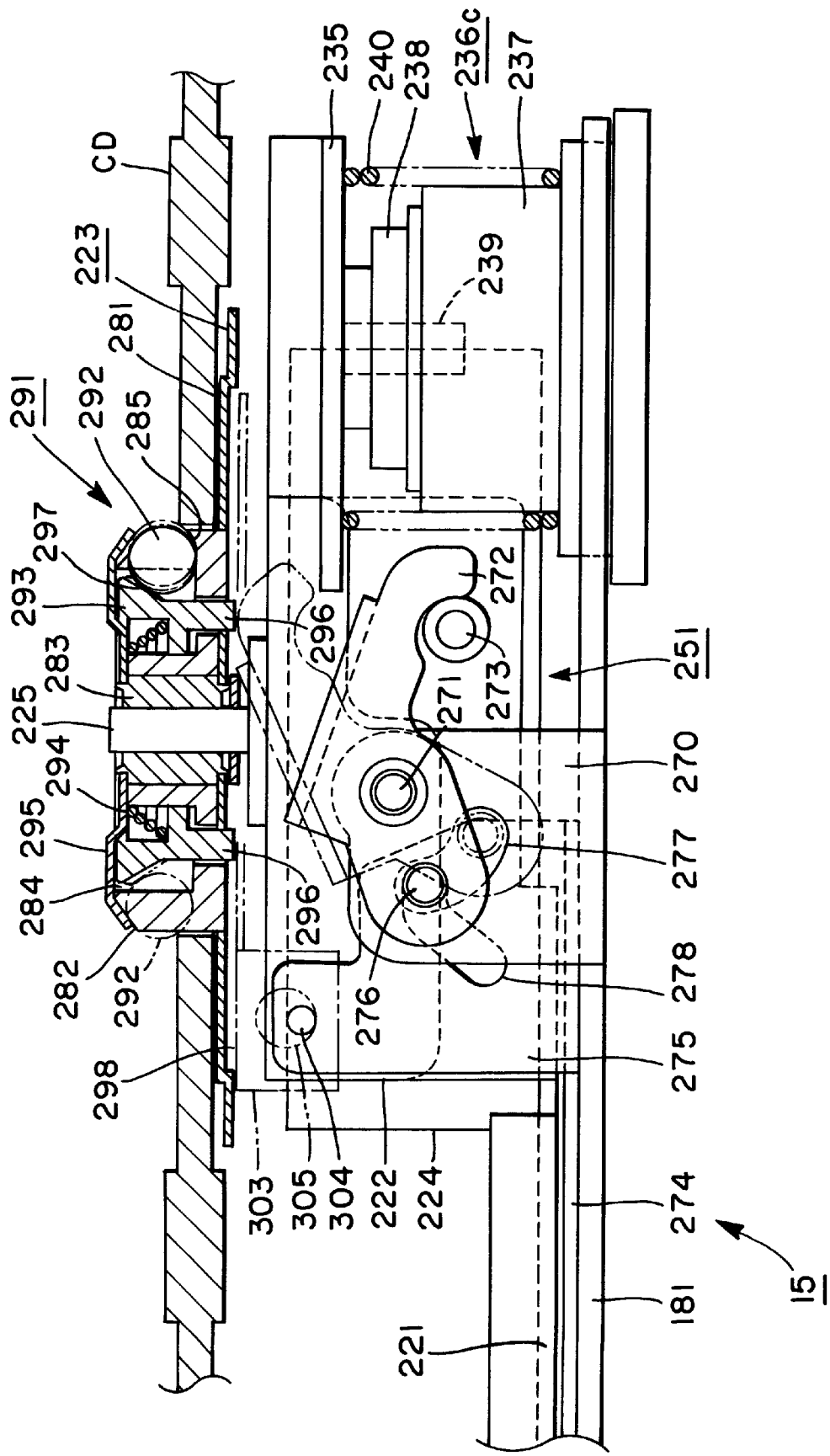

FIG. 21 is a front view of said driving arm unit, wherein a part of its furthermost end is cut away.

Figure 22:
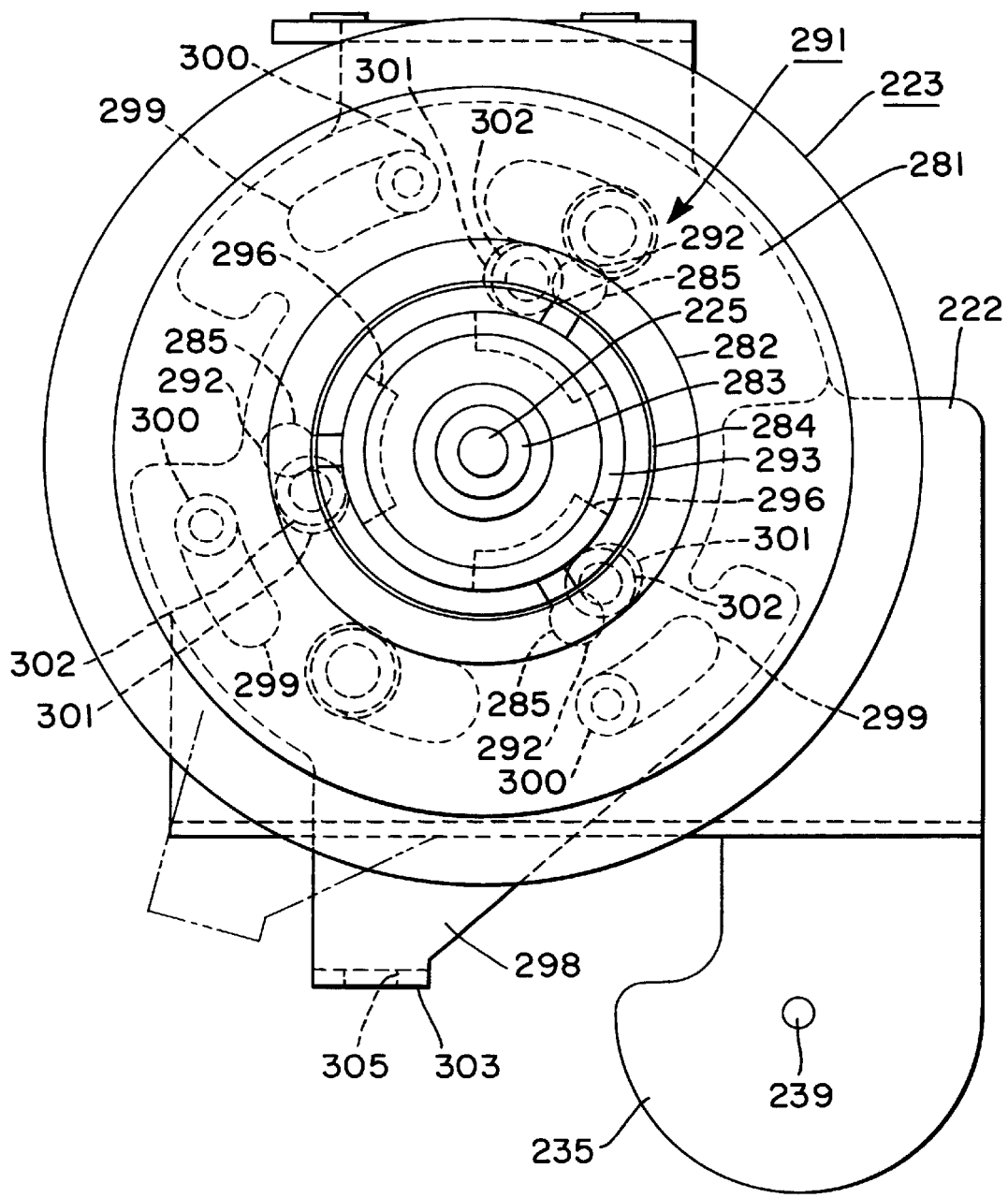

FIG. 22 is a top view of the turn table and its vicinity of said disk driving apparatus.

Figure 23:
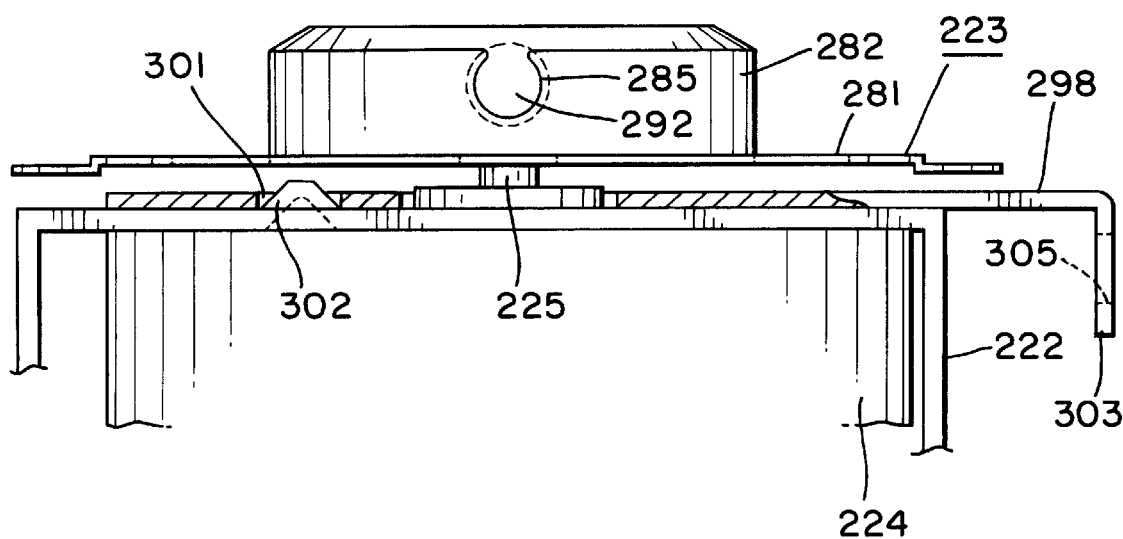

FIG. 23 is a side view of said turn table and its vicinity.

Figure 24:
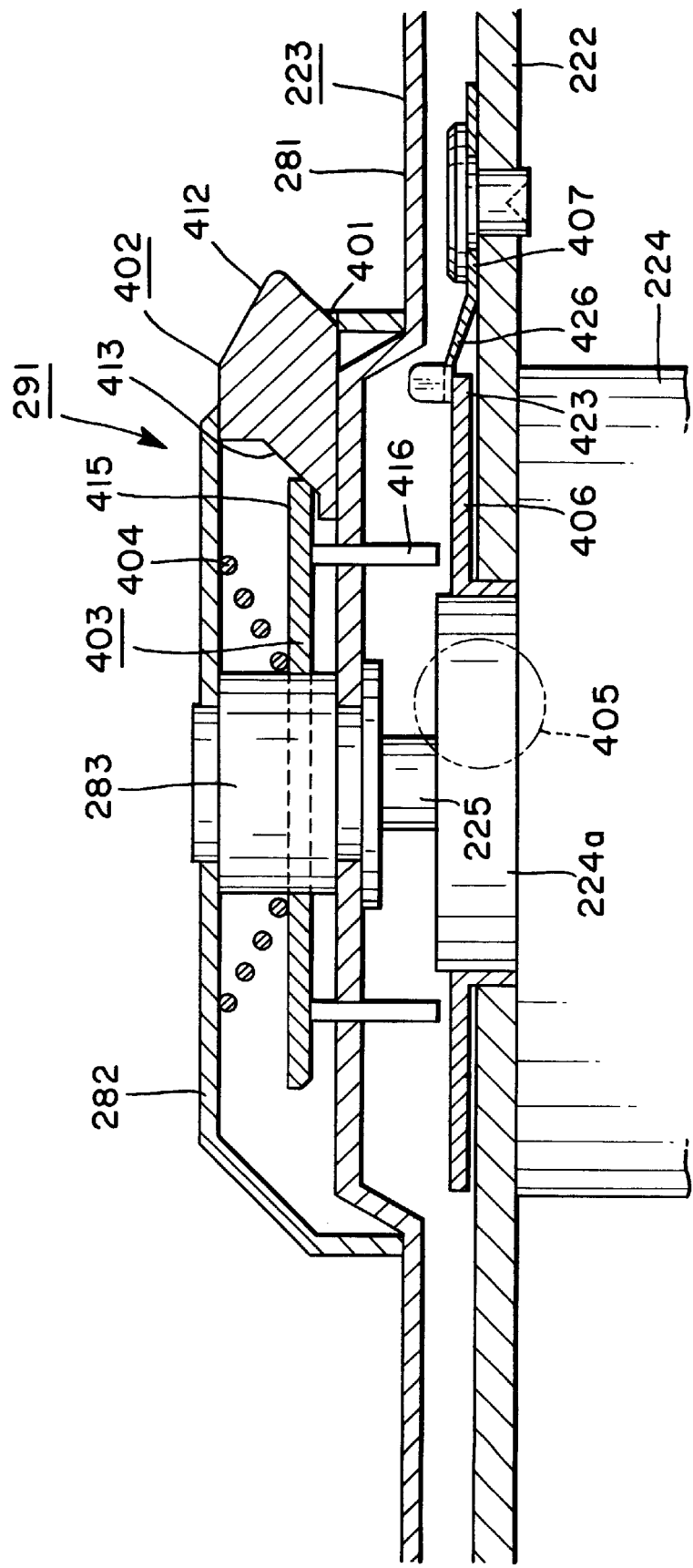

FIG. 24 is a sectional view of a disk driving apparatus according to the second embodiment of the invention, illustrating the part where the furthermost end of the driving arm unit is located, wherein the claw devices are in the protruded state.

Figure 25:
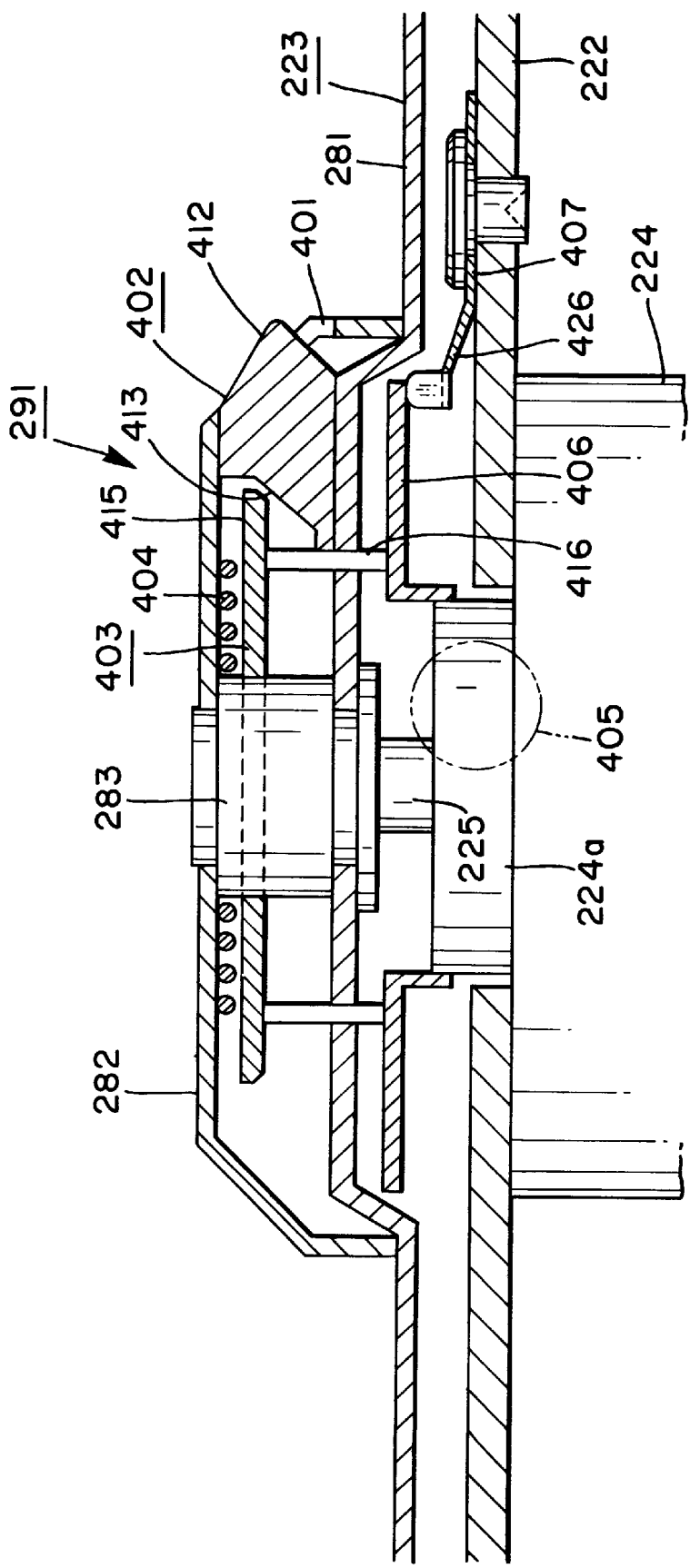

FIG. 25 is a sectional view of the furthermost end of said driving arm unit, wherein the claw devices are in the retracted state.

Figure 26:
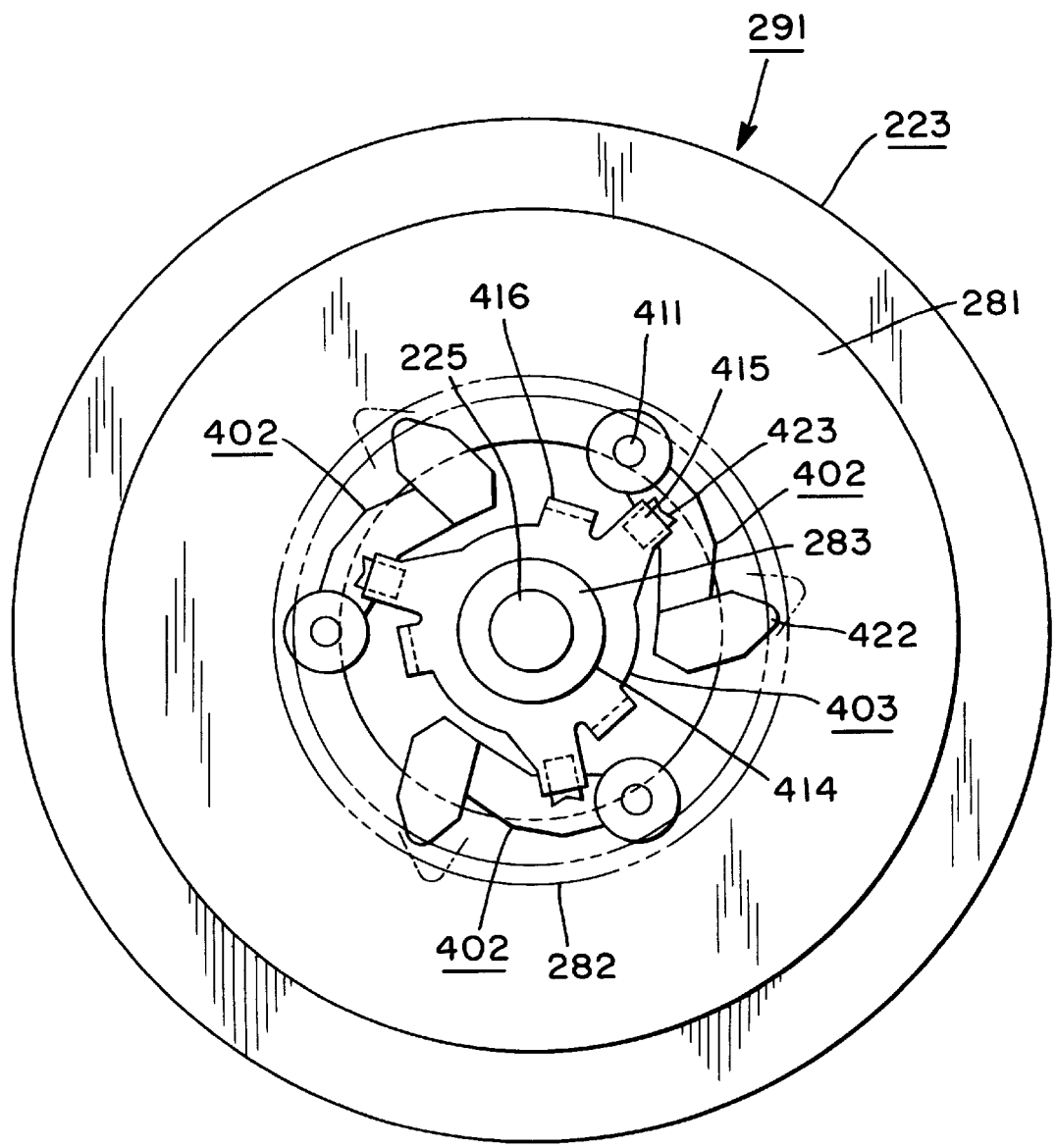

FIG. 26 is a top view of same, omitting a part of the turn table.

Figure 27A:
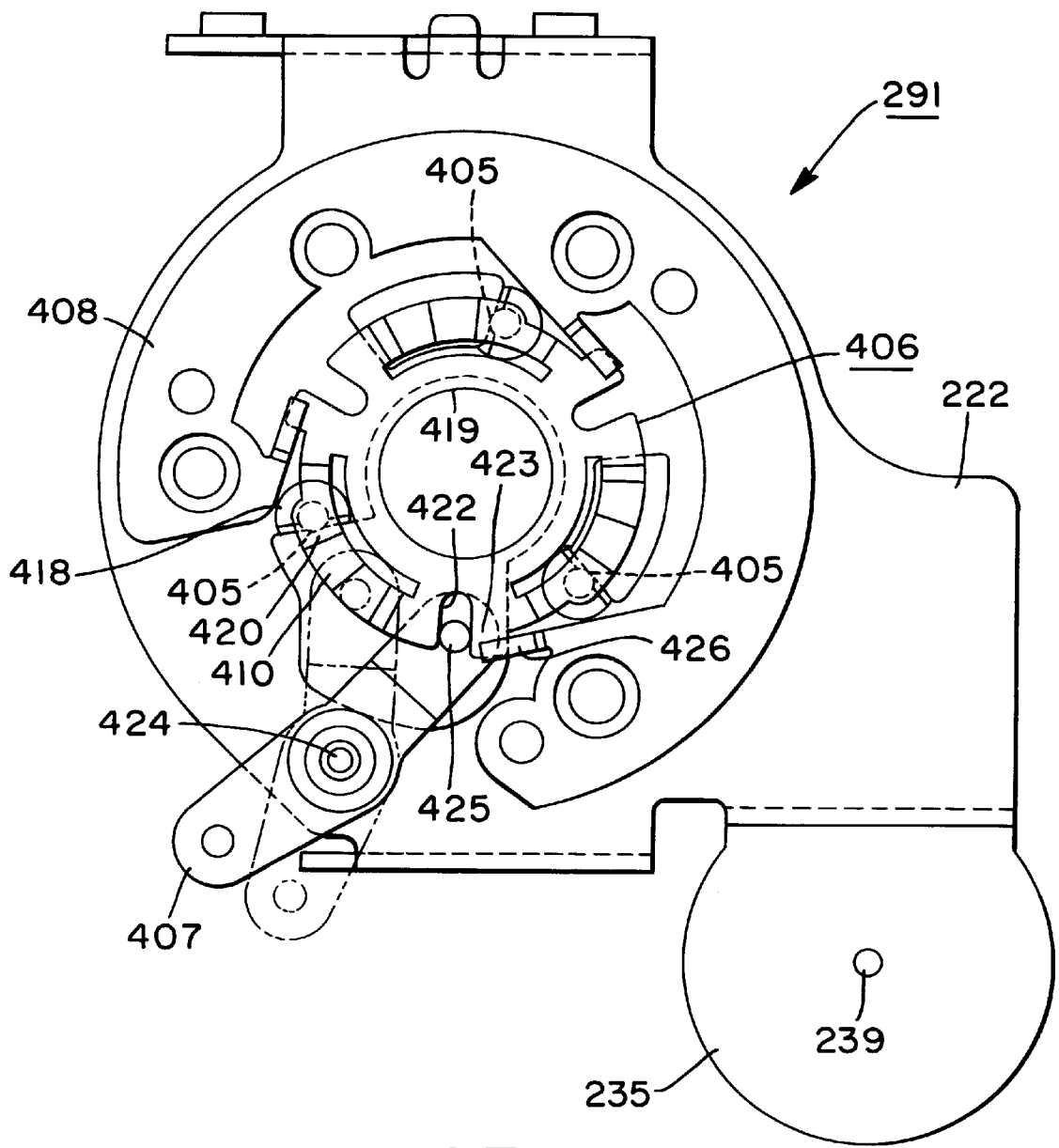

FIGS. 27(a) and (b) respectively represent a top view of the furthermost end of said driving arm unit and a back view of a part of the driving arm unit.

DETAILED DESCRIPTION OF THE DRAWINGS

Next, an embodiment of the present invention is explained hereunder, referring to the drawings.

The embodiment explained hereunder relates to a CD player serving as a disk driving apparatus. Said CD player is adapted to handle read-only compact disks (hereinafter referred to as CDs) serving as disks on which information can be recorded. The CD player functions as a CD changer which is adapted to selectively plays one of a plurality of CDs.

A first embodiment is shown in FIGS. 1 through 23.

Referring to FIG. 9, the CD changer has a body 1 serving as the main body of the driving apparatus and incorporated in an audio appliance. The body 1 has a square bottom plate 2 and side plates 3,4 respectively raised from the two lateral sides of the bottom plate 2. A top plate 5 is joined to the upper ends of the side plates 3,4, and an access opening 6 serving as an opening is formed at the front of the body 1.

As viewed in FIG. 10, wherein the upper end represents the actual front end of the body 1, where the access opening 6 is located, while the lower end represents the actual rear end of the body 1, a plurality of vertically stacked trays 11 (see FIGS. 9, 13, etc.) are positioned at the front portion of the interior of the body 1, and a vertically movable selector plate 12 is disposed at the rear portion of the interior of the body 1. A disk selecting unit 14 adapted to select a tray 11 that either supports the CD to be played or is going to be loaded with a CD is arranged in the space ranging from the bottom to the two lateral sides of the body 1. A driving arm unit 15 adapted to play the CD on the tray 11 that has been selected is disposed on the selector plate 12.

Figure 4:
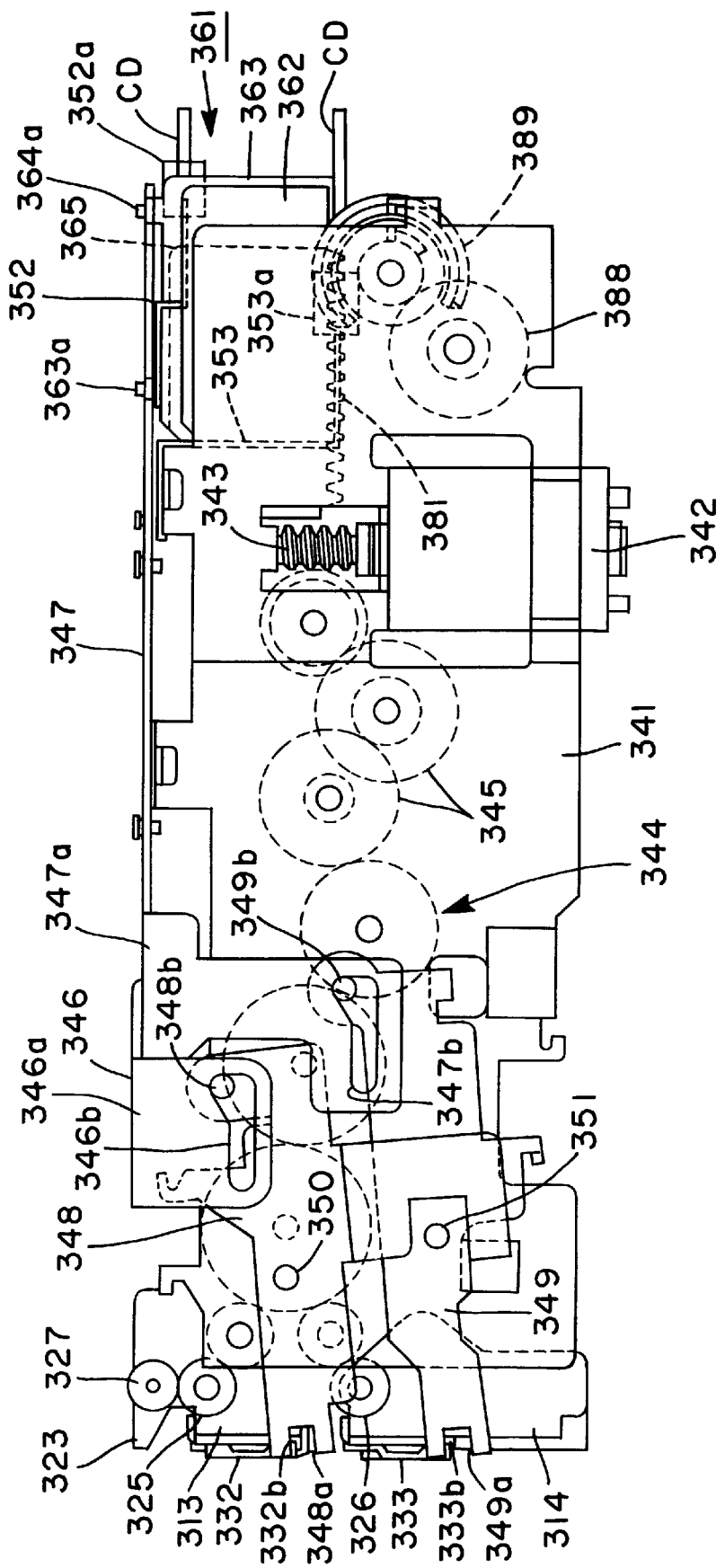
FIG. 4 is a side view of said disk driving apparatus.
Figure 5:
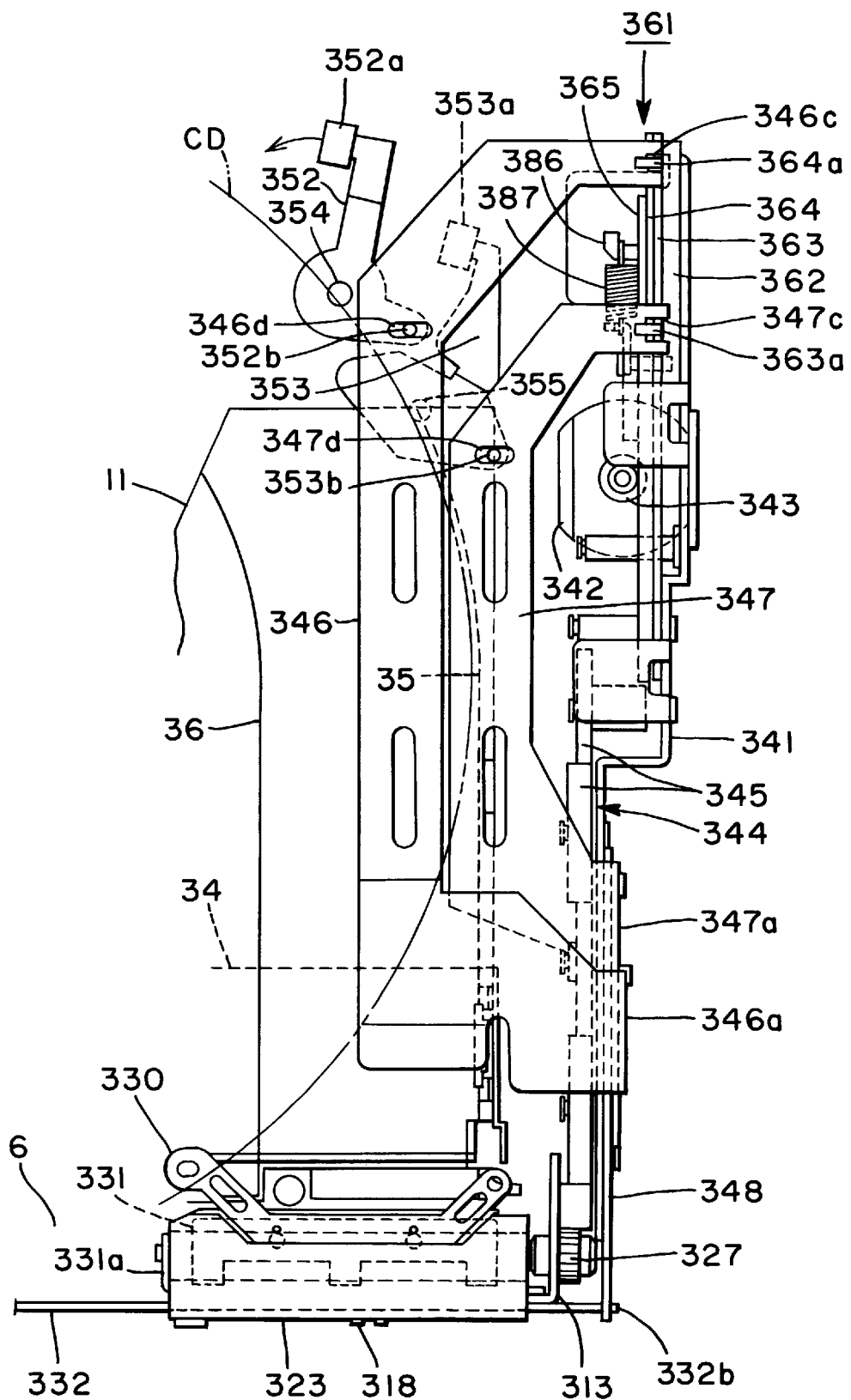
FIG. 5 is a top view of a part of said disk driving apparatus adjoining one of the lateral sides.

As viewed in FIGS. 4 and 5, wherein the lower end represents the actual front end of the body 1, where the access opening 6 is located, while the upper end represents the actual rear end of the body 1, a mechanism corresponding to the slot-in mechanism of a conventional CD player is disposed in a region ranging from the front portion to the right side of the body 1 as viewed from the front. The explanation of this mechanism is given after describing the body of the CD changer shown in FIG. 10.

Next, the structure of the trays 11 is explained hereunder.

As shown in FIG. 10, each tray 11 has a cutout portion 23, which extends from the center to the rear portion of the tray so that the driving arm unit 15 moved to its driving position is allowed to move up and down.

A pair of guide rollers 28 are disposed at each lateral side of each tray 11. The two guide rollers 28 of each pair are aligned in the fore-and-aft direction, and each guide roller 28 is rotatably supported by a shaft. The guide rollers 28 are engaged in vertically extending guide grooves 29, which are formed in the side plates 3,4 of the body 1 as shown in FIG. 9 and other drawings, so that the guide rollers 28 are permitted to move up and down in the guide rollers 29.

As shown in FIG. 14, a holding plate 34 is disposed under each tray plate 21 in such a manner that the front end of each holding plate 34 is rotatably attached to the tray plate 21. A spring (not shown) applies constant force to lower the rear end of the holding plate 34 so that the holding plate 34 holds a CD on the tray 11 located immediately below the holding plate 34.

As shown in FIG. 10, a recess 35 for receiving a 12 cm CD and a recess 36 for receiving a 8 cm CD are formed in the upper surface of each tray 11. The two lateral sides of the front portion of each recess 35,36 extend in a pair of straight, parallel lines so as to permit a CD to move back and forth.

Figure 1:
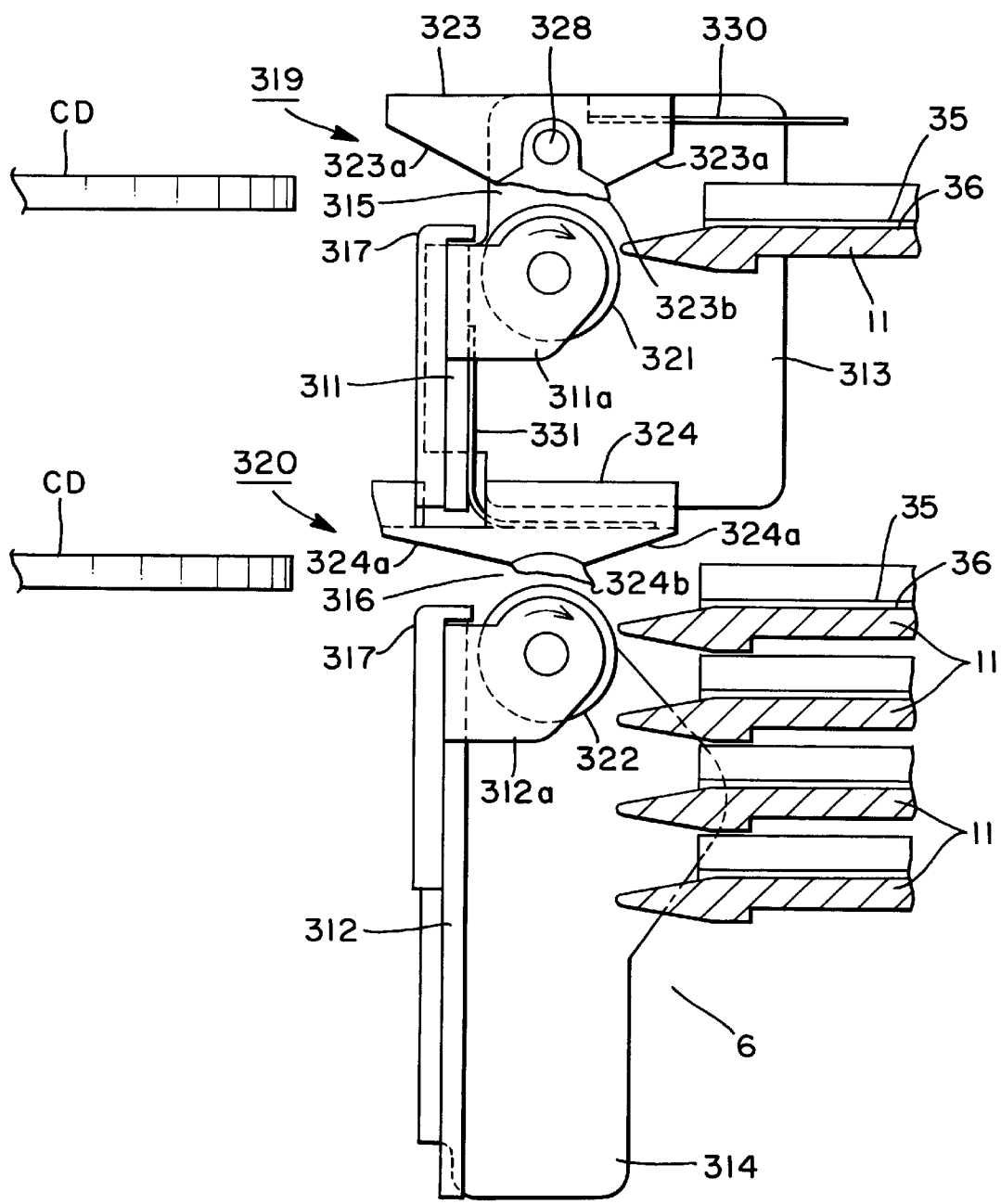
FIG. 1 is a sectional view of a part of a disk driving apparatus according to the first embodiment of the invention, said part representing the region where the disk insertion/removal openings are located.

As shown in FIG. 1, the front end of each tray 11 is tapered so that its cross section has an approximately triangular shape in order to guide a CD to be inserted onto the tray 11 or onto the tray immediately below.

A total of five trays 11 are used in the present embodiment, in the explanation of which the bottommost tray is referred to as the first tray or the tray at the first level, while the uppermost tray is referred to as the fifth tray or the tray at the fifth level.

Next, the structure of the selector plate 12 is explained hereunder.

As shown in FIG. 10 and FIGS. 18 through 20, the selector plate 12 has a base plate 41. Side plates 42,43 are respectively raised from the two lateral sides of the base plate 41, while a rear plate 44 rises from the rear end of the base plate 41. The side plates 42,43 are supported in such a manner as to be permitted to vertically slide on the side plates 3,4, of the body 1 and thus move up and down between the positions selected by the disk selecting unit 14.

Next, the structure of the disk selecting unit 14 is explained hereunder.

As shown in FIGS. 11 through 15, of the components that constitute the disk selecting unit 14, a selector mechanism 81 serves to select a tray 11 intended for playback or loading a CD from among the trays 11 that are arranged in a plurality of levels and, a carrier mechanism 82 serves to form a driving space under the selected tray 11 so that the driving arm unit 15 may be inserted into the driving space. The disk selecting unit 14 also includes a holding means 83 adapted to support the selector mechanism 81 at the position selected by the selector mechanism 81 while the carrier mechanism 82 is in action.

The disk selecting unit 14 is provided with a movable plate 84, a pair of operating members 85 disposed to each lateral side of the movable plate 84, an interlocking plate 86 disposed above the movable plate 84, and a pair of interlocking levers 87 disposed to each lateral side of the movable plate 84 for moving the operating members 85 and the interlocking plate 86 together. The movable plate 84 is so disposed on the bottom plate 2 of the body 1 as to be capable of sliding back and forth. The pair of operating members 85 at each side are aligned in the fore-and-aft direction, and the two interlocking levers 87 at each side, too, are aligned in the fore-and-aft direction.

A pair of guide tabs 91 for vertically moving the bottom most tray 11 through the guide rollers 28 of the tray 11 protrudes upward from each lateral side of the movable plate 84. The two guide tabs 91 that constitute each pair are aligned in the fore-and-aft direction. Disposed behind each guide tab 91 is a supporting strip 92 which protrudes upward from the movable plate 84 and supports the corresponding operating member 85 in such a manner as to allow the operating member 85 to move up and down. A bearing protrusion 93 rises behind each supporting strip 92 and rotatably supports the corresponding interlocking lever 87 through a shaft.

Each guide tab 91 has an upper horizontal end 94, which is adapted to elevate the tray 11 by the action of the corresponding guide roller 28 when the movable plate 84 is at the standby position, i.e. at the retracted position as shown in FIG. 13. Each guide tab 91 also has a slanted edge 95 and a lower horizontal base 96. The slanted edge 95 is adapted to guide the tray 11 to move downward by the action of the corresponding guide roller 28 when the movable plate 84 shown in FIG. 14 moves forward from the standby position, and upward by the action of the corresponding guide roller 28 when the movable plate 84 moves rearward from the advanced position. The lower horizontal end 96 is adapted to support the tray 11 through the corresponding guide roller 28 when the movable plate 84 is at the playback position, i.e. the drive position, where the movable plate 84 has been moved forward to the full extent as shown in FIG. 15.

A vertically extending groove 97 is formed in each supporting strip 92.

Each operating member 85 is positioned adjacent to the inner side face of the corresponding supporting strip 92 and so supported as to be capable of moving up and down by a pair of vertically arranged studs 101, which are engaged in the groove 97 of the corresponding supporting strip 92.

Formed in the front portion of each operating member 85 is a guide groove 102, which permits the corresponding guide roller 28 of only one of the trays 11, i.e. the tray 11 that has been chosen, to be engaged therein as a result of forward movement of the movable plate 84 from its retracted position, i.e. the standby position shown in FIG. 13. Each guide groove 102 comprises a first groove 103 and a second groove 104. The first grooves 103 serve to lower the selected tray 11 by the action of the guide rollers 28 when the movable plate 84 is at its advanced position shown in FIG. 14. The second grooves 104 serve to move the selected tray 11 further downward by the action of the guide rollers 28 when the movable plate 84 is at the playback position shown in FIG. 15, where the movable plate 84 is at the most advanced position.

The front end of each operating member 85 is formed into a guide edge 106 facing and extending parallel with the slanted edge 95 of the guide tab 91 located in front of the operating member 85 so that a gap 105 is formed between the guide edge 106 and the slanted edge 95.

A connecting pin 107 to be connected to the selector plate 12 protrudes from the rear end of each rear operating member 85.

A pair of bearing protrusions 112 arranged in the fore-and-aft direction protrude upward from each lateral side of the interlocking plate 86. Each bearing protrusion 112 is provided with a supporting shaft 111 protruding therefrom.

Each interlocking lever 87 has an L-like shape and is connected to the corresponding bearing protrusion 93 of the movable plate 84 by means of a supporting shaft 115 disposed at about the midpoint of the interlocking lever 87. Thus, the interlocking levers 87 are rotatably supported by the bearing protrusions 93. Each interlocking lever 87 also has a slot 116 for engaging the lower stud 101 of the corresponding operating member 85 and a slot 117 for engaging the corresponding supporting shaft 111 of the interlocking plate 86, the slot 116 formed at an end of the interlocking lever 87 and the slot 117 formed at the other end of the interlocking lever 87.

The selector plate 12 and the rear operating members 85 are connected by the connecting pins 107 so as to be moved up and down together, while the front operating member 85 and the rear operating members 85 are connected by the interlocking plated 86 and the interlocking levers 87 so as to be moved up and down together. In other words, by means of the selector mechanism 81, the selector plate 12 and the front and rear operating members 85 are moved up or down together to the position where the CD on the selected tray 11 is played.

Then, the carrier mechanism 82 moves the movable plate 84 and the front and rear operating members 85 together in the fore-and-aft direction, thereby forming the driving space under the selected tray 11.

Next, the structure of the selector mechanism 81 is explained hereunder.

Figure 11B:
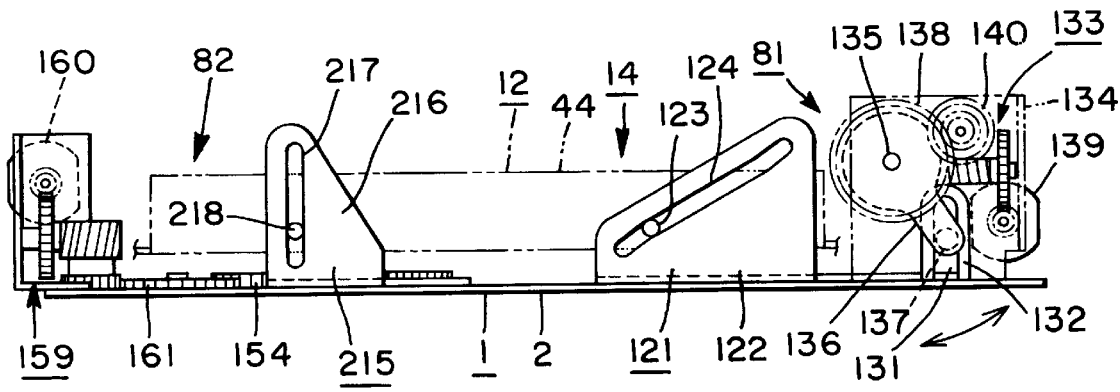

As shown in FIGS. 11 and 12, the selector mechanism 81 has a selecting plate 121 attached to the rear portion of the bottom plate 2 of the body 1 in such a manner as to be capable of sliding laterally. The rear end of the selecting plate 121 is formed into a raised portion 122 to be positioned behind the rear plate 44 of the selector plate 12. A slanted cam groove 124 adapted to receive a pin 123 therein is formed in the raised portion 122. Said pin 123 protrudes from the rear plate 44 of the selector plate 12.

A guide groove 125 elongated in the fore-and-aft direction is formed in the front portion of the selecting plate 121, and a holding pin 127 located at an end of a holding lever 126 is engaged in the guide groove 125. The holding lever 126 has an L-like shape and is connected to the movable plate 84 by means of a supporting shaft 128 disposed at about the midpoint of the holding lever 126. Thus, the holding lever 126 is rotatably supported by the movable plate 84. A slot 129 formed at the other end of the holding lever 126 engages a pin 130, which is formed on the interlocking plate 86 and protrudes upward.

As a result of the selecting plate 121 sliding to the left as viewed in the drawings, the selector plate 12 moves upward by the action of the cam groove 124, thereby rotating the holding lever 126 clockwise as viewed in the drawings and moving the interlocking plate 86 forward so that the operating members 85 are elevated by the action of the interlocking levers 87. In other words, the selector plate 12 and the operating members 85 are elevated together. When the selecting plate 121 slides to the right as viewed in the drawings, the selector plate 12 moves downward by the function of the cam groove 124, thereby rotating the holding lever 126 counterclockwise as viewed in the drawings and moving the interlocking plate 86 rearward so that the operating members 85 are lowered by the action of the interlocking levers 87. In other words, the selector plate 12 and the operating members 85 are lowered together.

A receiving tab 132 having a vertically elongated catching groove 131 rises from the rear portion of the selecting plate 121. The receiving tab 132 is connected to a driving means 133, which is installed in the body 1.

The driving means 133 is mounted on a supporting frame 134 attached to the body 1 and includes a driving lever 136 that is rotatably attached to the supporting frame 134 by means of a supporting shaft 135. The driving lever 136 has a pin 137, which is engaged in the catching groove 131 of the receiving tab 132. A gear 138 is affixed to the supporting shaft 135 of the driving lever 136, and a selecting motor 139 is mounted on the supporting frame 134 so that the driving force resulting from forward or reverse rotation of the selecting motor 139 is transmitted through a gear train 140, which consists of a plurality of gears, to the aforementioned gear 138. Therefore, driving the selecting motor 139 causes the driving lever 136 to swing and thus move the selecting plate 121 in the lateral direction.

The selector mechanism 81 also includes a selection position detecting means (not shown) which is adapted to detect the degree of rotation of the gear 138 and thereby detect the selection position of the selecting plate 121, in other words the position to which the selecting plate 121 is desired to move.

Next, the structure of the carrier mechanism 82 is explained hereunder.

As shown in FIGS. 11 and 12, the carrier mechanism 82 has a cam disk 152 supported on the bottom plate 2 of the body 1 by a supporting shaft 151 in such a manner as to be capable of rotating around the supporting shaft 151. A cam groove 153 is formed in the cam disk 152, and a gear 154 is attached to a portion of the outer edge of the cam disk 152.

An end of a cam lever 156 is attached through a supporting shaft 155 to the upper surface of the bottom plate 2 of the body 1, at a location in front of the cam disk 152. The cam lever 156 is capable of rotating around the supporting shaft 155. The other end of the cam lever 156 is connected to the movable plate 84 by a pin 157, while the middle portion of the cam lever 156 is connected to the cam disk 152 by a cam pin 158, which is adapted to be engaged in the cam groove 153 of the cam disk 152.

With the configuration as above, when the cam disk 152 is at the standby position shown in FIG. 11, the movable plate 84 is at its standby position (shown in FIG. 13), i.e. the retracted position. When the cam disk 152 is moved from the standby position in clockwise rotation as viewed in FIG. 2, the movable plate 84 is moved forward by the function of the cam groove 153 and the cam lever 156 so that the cam disk 152 moves to the playback position shown in FIG. 12, i.e. the position shown in FIG. 15. When the cam disk 152 is moved from the playback position shown in FIG. 12 in counterclockwise rotation as viewed in FIG. 12, the movable plate 84 is moved rearward, by the function of the cam groove 153 and the cam lever 156, so that the cam disk 152 returns to the standby position shown in FIG. 11.

The cam disk 152 is adapted to be rotated by a driving means 159 installed in the body 1. The driving means 159 includes a carrier motor 160, and the driving force resulting from forward or reverse rotation of the carrier motor 160 is transmitted to the gear 154 of the cam disk 152 through a gear train 161 consisting of a plurality of gears.

The carrier mechanism 82 also includes a position detecting means (not shown) which is adapted to detect the degree of rotation of one of the gears of the gear train 161 and thereby detect the degree of rotation of the cam disk 152, in other words the position to which the movable plate 84 has been moved.

The carrier mechanism 82 functions as a tray moving device for moving the aforementioned trays 11 and also as a driving arm moving device for moving the driving arm unit described later.

Next, the structure of the holding means 83 is explained hereunder.

As shown in FIGS. 11 and 12, the holding means 83 comprises the aforementioned holding pin 127 and a comb-like holding slot unit 171 adapted to receive the holding pin 127 therein.

The holding slot unit 171 is formed in the bottom plate 2, at a location under the guide groove 125 of the selecting plate 121 and corresponding to the area within which the selecting plate 121 is adapted to slide. The holding slot unit 171 consists of a selecting groove 172 and a plurality of holding slots 173 respectively corresponding to the selection positions and extending forward from the selecting groove 172. The selecting groove 172 is adapted to permit the holding pin 127 to move to the corresponding selection position as a result of the selecting plate 121 sliding from the standby position shown in FIG. 11 to one of the selection positions. The holding slots 173 communicate with the selecting groove 172 at locations respectively corresponding to the selection positions so that the holding pin 127 is allowed to enter or exit from any one of the holding slots 173 and, when the pin 127 has been completely inserted into one of the holding slots 173, is held therein. Each holding slot 173 communicate with the selecting groove 172 by means of an entrance. While the entrance of each holding slot 173 is wide in order to facilitate insertion of the holding pin 127, the inner portion is narrow to secure the holding pin 127.

With the configuration as above, movement of the selecting plate 121 from the standby position shown in FIG. 11 to one of the selection positions causes the holding pin 127 to move in the selecting groove 172 to the selection position that faces the entrance of the corresponding holding slot 173. When the movable plate 84 is moved forward toward the playback position shown in FIG. 12, the holding pin 127 moves forward along the guide groove 125 from the aforementioned position into the corresponding holding slot 173 so that the selecting plate 121 is held at the selection position.

Next, the structure of the driving arm unit 15 is explained hereunder.

As shown in FIG. 10 and FIGS. 16 through 18, the driving arm unit 15 is mounted on the selector plate 12 and includes a swinging arm 181 adapted to move toward or away from the trays 11. The swinging arm 181 is supported by an arm shaft 182 in such a manner as to be capable of swinging around the arm shaft 182. The arm shaft 182 is mounted on the selector plate 12, at a location to a side of the trays 11, and projects upward through the selector plate 12. A cam groove 183 is formed near the base end of the driving arm unit 15, i.e. the end where the arm shaft 182 is located.

A changeover plate 184 is mounted on the selector plate 12 in such a manner as to be capable of sliding in the fore-and-aft direction. A cam pin 185 adapted to be engaged in the cam groove 183 protrudes from the changeover plate 184.

Figure 16B:
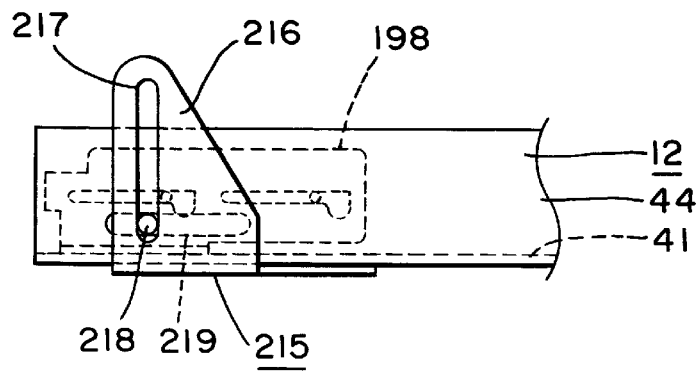

When the changeover plate 184 is at its standby position, i.e. the retracted position shown in FIG. 16, the swinging arm 181, too, is at the standby position, having been moved rearward out of the interior of the tray unit 11 by the function of the cam groove 183 and the cam pin 185. When the changeover plate 184 is moved forward from the standby position, the swinging arm 181 is swung forward into the tray 11 by the function of the cam groove 183 and the cam pin 185. Thus, the swinging arm 181 is moved to the playback position (the driving position) shown in FIG. 17.

Moving the changeover plate 184 straight in the fore-and-aft direction is done by the action of the carrier mechanism 82 as the driving arm moving device. The driving arm moving device has a first link 192 and a second link 193, which are rotatably connected to each other at the middle by means of a connecting pin 191. The front ends of the first and second links 192,193 are respectively connected through pins 194,195 to the changeover plate 184. The rear end of the first link 192 is supported on the selector plate 12 by a supporting shaft 196, while the rear end of the second link 193 is attached through a cam pin 197 to an operating plate 198.

An end of a third link 199 is attached through a supporting shaft 200 to the upper surface of the selector plate 12 so that the third link 199 is capable of rotating around the supporting shaft 200. The other end of the third link 199 is connected through a pin 201 to the first link 192, while the approximate center of the third link 199 is connected through a cam pin 202 to the operating plate 198. The third link 199 is provided with a cam groove 203, in which a cam pin 204 of the operating plate 198 is engaged.

The operating plate 198 is attached to the selector plate 12 in such a manner as to be capable of sliding in the lateral direction. Formed in the operating plate 198 is a cam groove 205 adapted to receive therein the cam pin 197 of the second link 193 and the cam pin 202 of the third link 199.

With the configuration as above, when the operating plate 198 slides to the left as viewed in FIG. 16, i.e. to its standby position shown in FIG. 16, the changeover plate 184 is moved rearward to the standby position. By sliding the operating plate 198 to the right as viewed in the drawing, the changeover plate 184 is moved straight forward by the action of the first, second and third links 192,193,199.

As shown in FIGS. 11 and 12, the driving arm moving device of the carrier mechanism 82 has a cam lever 212 disposed on the bottom plate 2. The cam lever 212 is located at a side of the cam disk 152 and supported by a supporting shaft 211 that is attached to the middle of the cam lever 212 so that the cam lever 212 is capable of rotating around the supporting shaft 211. An end of the cam lever 212 is connected to the cam disk 152 through a cam pin 213, which is engaged in the cam groove 153 of the cam disk 152, while the other end of the cam lever 212 is connected through a pin 214 to a slide plate 215. The slide plate 215 is attached to the rear portion of the upper surface of the bottom plate 2 in such a manner as to be capable of sliding in the lateral direction. A raised portion 216 to be positioned behind the rear plate 44 of the selector plate 12 is formed at the rear end of the slide plate 215. A vertically elongated guide groove 217 is formed in the raised portion 216.

Figure 17B:
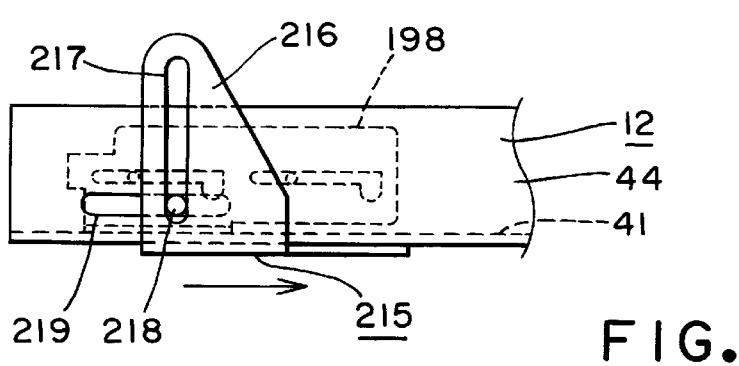

As shown in FIGS. 16 and 17, a pin 218 formed on the operating plate 198 is engaged in the guide groove 217 of the raised portion 216. A laterally elongated guide groove 219 is formed in the rear plate 44 of the selector plate 12. Said pin 218 passes through this guide groove 219.

With the configuration as above, when the cam disk 152 is at the standby position shown in FIG. 11, the slide plate 215, too, is at its standby position, i.e. the position the slide plate 215 reaches when it slides to the left to the full extent as shown in FIG. 11. By rotating the cam disk 152 clockwise as viewed in FIG. 11, the action of the cam groove 153 and the cam lever 212 causes the slide plate 215 slide to the right as viewed in FIG. 11 until it reaches the playback position shown in FIG. 12.

As shown in FIGS. 10, 18 and 21, a driving arm 221 is disposed on the swinging arm 181. A holding frame 222 is attached to the furthermost end of the driving arm 221. A turn table 223 for chucking a CD is disposed above the holding frame 222. A CD rotating motor 224 serving as a driving unit is attached to the underside of the holding frame 222. A driving shaft 225 of the CD rotating motor 224 projects from the upper surface of the holding frame 222, and said turn table 223 is affixed to this driving shaft 225.

As shown in FIG. 10, a head unit 227 having a pickup 226 for performing reading and playback of a CD is disposed on the driving arm 221. The head unit 227 is supported in such a manner as to be capable of sliding along the driving arm 221 and screwed around a feed screw 228 which extends along the driving arm 221. Therefore, as a result of a head feeding motor 229 rotating the feed screw 228, the head unit 227 moves along the driving arm 221.

As shown in FIG. 18, a supporting arm 230 is disposed on the selector plate 12 and extends along the rear plate 44. A connecting groove 232 is formed near an end of the supporting arm 230. A connecting pin 231 protrudes from the driving arm 221 and is adapted to be engaged in the connecting groove 232 in such a manner as to be allowed to swing. Thus, the driving arm 221 and the supporting arm 230 are connected and capable of moving up and down together.

Receiving portions 233,234 are respectively formed at the two opposing ends of the supporting arm 230, while the holding frame 222 at the furthermost end of the driving arm 221 is provided with a receiving portion 235. A vibration-isolating supporting means 236a is disposed between the receiving portion 233 of the supporting arm 230 and the selector plate 12, while a vibration-isolating supporting means 236b is disposed between the selector plate 12 and the receiving portion 234 of the supporting arm 230. A vibration-isolating supporting means 236c is disposed between the receiving portion 235 and the swinging arm 181. In other words, when the driving arm 221 has swung and is at the driving position, the vibration-isolating supporting means 236a,236b,236c are respectively located at the vertices of a triangle that respectively correspond to the furthermost end of the driving arm 221, the point where the driving arm 221 and the supporting arm 230 are connected, and the furthermost end of the supporting arm 230. Thus, the driving arm 221 and the supporting arm 230 are supported in such a state that they are isolated from oscillation of the selector plate 12 and/or the swinging arm 181.

As shown in FIGS. 19 through 21, the vibration-isolating supporting means 236a,236b,236c have nearly identical structures; each vibration-isolating supporting means has a case 237 to be attached to either the selector plate 12 or the swinging arm 181. A damper 238, which may be an oil damper consisting of an elastic container made of rubber or the like and oil sealed in the container, is housed in the case 237. A connecting shaft 239 protrudes from the top of the damper 238. The upper end of the connecting shaft 239 are connected to the receiving portion 233,234,235. A coil spring 240 for floating the receiving portion 233,234,235 surrounds the outer face of the case 237. The damper 238 and the spring 240 of each vibration-isolating supporting means 236a,236b,236c are arranged to have an appropriate elasticity in accordance with the load to be applied to each respective vibration-isolating supporting means 236a,236b, 236c.

Next, the structure of each restraining means 251 is explained hereunder.

The restraining means 251 are adapted to be changed over between the allowing mode, in which the vibration-isolating supporting means 236a,236b,236c are allowed to support the driving arm 221 and the supporting arm 230 in the state where a CD is chucked by the turn table 233, and the restraining mode in which the driving arm 221 and the supporting arm 230 are respectively held at home positions by restraining the vibration-isolating supporting means 236a,236b,236c from supporting the driving arm 221 and the supporting arm 230 in any other state than the state where a CD is properly chucked on the turn table 233.

As shown in FIGS. 18 and 19, one of the restraining means 251 is disposed in association with the vibration-isolating supporting means 236a and includes a restraining lever 254 and a passive lever 255, which are rotatably attached to the side plate 42 of the selector plate 12 by means of respective supporting shafts 252,253. The restraining lever 254 and the passive lever 255 are connected by a connecting pin 256 so that the two levers are capable of rotating together. A catching portion 257 adapted to rest on the receiving portion 233 of the supporting arm 230 is formed at the rear end of the restraining lever 254. A passive roller 258 is rotatably attached to the passive lever 255 by means of a shaft.

Attached to the restraining lever 254 is a spring 259, which is adapted to apply constant force to the restraining lever 254 in the clockwise direction as viewed in FIG. 19, i.e. such a direction as to push the receiving portion 233 of the supporting arm 230 downward. The spring 259 is so designed as to have an elastic force greater than that of the spring 240 so that it is capable of pushing the receiving portion 233 of the supporting arm 230 downward, against the constant force applied by the spring 240.

As shown in FIGS. 18 and 20, another restraining means 251 is disposed in association with the vibration-isolating supporting means 236b and includes a restraining lever 262 and a passive lever 263, which are rotatably attached to the side plate 43 of the selector plate 12 by means of respective supporting shafts 260,261. The restraining lever 262 and the passive lever 263 are connected by a connecting pin 264 so that the two levers are capable of rotating together. A catching portion 265 adapted to rest on the receiving portion 234 of the supporting arm 230 is formed at the rear end of the restraining lever 262. A passive roller 266 is rotatably attached to the passive lever 263 by means of a shaft.

Attached to the restraining lever 262 is a spring 267, which is adapted to apply constant force to the restraining lever 262 in the counterclockwise direction as viewed in FIG. 20, i.e. such a direction as to push the receiving portion 234 of the supporting arm 230 downward. The spring 267 is so designed as to have an elastic force greater than that of the spring 240 so that it is capable of pushing the receiving portion 234 of the supporting arm 230 downward, against the constant force applied by the spring 240.

As shown in FIGS. 18 through 20, cam protrusions 268,269 adapted to be respectively engaged with the passive rollers 258,266 are formed on the changeover plate 184 in such a manner as to protrude upward from the two side edges of the changeover plate 184.

As described above, when the changeover plate 184 is at the rearmost, standby position, the cam protrusions 268,269 are located behind the respective passive rollers 258, 266, with some distance between each cam protrusion and the passive roller corresponding thereto. In that state, due to the constant force that is applied by the springs 259,267 through the restraining levers 254,262, the receiving portions 233, 234 of the supporting arm 230 are held downward so that the supporting arm 230 is held at the home position with the vibration-isolating supporting means 236a,236b being restrained from supporting the ends of the supporting arm 230. When the changeover plate 184 is moved forward to the playback position, the passive rollers 258,266 respectively come into contact with the upper ends of the cam protrusions 268,269, and the passive levers 255,263 and the restraining levers 254,262 are rotated against the constant force of the springs 259,267 to the respective positions represented by two-dot chain lines. As the catching portions 257,265 of the restraining levers 254,262 move upward, the receiving portions 233,234 of the supporting arm 230 are released from the downward pushing force, thereby permitting the vibration-isolating supporting means 236a,236b to support the two ends of the supporting arm 230.

As shown in FIGS. 18 and 21, the other restraining means 251 is disposed in association with the vibration-isolating supporting means 236c and includes a restraining lever 272, which is rotatably attached to a supporting portion 270 by means of a supporting shaft 271. The supporting portion 270 is raised from one of the side edges of the swinging arm 181. A restraining stud 273 with which the restraining lever 272 is adapted to come into engagement is formed at a side of the driving arm 221.

A receiving plate 274 is mounted on the swinging arm 181, at a location under the driving arm 221, in such a manner that the receiving plate 274 is capable of sliding along the long side of the swinging arm 181. A receiving tab 275 adapted to be positioned at the inner side of the supporting portion 270 is formed on the receiving plate 274 and extends upward. A cam pin 276 formed on the restraining lever 272 and protruding therefrom is connected to the receiving tab 275. Formed in the supporting portion 270 is an arc-shaped elongated hole 277, which permits said cam pin 276 to be inserted therethrough and move therein together with rotation of the restraining lever 272. A cam groove 278 adapted to permit the cam pin 276 to be fitted therein is formed in the receiving tab 275. As shown in FIGS. 16 and 17, The receiving plate 274 has a catching groove 279 adapted to permit the aforementioned cam pin 185 to be engaged therein when the cam pin 185 moves in the cam groove 183 of the swinging arm 181. A spring (not shown) applies constant force to the receiving plate 274 in such a direction that the receiving plate 274 slides toward the arm shaft 182 at the base end of the swinging arm 181.

As described above, when the changeover plate 184 is at the retracted position, i.e. the standby position shown in FIG. 16, the receiving plate 274 is exposed to constant force applied in such a direction as to slide the receiving plate 274 toward the arm shaft 182 at the base end of the swinging arm 181. The engagement of the cam groove 278 of the receiving plate 274 with the cam pin 276 of the restraining lever 272 has rotated the retraining lever 272 clockwise as viewed in FIG. 21 to the position represented by solid lines in FIG. 21 so that the furthermost end of the driving arm 221 is exposed to the downward pushing force applied from the retraining lever 272 through the restraining stud 273. As a result, the driving arm 221 is held at its home position with the vibration-isolating supporting means 236c being restrained from supporting the end of the driving arm 221. When the changeover plate 184 is moved forward to the playback position shown in FIG. 18, the cam pin 185 pushes the receiving plate 274 toward the furthermost end of the swinging plate 181, and the engagement of the cam groove 278 of the receiving plate 274 with the cam pin 276 of the restraining lever 272 causes the retraining lever 272 to rotate counterclockwise as viewed in FIG. 21 to the position represented by two-dot chain lines in FIG. 21. As a result, the driving arm 221 is released from the downward pushing force of the retraining lever 272 so that the vibration-isolating supporting means 236c is permitted to support the end of the driving arm 221.

Next, the structure of the turn table 223 is explained hereunder.

As shown in FIGS. 21 through 23, the turn table 223 has a disk-shaped seating portion 281 for receiving a CD thereon, and a boss 282, which is disposed at the center of the seating portion 281 and adapted to be fitted in the center hole of a CD. A fastenable member 283 to be fastened to the aforementioned driving shaft 225 is attached to the center of the boss 282. An annular recess 284 open at the top is formed in the boss 282, and three container portions 285 are also formed in the boss 282. The container portions 285 communicate with the recess 284 and the exterior of the boss 282 and are arranged in a circle at regular intervals.

The turn table 223 is provided with a chucking device 291 for chucking a CD. The chucking device 291 includes three balls 292 which serve as chucking members and are adapted to be respectively contained in the container portions 285 of the boss 282. A ring-shaped confining member 293 for confining the balls 292 in the respective container portions 285 is contained in the recess 284 of the boss 282 in such a manner as to be vertically movable. A spring 294 serving as a biasing means for constantly pushing the confining member 293 downward is also disposed in the recess 284 of the boss 282. A closing member 295 is attached to the top of the boss 282.

Three leg portions 296 are formed on the underside of the confining member 293. The leg portions 296 pass through the bottom of the boss 282 and protrude from the underside of the boss 282. Pushing portions 297 adapted to push the respective balls 292 outward are formed on the cylindrical wall of the confining member 293 facing the balls 292.

With the configuration as above, when the confining member 293 moves downward, the balls 292 are respectively pushed outward by the pushing portions 297 and protrude from the outer cylindrical face of the boss 282. When the confining member 293 moves upward, the balls 292 are released from the pushing force of the pushing portions 297 and permitted to retreat into the boss 282.

A chucking lever 298 serving as a releasing means is disposed between the turn table 223 and the holding frame 222. The chucking lever 298 has a plurality of elongated holes 299 that extend in parallel with the circumferential edge of the chucking lever 298. The chucking lever 298 is so arranged as to be capable of rotating and moving up and down in the state where guide shafts 300 protruding from the upper surface of the holding frame 222 are engaged in the elongated holes 299 of the chucking lever 298. The chucking lever 298 also has a plurality of catching holes 301. Pushing-up portions 302 having a trapezoidal cross section and adapted to be respectively engaged in the catching holes 301 are formed on the upper surface of the holding frame 222.

The chucking lever 298 has a connecting tab portion 303 to be positioned so as to face the outer face of the receiving tab 275 of the receiving plate 274. A connecting hole 305 in which a connecting pin 304 formed on the receiving tab 275 of the receiving plate 274 is adapted to be engaged is formed in said connecting tab portion 303.

When the receiving plate 274 is at the position shown in FIG. 21, to which it has reached by sliding toward the arm shaft 182 at the base end of the swinging arm 181 as described above, the action of the connecting pin 304 of the receiving plate 274 has rotated the chucking lever 298 clockwise to the position represented by the two-dot chain lines in FIG. 22, and the chucking lever 298 has moved onto the pushing-up portions 302 and moved upward with its catching holes 301 separated from the pushing-up portions 302 so that the leg portions 296 of the confining member 293 have been pushed upward by the chucking lever 298. Thus, the balls 292 are in such a state that they are permitted to retreat into the boss 282 and that the center hole of a CD may be fitted around the boss 282. When the receiving plate 274 slides toward the furthermost end of the swinging arm 181, the chucking lever 298 is rotated counterclockwise as viewed in FIG. 22 from the position represented by the two-dot chain line in FIG. 22 by the engagement with the connecting pin 304 of the receiving plate 274. As a result, the catching holes 301 of the chucking lever 298 come immediately over the pushing-up portions 302, and the chucking lever 298 moves downward and releases the confining member 293 from the upward pushing force so that the constant force applied from the spring 294 to the balls 292 through the confining member 293 causes the three balls 292 to protrude from the outer wall of the boss 282 and come into contact with the edge of the center hole of the CD, thereby chucking the CD.

Next, the structure of the mechanism that has a function similar to the CD slot-in method is explained.

Figure 2:
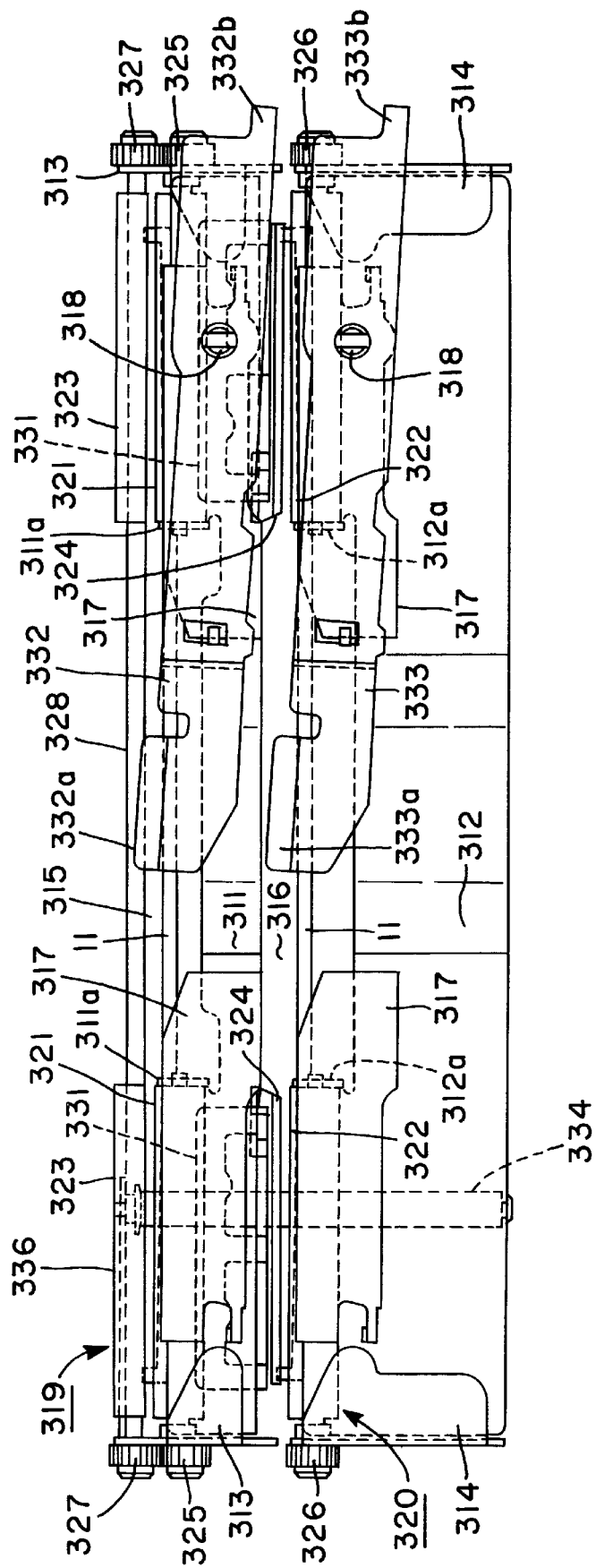
FIG. 2 is a front view of said disk driving apparatus.
Figure 3:
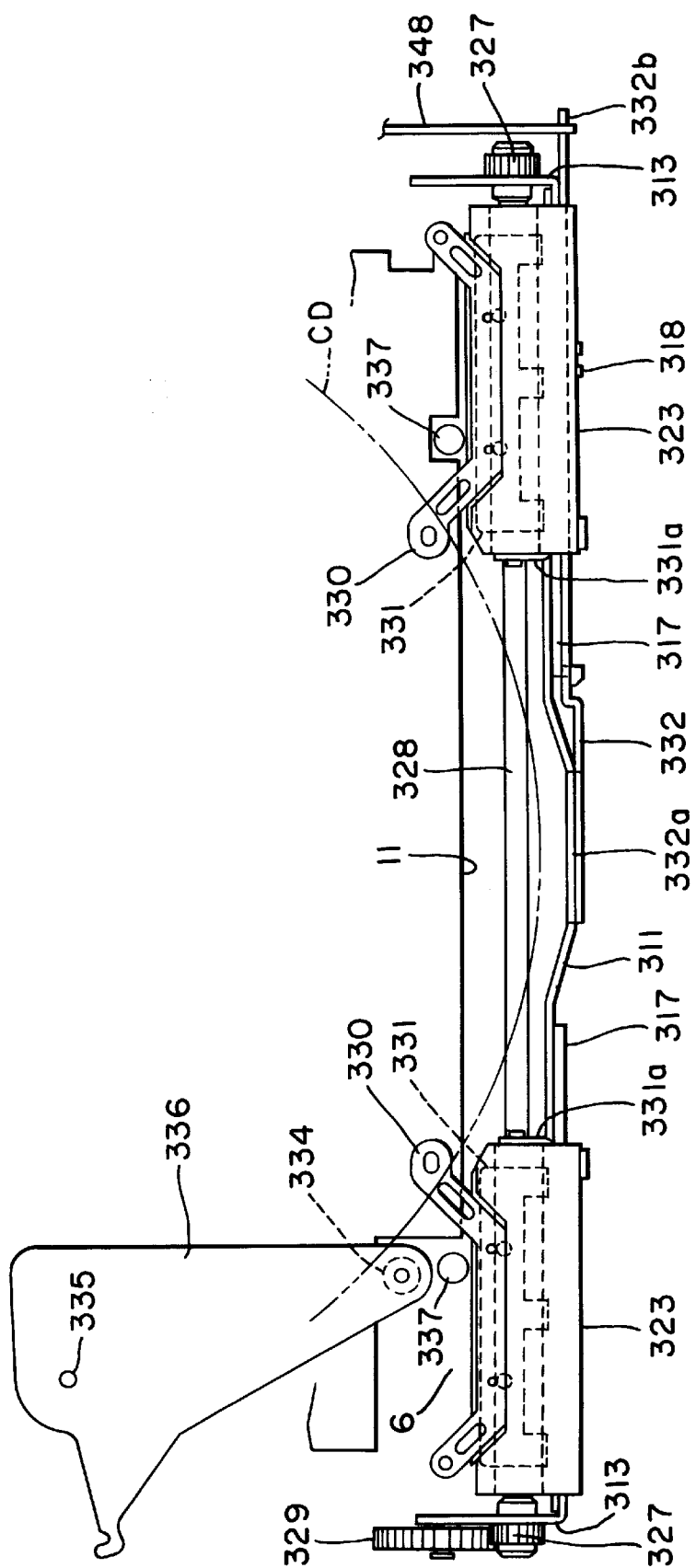
FIG. 3 is a top view of the front end of said disk driving apparatus.

As shown in FIGS. 1 through 5, wherein the lower end as viewed in FIGS. 3 and 5 represents the actual front end of the body 1, where the access opening 6 is located, while the upper end represents the actual rear end of the body 1, laterally elongated front panels 311,312 are disposed in front of the access opening 6 at the front end of the body 1. The front panels 311,312 extend parallel to each other and are arranged one above the other. Each lateral end of the front panel 311 is attached to the body 1 with a roller bracket 313, while each lateral end of the front panel 312 is attached to the body 1 with a roller bracket 314.

A laterally elongated disk insertion/removal opening 315 dedicated to one of the trays is formed above the upper front panel 311 so that a CD may be inserted in or removed from the disk insertion/removal opening 315. Another laterally elongated opening for insertion and removal of a CD is formed between the upper front panel 311 and the lower front panel 312. This opening is referred to as the common disk insertion/removal opening 316 and shared by a plurality of trays. The single-tray disk insertion/removal opening 315 is dedicated to insertion and removal of a CD into and from the fifth tray 11 from the bottom, while the common disk insertion/removal opening 316 is used for insertion and removal of a CD into and from the first through the fourth trays 11. The retracted positions of the single-tray disk insertion/removal opening 315 and the common disk insertion/removal opening 316 are respectively referred to as the exclusive loading position and the common loading position at which a CD is loaded on a tray 11.

The fifth tray 11 from the bottom is adapted to be moved by the aforementioned selector mechanism 81 and the carrier mechanism 82 to the loading position corresponding to the single-tray disk insertion/removal opening 315. Any tray 11 selected from among the first through the fourth trays 11 is moved to the loading position corresponding to the common disk insertion/removal opening 316 by the selector mechanism 81 and the carrier mechanism 82 described above.

A pair of laterally arranged resin guide plates 317 are attached to the front end of each front panel 311,312 in such a manner that the top edges of the guide plates 317 is fitted over the top edge of the front panel 311,312 and thus cover the top edge of the front panel. A supporting shaft portion 318 adapted to support a shutter described later is formed on the front face of each right guide plate 317.

The single-tray disk insertion/removal opening 315 and the common disk insertion/removal opening 316 are respectively provided with a single-tray loading mechanism 319 and a common loading mechanism 320, each one of which is adapted to place a CD on the tray 11 located at each respective loading position. Each loading mechanism 319, 320 includes a pair of rollers 321,322 extending along the lower end of each respective disk insertion/removal opening 315,316 and a pair of holding members 323,324 extending along the upper end of each respective disk insertion/removal opening 315,316. The rollers 321 and the holding members 323 are associated with the loading mechanism 319, while the rollers 322 and the holding members 324 are associated with the loading mechanism 320. The two rollers that comprise each pair of rollers 321,322 are spaced apart, respectively to the two lateral sides of the corresponding disk insertion/removal opening 315,316, and the two members that comprise each pair of holding members 323,324, too, are spaced apart and arranged respectively to the two lateral sides of the corresponding disk insertion/removal opening 315,316.

The shaft portion of each roller 321,322 is rotatably supported between a mounting tab 311a,312a and a roller bracket 313,314. Each mounting tab 311a,312a is formed by bending a portion of the front panel 311,312. An elastic roller member which is made of rubber or the like is fitted around the outer cylindrical surface of each roller 321,322. The shaft of each roller 321,321 passes through the corresponding roller bracket 313,314, and a gear 325,326 is fastened to the outer end of each shaft. An interlocked shaft 328 is disposed above the single-tray disk insertion/removal opening 315 and rotatably supported at both ends by the roller brackets 313, which are respectively located at the two lateral ends of the interlocked shaft 328. A gear 327 engaged with the gear 325 at the corresponding side is fastened to each lateral end of the interlocked shaft 328. A gear 329 engaged with the gears 325,326 that are located at the left side is disposed between these two gears 325,326 and rotatably supported by a shaft. Therefore, when the driving force is transmitted from a loading transmission mechanism described later to the left gears 325,326, all the rollers 321,322 are rotated together with these gears.

The holding members 323,324 may be made of resin. The front portion and the rear portion of the underside of each holding member 323 facing the roller 321 located at the same side are formed into slanted faces 323a in order to guide a CD between the roller 321 and the holding member 323. In the same manner, slanted faces 324a are respectively formed on the front portion and the rear portion of the underside of each holding member 324 so as to guide a CD between the corresponding roller 322 and the holding member 324. A contact point 323b is formed on the underside of each holding member 323, while a contact point 324b is formed on the underside of each holding member 324. Therefore, when a CD is sandwiched between the rollers 321 and the holding members 323 or between the rollers 322 and the holding members 324, the holding members 323 (or 324) are in contact with the CD at two locations, i.e. the contact points 323b (or 324b). By thus providing each pair of holding members 323,324 with two contact points 323b, 324b, the embodiment enables the holding members 323, 324 to securely hold a CD between the holding members 323,324 and the rollers 321,322 and also reduces the contact resistance.

The holding members 323,324 are flexibly supported by plate springs 330, 331 serving as flexible supporting means so that the distance from the rollers 321,322 does not exceed the thickness of a CD. Each plate spring 330 has a shape of a flat plate and is attached to the body 1 at both lateral ends, while the middle portion of the spring 330 is attached to the single-tray holding member 323, thereby supporting the single-tray holding member 323 in such a manner that the holding member 323 is capable of swinging up and down. Each plate spring 331 has an L-shaped cross section. While the upper end of each plate 331 is attached to the back of the upper front panel 311, the lower end of the spring 331 is attached to the common holding member 324, thereby supporting the common holding member 324 in such a manner that the holding member 324 is capable of swinging up and down.

A single-tray shutter 332 and a common shutter 333 are respectively disposed in front of the two right guide plates 317 and supported by the supporting shaft portions 318 of the respective guide plates 317 in such a manner that the shutters 332,333 are capable of swinging. A shutter portion 332a,333a is formed at an end of each shutter 332,333 so that the central portion of each disk insertion/removal opening 315,316 can be closed or opened. A protruding portion 332b,333b is formed at the other end of each shutter 332,333 and protrudes therefrom.

A vertically extending holding roller 334 is disposed behind the loading mechanisms 319,320, to the left side thereof and serves as a holding means for pulling a CD to a specified position on a tray 11 when the CD is transported to a tray 11 by the loading mechanism 319 or the loading mechanism 320. The holding roller 334 has a length corresponding to the total vertical range along which the trays 11 are permitted to move when they are elevated or lowered. The holding roller 334 is rotatably supported by a holding arm 336, which is disposed on the body 1 and supported by a supporting shaft 335 in such a manner as to be capable of swinging. A spring (not shown) applies constant force to the holding arm 336 in such a direction as to rotate the holding arm 336 counterclockwise as viewed in FIG. 3. When a CD is inserted or removed, the holding roller 334 is pushed to the left against the constant force, thereby permitting the CD to be inserted or removed.

A pair of sensors 337 for detecting a CD inserted or removed through the disk insertion/removal opening 315 or 316 are disposed behind each loading mechanism 319,320. Each sensor 337, which may be an optical sensor, is disposed at a location to each lateral side of the loading mechanism.

As shown in FIGS. 4 and 5, a base plate 341 is attached to the body 1, at a location to the right side of the body 1. A loading motor 342 is mounted on the base plate 341, and a worm gear is attached to the driving shaft of the loading motor 342.

A loading transmission mechanism 344 for transmitting the driving force from the loading motor 342 to the loading mechanisms 319,320 is mounted on the base plate 341, at a location closer to the front end than is the loading motor 342. The loading transmission mechanism 344 is formed of gear trains 345, each of which consists of a plurality of gears arranged continuously. The loading transmission mechanism 344 is designed such that torque from the worm gear 343 is transmitted through the gear trains 345 to the gears 325,326 of the loading mechanisms 319,320, thereby rotating the gears 325,326 in the same direction.

A single-tray slide link 346 and a common slide link 347 are attached to the right side of the top of the body 1 in such a manner as to be capable of moving back and forth. Each slide link 346,347 has a bent portion 346a,347a, which is formed by bending the front end of the slide link toward the outer edge of the base plate 341. A cam groove 346b,347b is formed in each bent portion 346a,347a. The rear end of each slide link 346,347 is bent toward the base plate 341 and provided with a catching groove 346c,347c. A laterally elongated hole 346d,347d is formed near the rear end of each slide link 346,347. The advanced position, where each slide link has been moved forward as shown in FIG. 5, is referred to as the standby position, i.e. the loading-completed position or the playback position, of the slide link.

A single-tray shutter link 348 and a common shutter link 349 are attached to the front portion of the outer side face of the base plate 341 through supporting shafts 350,351 in such a manner as to be capable of respectively swinging around the supporting shafts 350,351. A catching groove 348a,349a is formed at the front end of each shutter link 348,349, while a pin 348,349b protrudes is formed near the rear end of each shutter link 348,349. The catching groove 348a is adapted to engage the aforementioned protruding portion 332b of the shutter 332 dedicated to a single tray, and the catching groove 349a is adapted to engage the protruding portion 333b of the common shutter 333. The pins 348,349b are adapted to be respectively engaged in the cam grooves 346b,347b. Each shutter link 348,349 is connected to a spring (not shown) which is adapted to apply constant force to the shutter link associated therewith in such a direction as to bias the shutter link counterclockwise as viewed in FIG. 4. Therefore, in the state where the shutter links 348,349 is rotated counterclockwise as viewed in FIG. 4, the shutters 332,333 is rotated clockwise as viewed in FIG. 2 and locked at the closed state.

Ejecting arms 352,353, which are adapted to respectively serve as a single-tray ejecting means and a common ejecting means, are disposed on the top of the body 1, in the right-rear portion thereof, and respectively supported by supporting shafts 354,355 in such a manner as to be capable of swinging around the supporting shafts 354,355. Each ejecting arm 352,353 has a pushing portion 352a,353a and a pin 352b, 353b. The pushing portions 352a,353a are adapted to come into contact with the rear ends of CDs respectively located at the exclusive loading position and the common loading position and push said CDs. The pins 352b,353b are respectively adapted to be engaged in the elongated holes 346d, 347d of the slide links 346,347.

When the slide links 346,347 are at the front position, i.e. the standby position as shown in FIG. 5, the pushing portion 352a,353a of each ejecting arm 352,353 is at the retracted position, at a distance from the rear end of the corresponding CD. When the slide links 346,347 move rearward from the standby position, the pushing portion 352a,353a of each ejecting arm 352,353 comes into contact with the rear end of the corresponding CD and push it forward.

Figure 7:
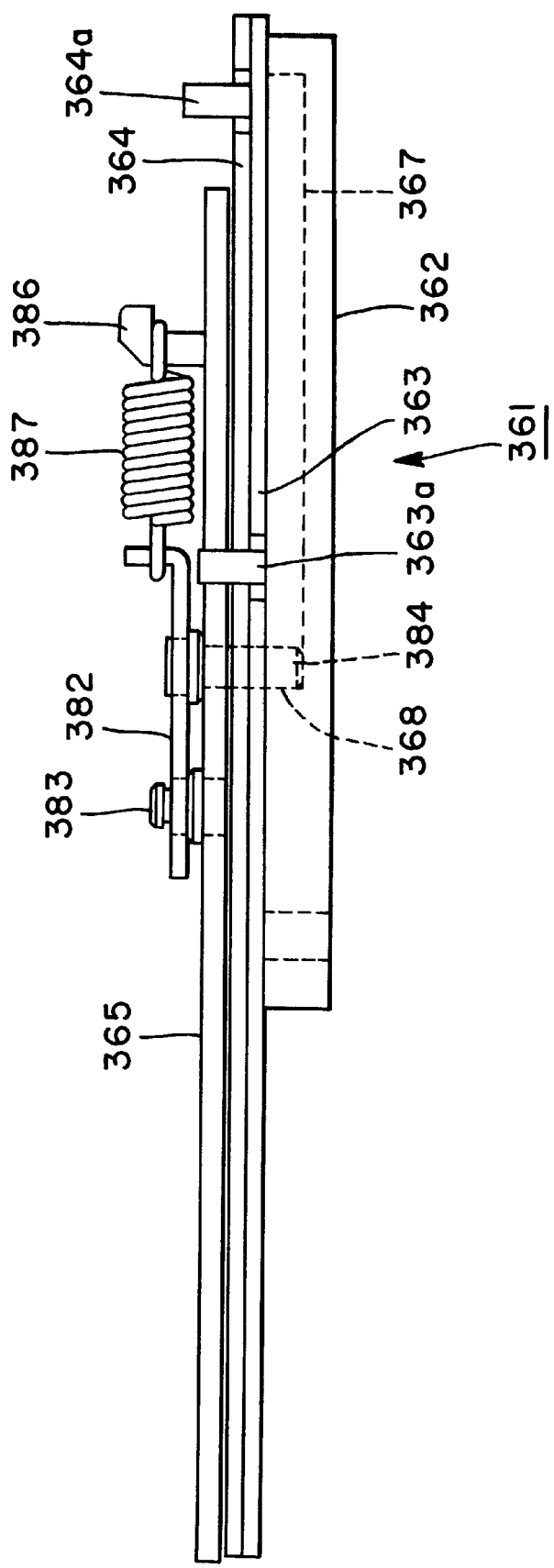
FIG. 7 is an enlarged top view of a part of said disk driving apparatus.

A selective transmission mechanism 361 for selectively transmitting driving force from the loading motor 342 to either the single-tray slide link 346 or the common slide link 347 is attached to the rear portion of the inner side face of the base plate 341. As shown in FIGS. 6 through 8, wherein the front part of the body 1 is shown to the left as viewed in the drawings while the rear part of the body 1 is shown to the right, the selective transmission mechanism 361 includes a cam plate 362, a common slide plate 363, a single-tray slide plate 364 and a rack plate 365, all of which are integrally affixed to the inner side surface of the base plate 341 with a pair of fasteners 366, which may be screws or other appropriate means.

The cam plate 362 is immovably attached to the base plate with the fasteners 366 and has a cam groove 367, which is formed in the side facing the slide plate 363 and open toward the slide plate 363. The cam groove 367 has a standby portion 368, a guide portion 369, a single-tray groove portion 370 and a common groove portion 371. The standby portion 368 is formed at the front end of the cam groove 367 and adapted to catch a cam pin (described later); the guide portion 369 is formed behind the standby portion 368 and adapted to guide the cam pin downward; and the groove portions 370,371 are formed behind the guide portion 369 in such a manner as to extend parallel to each other and arranged one above the other.

Figure 8A:
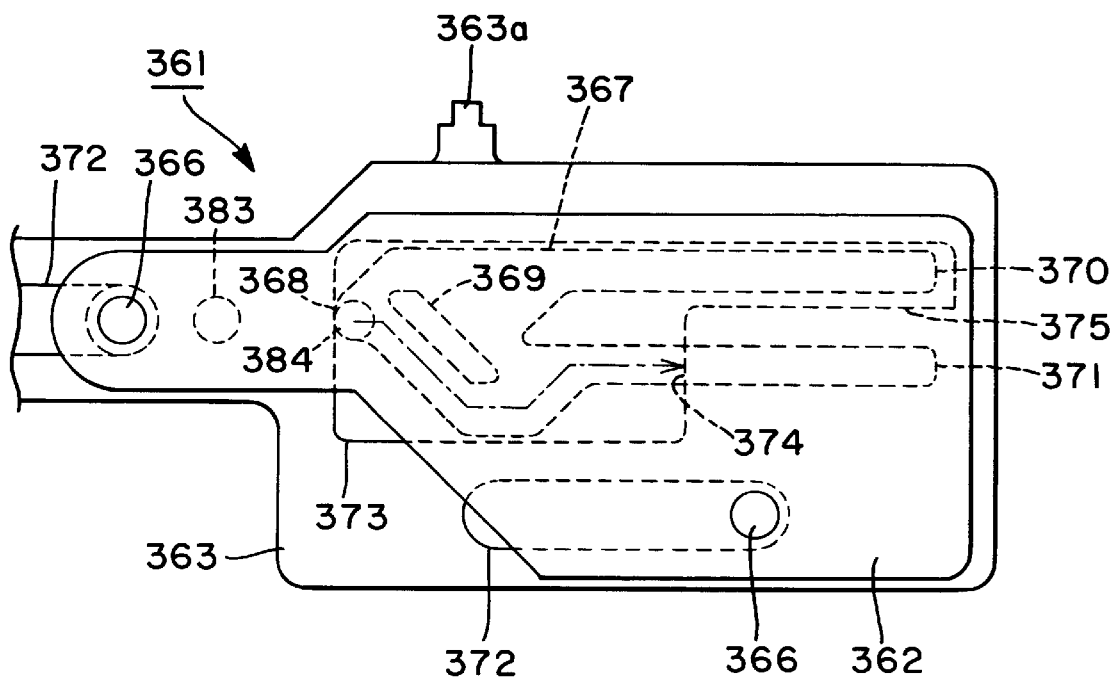

As shown in FIG. 8(a), elongated holes 372 adapted to permit the fasteners 366 to be engaged therein are formed in the common slide plate 363 so that the common slide plate 363 attached to the base plate 341 is capable of moving back and forth. The common slide plate 363 is also provided with a cam groove 373, which is formed at the location corresponding to the cam groove 367 of the cam plate 362. The front end of the cam groove 373 extends as far as the location corresponding to the standby portion 368. The rear part of the cam groove 373 has a catching edge portion 374 and a release groove portion 375. The catching edge portion 374 is formed at a location corresponding to the approximate midpoint of the common groove portion 371, while the release groove portion 375 extends in such a manner as to cover the entire single-tray groove portion 370. A protrusion 363a adapted to be engaged in the catching groove 347c of the common slide link 347 is formed on the upper end of the slide plate 363.

Figure 8B:
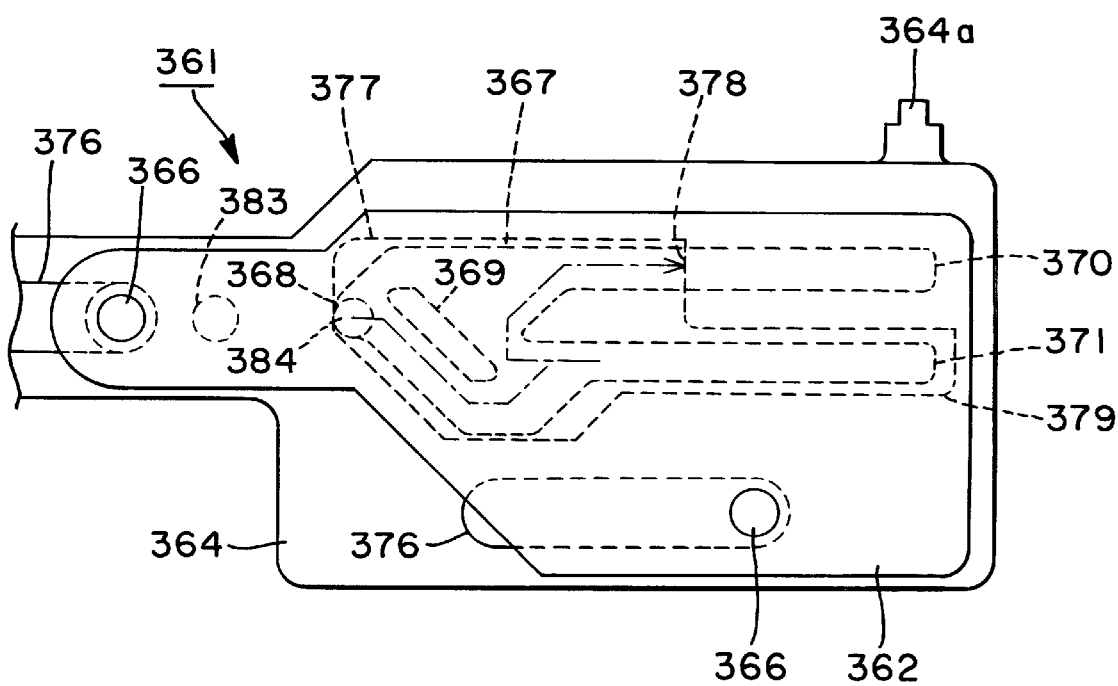

As shown in FIG. 8(b), elongated holes 376 adapted to permit the fasteners 366 to be engaged therein are formed in the single-tray slide plate 364 so that the single-tray slide plate 364 attached to the base plate 341 is capable of moving back and forth. The single-tray slide plate 364 is also provided with a cam groove 377, which is formed at the location corresponding to the cam groove 367 of the cam plate 362. The front end of the cam groove 377 extends as far as the location corresponding to the standby portion 368. The rear part of the cam groove 377 has a catching edge portion 378 and a release groove portion 379. The catching edge portion 378 is formed at a location corresponding to the approximate midpoint of the single-tray groove portion 370, while the release groove portion 379 extends in such a manner as to cover the entire common groove portion 371. A protrusion 364a adapted to be engaged in the catching groove 346c of the single-tray slide link 346 is formed on the upper end of the slide plate 364.

As shown in FIG. 6, elongated holes 380 adapted to permit the fasteners 366 to be engaged therein are formed in the rack plate 365 so that the rack plate 365 attached to the base plate 341 is capable of moving back and forth. A rack 381 is formed on the bottom edge of the rack plate 365. As shown in FIGS. 6 and 7, the front end of a lever 382 is attached to the side face of the rack plate 365 with a supporting shaft 383 so that the lever 382 is capable of swinging. A cam pin 384 is attached to the approximate middle of the lever 382. The cam pin passes through a curved elongated hole 385 of the rack plate 365 and cam grooves 373,377 of the slide plates 363,364 and is engaged in the cam groove 367 of the cam plate 362. Said elongated hole 385 is formed in the rack plate 365 in such a manner that the two parallel sides of the elongated hole 385 are in the shape of concentric arcs with the supporting shaft 383 at the center. A hook portion 386 is formed by making cuts in the rack plate 365 and bending the cut portion. A spring 387 is extended between the rear end of the lever 382 and the hook portion 386 and applies tension between the lever 382 and the hook portion 386. Although the cam pin 384 is capable of swinging up and down around the supporting shaft 383 of the lever 382, it is normally held at the neutral position shown in FIG. 6 by the tensile force of the spring 387.

A gear 388 and a gear device 389 are disposed below the rack plates 365 and other associated members and rotatably attached to the inner surface of the base plate 341 with shafts. The gear 388 is adapted to receive the driving force from the worm gear 343 of the loading motor 342 through a plurality of gears (not shown), while the gear device 389 is adapted to receive the driving force from this gear 388. The gear 388 and the gear device 389 constitute a part of the selective transmission mechanism 361.

The gear 388 has a large diameter gear portion 388a and a small diameter gear portion 388b. The gear device 389 has a gear 390, which is adapted to engage with the large diameter gear portion 388a, and a gear 391 having a pinion portion 391a and a cutout gear portion 391b. The pinion portion 391a is adapted to engage with the rack 381 of the rack plate 365, while the cutout gear portion 391b is adapted to engage with the small diameter gear portion 388b. A clutch mechanism (not shown) for transmitting driving force by means of frictional contact is disposed between the gears 390,391. A catching protrusion 391 adapted to come into contact with a stopper 392 of the base plate 341 is formed on the gear 391. Gear teeth of the cutout gear portion 391b are formed on the area that covers a 270° arc out of the entire outer edge of the cutout gear portion 391b, while a portion corresponding to a portion that includes a 90° arc is cut away.

When the slide plates 363,364 and the rack plate 365 of the selective transmission mechanism 361 are in the advance state as shown in FIG. 6, they are at the standby position. When the gear 391 of the selective transmission mechanism 361 is at the standby position, the cutout gear portion 391b of the gear 391 is not engaged with the small diameter gear portion 388b of the gear 388. Although detailed explanation will be given later, it is to be noted that the function of the selective transmission mechanism 361 is to move either the single-tray slide link 346 or the common slide link 347 forward or rearward by moving the corresponding slide plate, i.e. the common slide plate 363 or the single-tray slide plate 364, forward or rearward.

The CD changer is adapted to be controlled by a control device (not shown). The control device is connected to an operation unit (not shown), which includes switches for designating a tray 11 targeted for setting or ejection of a CD.

Next, the function of the present embodiment is explained hereunder.

First, how a CD is set or ejected through the common disk insertion/removal opening 316 is explained.

Using the operation unit (not shown), select a tray 11 desired to be loaded with a CD from among the first through the fourth trays 11 from the bottom.

If the tray 11 located at the fourth level from the bottom is designated, the designated tray 11, which is located at the fourth level from the bottom, is transferred to the common loading position behind the common disk insertion/removal opening 316 as shown in FIG. 1. The transfer of the tray 11 to the loading position is done by the selector mechanism 81 and the carrier mechanism 82. The function of transferring a tray 11 by the selector mechanism 81 and the carrier mechanism 82 is explained later, in the explanation of playback of a CD.

After the transfer of the designated tray 11 to the common loading position, the loading motor 342 is rotated in a given direction, i.e. the direction to perform ejection. As a result, by means of the aforementioned clutch between the gear 390 and the gear 391, the gear 388, the gear 390 and the gear 391 are rotated, in the directions respectively represented by arrows in FIG. 6 so that the cutout gear portion 391b of the gear 391 comes into engagement with the small diameter gear portion 388b of the gear 388. Therefore, the gear 391 becomes directly connected to the driving system of the loading motor 342, and the rack plate 365 is moved rearward by rotation of the gear 391.

When the rack plate 365 is moved rearward (See FIG. 8(a)), the cam pin 384 engaged in the cam groove 367 of the cam plate 362 moves rearward while being guided downward from the standby portion 368 of the cam groove 367 by means of the guide portion 369. The cam pin 384 continues to move into the lower groove portion 371 and comes into contact with the catching edge portion 374 and pushes it, thereby moving the common slide plate 363 rearward.

As a result of the rearward movement of the common slide plate 363, the common slide link 347 is moved rearward as shown in FIGS. 4 and 5, and the common shutter link 349 is rotated around the supporting shaft 351 clockwise as viewed in FIG. 4. In addition, as shown in FIG. 2, the common shutter 333 is rotated around the supporting shaft portions 318 in such a direction as to be opened, i.e. counterclockwise as viewed in the drawing, so that the shutter portion 333a of the common shutter 333 descends and thus opens the common disk insertion/removal opening 316.

When the common slide link 347 is moved rearward as shown in FIGS. 4 and 5, the common ejecting arm is rotated around the supporting shaft 355 counterclockwise as viewed in FIG. 5. Therefore, in cases where the designated tray 11 is already loaded with another CD, the pushing portion 353a of the common ejecting arm 353 pushes the rear end of the CD and moves the CD forward so that the front end of the CD is inserted between the rollers 322 and the holding members 324 of the common loading mechanism 320.

By that time, the driving force of the loading motor 342 rotating in such a direction as to eject the CD has been transmitted through the loading transmission mechanism 344 to the common loading mechanism 320 and rotated the rollers 322 in the ejecting direction. Therefore, the CD inserted between the rollers 322 and the holding members 324 is moved forward and ejected through the common disk insertion/removal opening 316, of which the common shutter 333 has been opened.

When the gear 391 has been rotated approximately 270 degrees in the state shown in FIG. 6, the cutout gear portion 391b of the gear 391 becomes disengaged from the small diameter gear portion 388b of the gear 388, and the catching protrusion 391c of the gear 391 comes into contact with the stopper 392. Therefore, although the gear 388 continues to be rotated, the gear 391 stops rotating, because the clutch between the gear 390 and the gear 391 slips. As the gear 391 stops rotating, the rearward movement of the common slide plate 363 and the common slide link 347 stops. By the time the gear device 389 stops rotating, the opening of the common shutter 333 and the pushing of the CD by the ejecting arm 353 are completed. However, the loading mechanism 320 is still in the course of ejecting the CD.

Even after the gear device 389 stops rotating, the loading motor 342 continues to rotate so that the loading mechanism 320 continues to eject the CD. When the CD reaches the location where the CD protrudes from the common disk insertion/removal opening 316 by a given distance in the state where it is still sandwiched between the rollers 322 and the holding members 324, the loading motor 342 comes to a standstill.

When the CD ejected from the common disk insertion/removal opening 316 is removed from between the rollers 322 and the holding members 324, the disk driving apparatus is put into the CD-loadable mode, where it is ready to accept a CD. In the loadable mode, the disk driving apparatus is on standby with is the common disk insertion/removal opening 316 open.

Then (see FIGS. 2 and 3), the CD to be set in the apparatus is inserted through the common disk insertion/removal opening 316 into the space between the rollers 322 and the holding members 324. When rays of light projected toward the two sensors 337 associated with the disk insertion/removal opening 316 are interrupted at nearly the same time by the CD, the loading motor 342 is rotated in the loading direction, i.e. the direction opposite the ejecting direction.

As a result of the rotation of the loading motor 342 in the loading direction, the driving force is transmitted from the loading motor 342 through the loading transmission mechanism 344 to the common loading mechanism 320 and rotates the rollers 322 in the loading direction so that the CD inserted between the rollers 322 and the holding members 324 begins to be set on the tray 11 at the loading position as it is pulled into the common disk insertion/removal opening 316. At that time, the left end of the CD comes into contact with the holding roller 334 and pushes the holding roller 334 to the left against the constant force applied to the roller 334, while the CD is being set.

When the front end of the CD that is being inserted reaches a point behind the space between the rollers 322 and the holding members 324, the CD becomes free on the tray 11. Then, the holding roller 334, which has gone around the CD to a location in front of the front end of the CD, forces the CD to move rearward onto a home position on the tray 11.

As a result of the rotation of the loading motor 342 in the loading direction as shown in FIG. 6, the gear 388, the gear 390 and the gear 391 (which is rotated by the action of the aforementioned clutch) in the directions opposite the directions that are respectively represented by arrows in FIG. 6 so that the cutout gear portion 391b of the gear 391 comes into engagement with the small diameter gear portion 388b of the gear 388. Therefore, the gear 391 becomes directly connected to the driving system of the loading motor 342, and the rack plate 365 is moved forward by rotation of the gear 391.

When the rack plate 365 is moved forward (See FIG. 8(a)), the cam pin 384 engaged in the lower groove portion 371 of the cam plate 362 is moved forward and returned via the portion above the guide portion 369 to the initial standby position, where the cam pin 384 is engaged with the standby portion 368. The constant force of the spring (not shown) that is attached to the shutter link 349 is transmitted through the slide link 347 so that the common slide plate 363, which has been released from the rearward pushing force applied by the cam pin 384, moves forward.

As a result of the forward movement of the slide link 347 (See FIGS. 4 and 5), the ejecting arm 353 is moved rearward so as to be separated from the CD, and the common shutter 333 is rotated by the action of the shutter link 349 in such a direction as to be closed so that the shutter portion 333a of the common shutter 333 is elevated and thus closes the common disk insertion/removal opening 316. Before the common disk insertion/removal opening 316 is closed, the CD has been set at the home position on the tray 11.

When the gear 391 has been rotated approximately 270 degrees, the cutout gear portion 391b of the gear 391 becomes disengaged from the small diameter gear portion 388b of the gear 388 as shown in FIG. 6, and the catching protrusion 391c of the gear 391 comes into contact with the stopper 392. The loading motor 342 then comes to a standstill.

Thereafter, the tray 11 is returned to a given standby position by the carrier mechanism 82, and the disk driving apparatus is put into either the standby mode for CD playback or the CD playback mode.

Next, how a CD is set or ejected through the single-tray disk insertion/removal opening 315 is explained. As the procedures are similar to those of insertion and ejection of a CD through the common disk insertion/removal opening 316 described above, the explanation is given only of the steps different from those described above.

Using the operation unit (not shown), designate the tray 11 which is located at the fifth level from the bottom and onto which a CD is desired to be set through single-tray disk insertion/removal opening 315.

As shown in FIG. 1, the designated fifth tray 11 from the bottom is transferred to the exclusive loading position, which is located behind the single-tray disk insertion/removal opening 315. In cases where the home position of the fifth tray 11 from the bottom is the exclusive loading position, the fifth tray 11 will not be moved.

When the loading motor 342 is rotated in the ejecting direction, the rack plate 365 is moved rearward as shown in FIG. 8(b) so that the cam pin 384 engaged in the cam groove 367 of the cam plate 362 moves rearward while being guided downward from the standby portion 368 of the cam groove 367 by means of the guide portion 369. The cam pin 384 continues to move and enters, only by a short distance, the entrance of the lower groove portion 371. At that time, the loading motor 342 is put on pause.

Thereafter, the loading motor 342 is rotated in the opposite direction, i.e. the loading direction, by a given degree so that the rack plate 365 moves forward and that the cam pin 384 moves forward from the entrance of the common groove portion 371. As the lever 382, to which the cam pin 384 is attached, is at the neutral position because of the constant force applied from the spring 387, the cam pin 384 moves upward from a location behind the guide portion 369.

Thereafter, the loading motor 342 is rotated again in the ejecting direction so that the cam pin 384 enters the upper groove portion 370 dedicated to a single tray and comes into contact with the catching edge portion 378 and pushes the catching edge portion 378, thereby moving the single-tray slide plate 364 rearward. At that time, the common slide plate 363 remains at the standby position.

Loading and ejection of a CD through the disk insertion/removal opening 315 is conducted by single-tray components including the single-tray loading mechanism 319, the shutter 332, the slide link 346, the shutter link 348 and the ejecting arm 352, in the same manner as loading and ejection of a CD through the common disk insertion/removal opening 316 described above.

Next, playback of a CD is explained hereunder.

Playback of a CD is explained in four parts: the selecting function of the selector mechanism 81, and the transfer function of the carrier mechanism 82 in the initial stage, the middle stage and the late stage of rotation of the cam disk 152.

First, explanation is given of the selecting function of the selector mechanism 81.

When the tray 11 that is loaded with a CD to be played is selected by means of the operation unit (not shown), the selector mechanism 81 is actuated to drive the selecting motor 139 so that the selecting plate 121 is moved to the selection position.

As a result of the transfer of the selecting plate 121 to the selection position, the selector plate 12 is either elevated or lowered to the selection position by the function of the cam groove 124 of the selecting plate 121 so that the driving arm unit 15 and other components mounted on the selector plate 12 are moved to the respective selection positions corresponding to the tray 11 that has been selected.

The transfer of the selecting plate 121 to the selection position also causes the holding lever 126 to move the interlocking plate 86 forward or rearward. As a result of the movement of the interlocking plate 86, the operating members 85 are moved upward or downward to their respective selection positions by means of the interlocking levers 87 as shown in FIG. 13.

As another result of the transfer of the selecting plate 121 to the selection position, the holding pin 127 of the holding lever 126 is moved, as shown in FIGS. 11 and 12, in the selecting groove 172 of the holding slot unit 171 to one of the selection positions that respectively correspond to the holding slots 173.

In short, the selector mechanism 81 vertically moves the selector plate 12, components mounted on the selector plate 12, such as the driving arm unit 15, and the operating members 85 together to their respective selection positions for playing the CD that is set on the selected tray 11.

FIGS. 11, 12 and 13 show the selection positions of the components corresponding to a case where the second tray 11 from the bottom is chosen, wherein the entrance of the guide groove 102 of each operating member 85 is at the same height as the guide rollers 28 of the second tray 11 from the bottom, and the holding pin 127 is positioned at the entrance of the second holding slot 173 from the end of the holding slot unit 171.

Next, the transfer action conducted by the carrier mechanism 82 for playback in the initial stage of the rotation of the cam disk 152 is explained.

As shown in FIGS. 11 and 12, the carrier mechanism 82 is actuated after the operation of the selector mechanism 81 so that the carrier motor 160 is driven to rotate the cam disk 152, which is at the standby position shown in FIG. 11, clockwise as viewed in FIG. 11.

As a result of the rotation of the cam disk 152 from the standby state, the movable plate 84 is moved forward by the function of the cam groove 153 and the cam lever 156.

As the movable plate 84 is moved forward, the holding pin 127 of the holding lever 126 enters the appropriate holding slot 173 of the holding slot unit 171 so that the selector mechanism 81 is held at the selection position.

Together with the movable plate 84 moving forward, the operating member 85 are moved forward from their standby position shown in FIG. 13 so that the guide rollers 28 of the bottommost tray 11 become caught in the gaps 105 and are guided downward and that the bottommost tray 11 is lowered. Thus, a driving space is formed under the second tray 11 from the bottom. The guide rollers 28 of the second tray 11 from the bottom become caught in the guide grooves 102 of the operating members 85 and are guided downward so that the second tray 11 from the bottom is slightly lowered. The guide rollers 28 of the third tray 11 from the bottom move onto the operating members 85, thereby preventing the trays 11 located above the second tray 11 from the bottom from moving downward.

Next, the transfer action conducted by the carrier mechanism 82 for playback in the middle stage of the rotation of the cam disk 152 is explained.

When the cam disk 152 is at the standby position shown in FIG. 11, the slide plate 215 is at its standby position shown in FIG. 11, where it has slid to the left. As a result of the cam disk 152 rotating from the standby position clockwise as viewed in FIG. 11, the slide plate 215 is slid to the right as shown in FIG. 12 by the function of the cam groove 153 and the cam lever 212.

When the operating plate 198 is at the standby position shown in FIG. 16 as a result of sliding to the left together with the slide plate 215 the changeover plate 184, too, is at the standby position, i.e. the retracted position. When the operating plate 198 is slid to the right from the standby position together with the slide plate 215, the sliding force is transmitted through the first, second and third links 192,193,199 to the changeover plate 184, thereby moving the changeover plate 184 straight forward as shown in FIG. 17.

When the changeover plate 184 is at the standby position shown in FIG. 16, the swinging arm 181 of the driving arm unit 15 is at the standby position, behind the tray 11 at a distance from the interior of the tray 11. As a result of the changeover plate 184 moving forward from the standby position, the swinging arm 181 is swung forward into the tray 11 by the function of the cam groove 183 and the cam pin 185. Thus, the swinging arm 181 is moved to the driving position shown in FIG. 17.

Next, the transfer action conducted by the carrier mechanism 82 for playback in the late stage of the rotation of the cam disk 152 is explained.

As shown in FIG. 15, the guide rollers 28 of the second tray 11 from the bottom are moved downward from the first grooves 102 of the operating members 85 into the second grooves 104 so that the second tray 11 from the bottom is moved further downward. The CD set on the second tray 11 from the bottom is transferred onto the turn table 223 of the driving arm unit 15 at the driving position, and the second tray 11 from the bottom is lowered further so as to be moved to a location under the CD, at a distance therefrom.

At that time, the receiving plate 274 on the swinging arm 181 is at the standby position, i.e. a position closer to the arm shaft 182 at the base end of the swinging arm 181 as shown in FIG. 21. By the action of the connecting pin 304 of the receiving plate 274, the chucking lever 298 has been rotated clockwise to the position represented by the two-dot chain lines in FIG. 22, and the chucking lever 298 has moved onto the pushing-up portions 302 and moved upward with its catching holes 301 separated from the pushing-up portions 302 so that the leg portions 296 of the confining member 293 have been pushed upward by the chucking lever 298. Thus, the balls 292 are in such a state that they are permitted to retreat into the boss 282.

Therefore, when the CD on the second tray 11 from the bottom is transferred onto the turn table 223 of the driving arm 15 at the driving position, the CD is carried to a position where its underside rests on the seating portion 281 and the boss 282 is fitted in the center hole of the CD.

When the changeover plate 184 is moved to the playback position shown in FIG. 18, the receiving plate 274 is slid toward the furthermost end of the swinging arm 181 by the action of the cam pin 185 so that the chucking lever 298 is rotated by the connecting pin 304 of the receiving plate 274 from the position represented by the two-dot chain lines in FIG. 22 to the position represented by the solid lines. As a result, the catching holes 301 of the chucking lever 298 are aligned with the pushing-up portions 302, and the chucking lever 298 moves downward and releases the confining member 293 from the upward pushing force so that the constant force applied from the spring 294 to the balls 292 through the confining member 293 causes the three balls 292 to protrude from the outer wall of the boss 282 and come into contact with the upper end of the center hole of a CD and that the CD is chucked on the turn table 223.

Until the CD is chucked on the turn table 223, the cam protrusions 268,269 of the changeover plate 184 are positioned behind the respective passive rollers 258, 266, with some distance between each cam protrusion and the passive roller corresponding thereto as shown by solid lines in FIGS. 19 and 20 so that the constant force applied by the springs 259,267 through the restraining levers 254,262 pushes the receiving portions 233,234 of the supporting arm 230 downward and that the supporting arm 230 is held at the home position with the vibration-isolating supporting means 236a, 236b being restrained from supporting the ends of the supporting arm 230.

When the changeover plate 184 is moved forward to the playback position shown in FIG. 18 in the state described above, the passive rollers 258,266 respectively come into contact with the upper ends of the cam protrusions 268,269, and the passive levers 255,263 and the restraining levers 254,262 are respectively rotated to the positions represented by two-dot chain lines, against the constant force of the springs 259,267. As the upward movement of the catching portions 257,265 of the restraining levers 254,262 releases the receiving portions 233,234 of the supporting arm 230 from the downward pushing force, the vibration-isolating supporting means 236a,236b support the two ends of the supporting arm 230 in such a state as to protect the supporting arm 230 from the influence of vibration.

In the same manner as above, until the CD is chucked on the turn table 223, the changeover plate 184 is at its standby position, i.e. the retracted position shown in FIGS. 16 and 21, where the receiving plate 274 is exposed to constant force applied in such a direction as to slide the receiving plate 274 toward the arm shaft 182 at the base end of the swinging arm 181. The engagement of the cam groove 278 of the receiving plate 274 with the cam pin 276 of the restraining lever 272 has rotated the retraining lever 272 clockwise as viewed in FIG. 21 to the position represented by solid lines in FIG. 21 so that the furthermost end of the driving arm 221 is exposed to the downward pushing force applied from the retraining lever 272 through the restraining stud 273. As a result, the driving arm 221 is held at its home position with the vibration-isolating supporting means 236c being restrained from supporting the end of the driving arm 221.

When the changeover plate 184 is moved forward to the playback position shown in FIG. 18 in this state, the cam pin 185 pushes the receiving plate 274 toward the furthermost end of the swinging plate 181, and the engagement of the cam groove 278 of the receiving plate 274 with the cam pin 276 of the restraining lever 272 rotates the retraining lever 272 counterclockwise as viewed in FIG. 21 to the position represented by tow-dot chain lines in FIG. 21. As a result, the driving arm 221 is released from the downward pushing force of the retraining lever 272 so that the vibration-isolating supporting means 236c supports the end of the driving arm 221 in such a state as to protect the driving arm 221 from the influence of vibration.

At the point when the CD is chucked and supported on the turn table 223 in a vibration-proof state, the apparatus becomes ready to play the CD, and the CD rotating motor 224 rotates the CD while the pickup 226 of the head unit 227 performs reading and playback of the CD.

From the CD-playback ready mode, the apparatus may be returned to the standby mode, where the CD on another tray 11 may be played, a CD may be ejected from or set on any tray 11.

The return from the playback ready mode to the standby mode is conducted by reversing the process of switching from the standby mode to the playback ready mode described above. It is explained in three parts: the initial stage, the middle stage and the late stage of reverse rotation of the cam disk 152 by the carrier mechanism 82.

First, the action of the carrier mechanism 82 to return to the standby mode in the initial stage of the reverse rotation of the cam disk 152 is explained hereunder.

The carrier motor 160 is actuated so that the cam disk 152, which is at the playback position shown in FIG. 12, is rotated in reverse, counterclockwise as viewed in FIG. 12.

As a result of the reverse rotation of the cam disk 152, the slide plate 215 and the operating plate 198 shown in FIG. 17 are moved to the left, and the changeover plate 184 is moved straight rearward by the action of the first, second and third links 192,193,199.

As a result of the rearward movement of the changeover plate 184, the receiving plate 274 shown in FIG. 18 is moved toward the arm shaft 182 at the base end of the swinging arm 181 so that the engagement of the cam groove 278 of the receiving plate 274 with the cam pin 276 of the restraining lever 272 causes the retraining lever 272 to rotate clockwise as viewed in FIG. 21 to the position represented by solid lines in FIG. 21 and push the furthermost end of the driving arm 221 downward by the action of the restraining stud 273. As a result, the driving arm 221 is held at its home position with the vibration-isolating supporting means 236c being restrained from supporting the end of the driving arm 221.

As shown in FIGS. 19 and 20, the rearward movement of the changeover plate 184 also causes the cam protrusions 268,269 of the changeover plate 184 to move behind the respective passive rollers 258, 266. Due to the constant force that is applied by the springs 259,267 through the restraining levers 254,262, the receiving portions 233,234 of the supporting arm 230 are pushed downward so that the supporting arm 230 is held at the home position with the vibration-isolating supporting means 236a,236b being restrained from supporting the ends of the supporting arm 230.

When the receiving plate 274 shown in FIG. 18 is moved toward the arm shaft 182 at the base end of the swinging arm 181 as a result of the rearward movement of the changeover plate 184, the chucking lever 298 is rotated clockwise to the position represented by the two-dot chain line in FIG. 22 by the engagement with the connecting pin 304 of the receiving plate 274. As a result, the catching holes 301 of the chucking lever 298 are removed from the pushing-up portions 302, and the chucking lever 298 moves onto the pushing-up portions 302 and is elevated. As being elevated, the chucking lever 298 pushes the leg portions 296 of the confining member 293 upward, thereby permitting the balls 292 to retreat into the boss 282 and releasing the CD from the chucked state.

The operating members 85 are moved rearward together with the changeover plate 184 so that the second tray 11 from the bottom, which is shown in FIG. 15, is elevated with the guide rollers 28 of the second tray 11 from the bottom moved upward from the second grooves 104 into the first grooves 102. When the second tray 11 from the bottom is elevated, the CD on the turn table 223 is transferred onto the tray 11.

Next, the action of the carrier mechanism 82 to return to the standby mode in the middle stage of the reverse rotation of the cam disk 152 is explained.

As a result of the rearward movement of the changeover plate 184, the swinging arm 181 of the driving arm unit 15 is moved rearward by the function of the cam groove 183 and the cam pin 185 so that the swinging arm 181 is retracted from the interior of the tray 11 to the standby position as shown in FIG. 16.

Next, the action of the carrier mechanism 82 to return to the standby mode in the late stage of the reverse rotation of the cam disk 152 is explained.

As a result of the counterclockwise rotation of the cam disk 152 as viewed in FIG. 12, the movable plate 84 is moved rearward by the function of the cam groove 153 and the cam lever 156 so that the movable plate 84 returns to the standby position shown in FIG. 11.

As a result of the rearward movement of the movable plate 84, the guide rollers 28 of the bottommost tray 11 shown in FIG. 14 are guided by the guide tabs 91 of the movable plate 84 to move upward. Thus, the apparatus is returned to the standby mode.

As described above, the invention provides a CD changer which includes a common disk insertion/removal opening 316 to be shared by a plurality of trays 11 and employs a slot-in method that calls for inserting or removing a CD through the disk insertion/removal opening 315 or the disk insertion/removal opening 316. A CD can be set on or removed from any one of the trays 11 through the common disk insertion/removal opening 316. As the common disk insertion/removal opening 316 is shared by a plurality of trays 11, the dimensions of the apparatus can be reduce. As a CD can be inserted or removed at the same position, the apparatus is more convenient to operate. As the apparatus also has a single-tray disk insertion/removal opening 315 dedicated to one of the trays 11, the apparatus is capable of handling a single CD easily. In other words, the invention offers a CD changer that is more convenient to operate by providing a common disk insertion/removal opening 316 and a single-tray disk insertion/removal opening 315 which are arranged along the height of the trays 11.

The embodiment described above is also capable of operating the single-tray loading mechanism 319 and the common loading mechanism 320 by means of a single loading motor 342 and operating either one of the ejecting arms, i.e. the single-tray ejecting arm 352 or the common ejecting arm 353, by using the selective transmission mechanism 361. Furthermore, the embodiment is also capable of opening or closing either one of the shutters, i.e. the single-tray shutter 332 or the common shutter 333, through the selective transmission mechanism 361.

Each loading mechanism 319,320 calls for carrying a CD in such a state that the CD is supported between the rollers 321,322 and the holding members 323,324, which are elastically biased towards the rollers 321,322. Therefore, the thickness of each holding member 323,324 can be set thinner than the minimum diameter of each roller member. Thus, compared with a configuration which calls for supporting a CD by sandwiching it only between a pair of roller members, the thickness of the entire CD changer can be reduced.

The two rollers that comprise each pair of rollers 321,322 are spaced apart, respectively to the two lateral sides of the apparatus, and arranged along an imaginary line extending perpendicular to the loading direction, i.e. the direction in which a disk is carried by the corresponding loading mechanism 319,320, while the two holding members that comprise each pair of holding members 323,324, too, are spaced apart and arranged along an imaginary line extending perpendicular to the loading direction. Therefore, when a CD supported at the home position of a tray 11 is brought close to the position where the outer edge of the CD is located between the laterally arranged rollers 321,322 of the corresponding loading mechanism 319,320 and also between the laterally arranged holding members 323,324 of the corresponding loading mechanism 319,320, the CD may be detached from the rollers 321,322 and the holding members 323,324 so that the CD may be rotated. Thus, the dimension along which a disk is carried can be reduced, compared with a configuration which calls for installing rollers 321,322 and holding members 323,324 at the center in addition to the rollers and the holding members disposed at both sides and, therefore, disposing each roller 321,322 and each holding member 323,324 at a sufficient distance from the edge of the CD.

Furthermore, a CD carried by the loading mechanism 319,320 to a tray 11 can be moved to the home position on the tray 11 and held there by the holding roller 334.

As chucking a CD and releasing a CD from the chucked state can be conducted from the outside of the turn table 223 by means of a chucking device 291 attached to the turn table 223, there is no need of a separate mechanism for holding a CD between the turn table 223 and the holding mechanism.

It is thus possible to simplify the structure and reduce the dimensions of the CD changer. Regarding this point, a conventional CD changer includes a rotatable clamp facing the turn table so that a CD may be chucked by bringing the clamp close to the turn table and sandwiching the CD between the turn table and the clamp. However, such a structure presents problems in that its chucking mechanism is excessively complicated and bulky, because it requires not only the clamp itself but also other components, such as a mechanism to move the clamp.

Although the embodiment described above uses balls 292 as the chucking members of the chucking device 291 for chucking a CD, claw devices may serve for this purpose.

Next, referring to FIGS. 24 through 27, a second embodiment of the invention, wherein claw devices are used as the chucking members of the chucking device 291, is explained hereunder.

As shown in FIGS. 24 and 25, the boss 282 of the turn table 223 is formed in the shape of a cap open at the bottom. Three window holes 401 are arranged in a circle at regular intervals around the outer cylindrical surface of the boss 282.

Figure 27B:
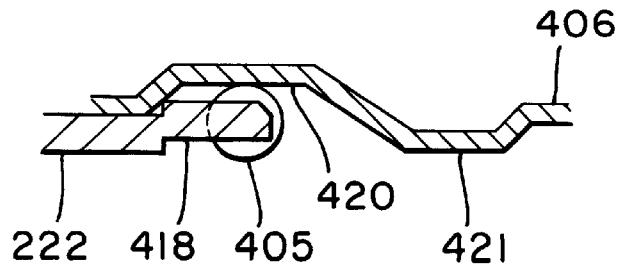

The chucking device 291 includes claw devices 402, a holding member 403, and a spring 404 serving as a biasing means. The claw devices 402 are disposed in the boss 282 and serve as the chucking members. As shown in FIG. 27, the chucking device 291 also has balls 405 disposed on the holding frame 222, an elevating member 406 serving as a releasing means, a chucking lever 407 and a stopper member 408.

As shown in FIG. 26, the claw devices 402 are respectively disposed at three locations in the boss 282. Each claw device 402 is rotatably supported on the turn table 232 by a supporting shaft 411 attached to one end of the claw device 402. A claw 412 adapted to advance or retreat from the outer cylindrical surface of the boss 282 through the corresponding window hole 401 is formed at the other end of each claw device 402, while a slanted portion 413 slanting downward toward the center of the boss 282 is formed at the middle portion of each claw device 402.

The holding member 403 has a catching hole 414 adapted to engage the fastenable member 283 therein in such a manner that the holding member 403 is capable of moving up and down. Three each pushing portions 415 and leg portions 416 are formed on the outer wall of the holding member 403. Each pushing portion 415 is adapted to abut against the slanted portion 413 of the corresponding claw device 402, and each leg portion 416 is adapted to project through the turn table 223 into the space under the turn table 223 in such a manner as to be vertically movable and abutting against the upper surface of the elevating member 406. The spring 404 is disposed on the upper surface of the holding member 403 so as to constantly push the holding member 403 downward from the boss 282.

When the holding member 403 moves downward, its pushing portions 413 push the slanted portions 413 of the claw devices 402 so that the claw devices 402 are pushed outward with the supporting shaft 411 of each claw device 402 serving as its fulcrum and that the claws 412 protrude from the outer cylindrical surface of the boss 282. When the holding member 403 moves upward, the slanted portions 413 of the claw devices 402 are released from the pushing force of the pushing portions 415 so that the claw devices 402 are permitted to retreat into the boss 282.

An opening 417 to accept the bearing portion 224a of the CD rotating motor 224 therein is formed in the holding frame 222. The holding frame 222 is also provided with three ball holding portions 418 adapted to respectively hold the aforementioned balls 405 in such a manner as to permit the balls to rotate. As shown in FIG. 27, the ball holding portions 418 are respectively formed at three locations that are aligned in a circle around the opening 417.

A catching hole 419 is formed in the elevating member 406 and serves to receive the bearing portion 224a of the CD rotating motor 224 therein in such a manner that the elevating member 406 is capable of rotating and moving up and down. Three each recessed portions 420 open at the top and raised portions 421 protruding downward are formed around the catching hole 419 in such a manner that each recessed portion 420 and raised portion 421 paired therewith are arranged side by side and that the three combinations of recessed portions 420 and protruding portions 421 are respectively provided at three locations corresponding to the three balls 405. Furthermore, one each radially extending guide groove 422 are formed at three locations. A catching protrusion 423 is formed along one of the side edges of each guide groove 422 and protrudes outward.

The chucking lever 407 is rotatably supported on the holding frame 222 by a supporting shaft 424. A pin 425 to be engaged in a guide groove 422 of the elevating member 406 protrudes from one end of the chucking lever 407. The other end of the chucking lever 407 is connected to the receiving plate 274 (refer to the first embodiment).

The stopper member 408 is formed in the shape resembling the letter C when viewed from the top and affixed to the top of the holding frame 222. A stopper protrusion 426 adapted to come into contact with and stop the top of each respective catching protrusion 423 when the elevating member 406 reaches the descended position is formed at three locations that surround the inner circumferential edge of the stopper member 408.

With the configuration as above, when the receiving plate 274 rotates the chucking lever 407 clockwise as viewed in FIG. 27 to the position represented by solid lines in FIG. 27, the elevating member 406 is rotated counterclockwise as viewed in FIG. 27. When the recessed portions 420 of the elevating member 406 reach immediately above the respective balls 405, the elevating member 406 is lowered as shown in FIG. 24. With the catching protrusions 423 of the elevating member 406 respectively moving under the stopper protrusions 426 of the stopper member 408, the elevating member 406 is stopped. As a result, the holding member 403 moves downward due to the constant force applied by the spring 404, and the pushing portions 415 of the holding member 403 push the slanted portions 413 of the claw devices 402, thereby pushing the claw devices 402 outward with the supporting shafts 411 serving as the respective fulcrums so that the claws 412 of the three claw devices 402 protrude outward from the outer cylindrical surface of the boss 282 and abut against the edge of the center hole of the CD. Thus, the CD is chucked.

When the receiving plate 274 rotates the chucking lever 407 counterclockwise as viewed in FIG. 27 to the position represented by two-dot chain lines in FIG. 27, the elevating member 406 is rotated clockwise as viewed in FIG. 27 so that the raised portions 421 of the elevating member 406 come immediately above the respective balls 405 and that the elevating member 406 is raised as shown in FIG. 25. At that time, as a result of the rotation of the elevating member 406, each catching protrusion 423 of the elevating member 406 becomes detached from the underside of the corresponding stopper protrusion 426 of the stopper member 408, thereby releasing the elevating member 406 from the stopper member 408. As a result, the elevating member 406 moving upward overcomes the constant force of the spring 404 and pushes the holding member 403 upward at the leg portions 416 so that the slanted portions 413 of the claw devices 402 are released from the pushing force of the pushing portions 415 of the holding member 403. Therefore, the claws 412 of the three claw devices 402 are permitted to retreat into the boss 282 and release the CD from the chucked state so that the CD may be fitted around or removed from the boss 282.

According to the embodiments described above, the CD changer comprises a single-tray disk insertion/removal opening 315 and a common disk insertion/removal opening 316, which are arranged one above the other in correspondence to the direction along which the trays 11 are stacked. However, the CD changer may be provided only with a common disk insertion/removal opening 316, or a plurality of disk insertion/removal openings 316 may be arranged one above another in correspondence to the direction along which the trays 11 are stacked.

Disks applicable to the invention include those for playback only, recording only and read/write disks. Examples of such disks include, but not limited to, compact disks, video disks, magneto-optic disks and flexible magnetic disks.

The driving apparatus may be adapted to playback only, recording only or to perform both playing and recording. The head unit, too, may be adapted to playback only, recording only or to perform both playing and recording.

The term "driving" refers to recording information onto a disk or reading information that is recorded on a disk. It also refers to rotating a disk.

A disk driving apparatus according to one embodiment has the function of a disk changer and employs a slot-in method which calls for inserting or removing a disk into or from the apparatus through a disk insertion/removal opening, wherein the apparatus includes a disk insertion/removal opening to be shared by a plurality of trays so that a disk can be inserted into or removed from a desired tray through said common disk insertion/removal opening. As the common disk insertion/removal opening is shared by a plurality of trays, the dimensions of the apparatus can be reduce. As a disk can be inserted or removed at the same position, the apparatus is more convenient to operate.

A disk driving apparatus according to another embodiment is a disk driving apparatus having the function of a disk changer and employing a slot-in method which calls for inserting or removing a disk into or from the apparatus through a disk insertion/removal opening, wherein the apparatus includes a common disk insertion/removal opening shared by a plurality of trays so that a disk can be inserted into or removed from a desired tray through said common disk insertion/removal opening. As the common disk insertion/removal opening is shared by a plurality of trays, the dimensions of the apparatus can be reduce. As a disk can be inserted or removed at the same position, the apparatus is more convenient to operate. As the apparatus also has a single-tray disk insertion/removal opening dedicated to one of the trays, the apparatus is capable of handling a single disk easily. In other words, the invention offers a disk driving apparatus that is more convenient to operate by providing a common disk insertion/removal opening and a single-tray disk insertion/removal opening which are arranged along the height of the trays 11.

While having the same effects as those of a disk driving apparatus described in the preceding paragraph, a disk driving apparatus according to another embodiment has such an effect that a single loading motor is capable of operating the loading mechanisms and, through the selective transmission mechanism, operating either one of the ejecting arms, i.e. the single-tray ejecting arm or the common ejecting arm.

While having the same effects as those of a disk driving apparatus described in the preceding paragraph, a disk driving apparatus according to another embodiment has such an effect that a single loading motor is capable of opening or closing either one of the shutters, i.e. the single-tray shutter or the common shutter, through the selective transmission mechanism.

A disk driving apparatus according to a still further embodiment calls for carrying a disk in such a state that the disk is supported between the rollers and the holding members, which are elastically biased towards the rollers. Therefore, the thickness of each holding member can be set thinner than the minimum diameter of each roller. As a result, while having the same effects as those of a disk driving apparatus as described in any one of the previously described embodiments, this embodiment is capable of providing a disk driving apparatus which is thinner than a conventional apparatus that calls for supporting a disk by sandwiching it only between a pair of rollers.

The two rollers that constitute each pair of rollers are spaced apart, respectively to the two lateral sides of the apparatus, and arranged along an imaginary line extending perpendicular to the direction in which a disk is carried by the corresponding loading mechanism, while the holding members that constitute each pair of holding members, too, are spaced apart, respectively to the two lateral sides of the apparatus, and arranged along an imaginary line extending perpendicular to the loading direction. Therefore, when a disk supported at the home position on a tray is brought close to the position where the outer edge of the disk is located between the laterally arranged rollers of the corresponding loading mechanism and also between the laterally arranged holding members of the corresponding loading mechanism, the disk may be detached from the rollers and the holding members so that the disk may be rotated. Therefore, compared with a configuration which calls for installing rollers and holding members at the center in addition to the rollers and the holding members disposed at both sides and, therefore, disposing each roller and each holding member at a sufficient distance from the edge of the disk, this embodiment is capable of reducing the dimension along which a disk is carried, while having the same effects as those of a disk driving apparatus described in the preceding paragraph.

While having the same effects as those of a disk driving apparatus as described in any one of the previously described embodiments, a disk driving apparatus according to another embodiment has such a benefit that a disk carried by a loading mechanism to a tray can be moved to the home position on the target tray and held there by the holding means.

While having the same effects as those of a disk driving apparatus as described in any one of the previously described embodiments, a disk driving apparatus according to a still further embodiment has such a benefit that the carrier mechanism is capable of moving a tray to the position intended for loading of a disk and the position intended for driving the disk.

According to another embodiment, chucking a disk and releasing a disk from the chucked state can be conducted from the outside of the turn table by means of a chucking device attached to the turn table. Therefore, there is no need of a separate mechanism for holding a disk between the turn table and the holding mechanism, thereby providing has a simplified structure and reduced dimensions.

What is claimed is:

1. A disk driving apparatus including:
   a plurality of vertically arranged trays, each of which permits a disk to be set directly thereon and removed therefrom and is capable of moving up and down;
   a single-tray disk insertion/removal opening dedicated to one of said trays which is located at either one of the two vertical ends of the combination of the trays;
   a common disk insertion/removal opening to be shared by all the other trays than said tray that is located at either one of the two vertical ends of the combination of the trays;
   a carrier mechanism for moving a desired tray to a loading position corresponding to said common disk insertion/removal opening;
   a single-tray loading mechanism for carrying the disk back and forth between said single-tray disk insertion/removal opening and the tray corresponding to the single-tray loading mechanism; and
   a common loading mechanism for carrying the disk back and forth between the common disk insertion/removal opening and the tray located at said loading position.

2. A disk driving apparatus as claimed in claim 1, wherein the disk driving apparatus is also provided with:
   a single loading motor;
   a loading transmission mechanism for transmitting a driving force from said loading motor to the loading mechanisms, thereby permitting the loading mechanisms to perform conveying action;
   a single-tray ejecting means and a common ejecting means, each of which is adapted to deliver and receive the disk to and from the corresponding loading mechanism, said disk set on a tray corresponding to the ejecting arm in question; and
   a selective transmission mechanism adapted to selectively transmit the driving force from said loading motor to either the single-tray ejecting means or the common ejecting means, thereby permitting the ejecting means to perform ejecting action.

3. A disk driving apparatus as claimed in claim 2, further comprising:
   a single-tray shutter and a common shutter, each of which is adapted to close the corresponding disk insertion/removal opening and be opened when a disk is inserted or removed therethrough; and
   the selective transmission mechanism is adapted to selectively transmit the driving force from said loading motor to either the single-tray shutter or the common shutter, thereby closing or opening the shutter to which the force is transmitted.

4. A disk driving apparatus as claimed in claim 1, wherein each loading mechanism is provided with:
   rollers adapted to be rotated;
   holding members adapted to hold the disk in such a manner that the disk is sandwiched between the holding members and the rollers; and
   flexible supporting means for elastically supporting the holding members such that the distance between each roller and the corresponding holding member does not exceed the thickness of the disk.

5. A disk driving apparatus as claimed in claim 2, wherein each loading mechanism is provided with:
   rollers adapted to be rotated;
   holding members adapted to hold the disk in such a manner that the disk is sandwiched between the holding members and the rollers; and
   flexible supporting means for elastically supporting the holding members such that the distance between each roller and the corresponding holding member does not exceed the thickness of the disk.

6. A disk driving apparatus as claimed in claim 3, wherein each loading mechanism is provided with:
   rollers adapted to be rotated;
   holding members adapted to hold the disk in such a manner that the disk is sandwiched between the holding members and the rollers; and
   flexible supporting means for elastically supporting the holding members such that the distance between each roller and the corresponding holding member does not exceed the thickness of the disk.

7. A disk driving apparatus as claimed in claim 4, wherein each pair of rollers are spaced apart, respectively to two lateral sides of the apparatus, and arranged along an imaginary line extending perpendicular to the direction in which the disk is carried by the corresponding loading mechanism, and the holding members that comprise each pair of holding members, too, are spaced apart and arranged along an imaginary line extending perpendicular to the loading direction.

8. A disk driving apparatus as claimed in claim 5, wherein each pair of rollers are spaced apart, respectively to two lateral sides of the apparatus, and arranged along an imaginary line extending perpendicular to the direction in which the disk is carried by the corresponding loading mechanism, and the holding members that comprise each pair of holding members, too, are spaced apart and arranged along an imaginary line extending perpendicular to the loading direction.

9. A disk driving apparatus as claimed in claim 6, wherein each pair of rollers are spaced apart, respectively to two lateral sides of the apparatus, and arranged along an imaginary line extending perpendicular to the direction in which the disk is carried by the corresponding loading mechanism, and the holding members that comprise each pair of holding members, too, are spaced apart and arranged along an imaginary line extending perpendicular to the loading direction.

10. A disk driving apparatus as claimed in claim 1, further comprising:
    a holding means for applying constant force to the disk carried by the loading mechanism to each of said trays so that the disk is directed to the home position on the trays and held there.

11. A disk driving apparatus as claimed in claim 2, further comprising:
    a holding means for applying constant force to the disk carried by the loading mechanism to each of said trays so that the disk is directed to the home position on the trays and held there.

12. A disk driving apparatus as claimed in claim 3, further comprising:
    a holding means for applying constant force to the disk carried by the loading mechanism to each of said trays so that the disk is directed to the home position on the trays and held there.

13. A disk driving apparatus as claimed in claim 4, further comprising:

a holding means for applying constant force to the disk carried by the loading mechanism to each of said trays so that the disk is directed to the home position on the trays and held there.

14. A disk driving apparatus as claimed in claim 5, further comprising:
a holding means for applying constant force to the disk carried by the loading mechanism to each of said trays so that the disk is directed to the home position on the trays and held there.

15. A disk driving apparatus as claimed in claim 6, further comprising:
a holding means for applying constant force to the disk carried by the loading mechanism to each of said trays so that the disk is directed to the home position on the trays and held there.

16. A disk driving apparatus as claimed in claim 7, further comprising:
a holding means for applying constant force to the disk carried by the loading mechanism to each of said trays so that the disk is directed to the home position on the trays and held there.

17. A disk driving apparatus as claimed in claim 8, further comprising:
a holding means for applying constant force to the disk carried by the loading mechanism to each of said trays so that the disk is directed to the home position on the trays and held there.

18. A disk driving apparatus as claimed in claim 9, further comprising:
a holding means for applying constant force to the disk carried by the loading mechanism to each of said trays so that the disk is directed to the home position on the trays and held there.

19. A disks driving apparatus as claimed in any one of the claims from claims 1–3, 4–6, 7–9, 10–12, 13–15 and 16–18), further comprising:
a driving arm for driving the disk; and
a selector mechanism adapted to select a targeted tray for driving the disk from among the plurality of trays and move the driving arm to a selection position corresponding to the selected targeted tray,
wherein the carrier mechanism is adapted to move the trays, thereby forming a driving space which is located either immediately above or below the targeted tray selected by the selector mechanism and into which the driving arm may be inserted.

20. A disk driving apparatus including:
a plurality of vertically arranged trays, each of which permits a disk to be set thereon and removed therefrom and is capable of moving up and down;
a disk insertion/removal opening shared by said plurality of trays and adapted to permit the disk to be inserted or removed therethrough;
a carrier mechanism for moving a desired tray to a loading position corresponding to said disk insertion/removal opening; and
a loading mechanism for carrying the disk back and forth between said disk insertion/removal opening and the tray located at said loading position,
wherein the loading mechanism has rollers adapted to be rotated, holding members adapted to hold the disk in such a manner that the disk is sandwiched between the holding members and the rollers, and flexible supporting means for elastically supporting the holding members such that the distance between each roller and the corresponding holding member does not exceed the thickness of the disk.

21. A disk driving apparatus according to claim 20, wherein each pair of rollers are spaced apart, respectively to two lateral sides of the apparatus, and arranged along an imaginary line extending perpendicular to a direction in which the disk is carried by the loading mechanism, and each pair of holding members are spaced apart and arranged along an imaginary line extending perpendicular to the loading direction.

22. A disk driving apparatus according to claim 20, further comprising:
holding means for applying constant force to the disk carried by the loading mechanism to each of the trays so that the disk is directed to a home position on the tray and held there.

23. A disk driving apparatus according to claim 21, further comprising:
holding means for applying constant force to the disk carried by the loading mechanism to each of the trays so that the disk is directed to a home position on the tray and held there.

24. A disk driving apparatus including:
a plurality of vertically arranged trays, each of which permits a disk to be set thereon and removed therefrom and is capable of moving up and down;
a single-tray disk insertion/removal opening dedicated to one of said trays which is located at either one of the two vertical ends of the combination of the trays;
a common disk insertion/removal opening to be shared by all the other trays than said tray that is located at either one of the two vertical ends of the combination of the trays;
a carrier mechanism for moving a desired tray to a loading position corresponding to said common disk insertion/removal opening;
a single-tray loading mechanism for carrying a disk back and forth between said single-tray disk insertion/removal opening and the tray corresponding to the single-tray loading mechanism;
a common loading mechanism for carrying the disk back and forth between the common disk insertion/removal opening and the tray located at said loading position;
a single loading motor;
a loading transmission mechanism for transmitting a driving force from said loading motor to the loading mechanisms, thereby permitting the loading mechanisms to perform conveying action;
a single-tray ejecting means and a common ejecting means, each of which is adapted to deliver and receive the disk to and from the corresponding loading mechanism, said disk set on a tray corresponding to the ejecting arm in question; and
a selective transmission mechanism adapted to selectively transmit the driving force from said loading motor to either the single-tray ejecting means or the common ejecting means, thereby permitting the ejecting means to perform ejecting action.

25. A disk driving apparatus according to claim 24, further comprising:
a single-tray shutter and a common shutter, each of which is adapted to close the corresponding disk insertion/removal opening and be opened when the disk is inserted or removed therethrough, and the selective transmission mechanism is adapted to selectively transmit the driving force from said loading motor to either the single-tray shutter or the common shutter, thereby closing or opening the shutter to which the force is transmitted.

26. A disk driving apparatus according to claim 24, wherein each loading mechanism is provided with:

rollers adapted to be rotated;

holding members adapted to hold the disk in such a manner that the disk is sandwiched between the holding members and the rollers; and flexible supporting means for elastically supporting the holding members such that the distance between each roller and the corresponding holding member does not exceed the thickness of the disk.

27. A disk driving apparatus according to claim 25, wherein each loading mechanism is provided with:

rollers adapted to be rotated;

holding members adapted to hold the disk in such a manner that the disk is sandwiched between the holding members and the rollers; and flexible supporting means for elastically supporting the holding members such that the distance between each roller and the corresponding holding member does not exceed the thickness of the disk.

28. A disk driving apparatus according to claim 26, wherein each pair of rollers are spaced apart, respectively to two lateral sides of the apparatus, and arranged along an imaginary line extending perpendicular to the direction in which the disk is carried by the corresponding loading mechanism, and each pair of holding members are spaced apart and arranged along an imaginary line extending perpendicular to the loading direction.

29. A disk driving apparatus according to claim 27, wherein each pair of rollers are spaced apart, respectively to two lateral sides of the apparatus, and arranged along an imaginary line extending perpendicular to the direction in which the disk is carried by the corresponding loading mechanism, and each pair of holding members are spaced apart and arranged along an imaginary line extending perpendicular to the loading direction.

30. A disk driving apparatus according to claim 24, further comprising:

holding means for applying constant force to the disk carried by the loading mechanism to each of the trays so that the disk is directed to a home position on the tray and held there.

31. A disk driving apparatus according to claim 25, further comprising:

holding means for applying constant force to the disk carried by the loading mechanism to each of the trays so that the disk is directed to a home position on the tray and held there.

32. A disk driving apparatus according to claim 26, further comprising:

holding means for applying constant force to the disk carried by the loading mechanism to each of the trays so that the disk is directed to a home position on the tray and held there.

33. A disk driving apparatus according to claim 27, further comprising:

holding means for applying constant force to the disk carried by the loading mechanism to each of the trays so that the disk is directed to a home position on the tray and held there.

34. A disk driving apparatus according to claim 28, further comprising:

holding means for applying constant force to the disk carried by the loading mechanism to each of the trays so that the disk is directed to a home position on the tray and held there.

35. A disk driving apparatus according to claim 29, further comprising:

holding means for applying constant force to the disk carried by the loading mechanism to each of the tray so that the disk is directed to a home position on the tray and held there.

36. A disk driving apparatus as in any one of claims 20–35, further comprising:

a driving arm for driving the disk; and a selector mechanism adapted to select a targeted tray for driving the disk from among the plurality of trays and move the driving arm to a selection position corresponding to the selected tray, wherein the carrier mechanism is adapted to move the trays, thereby forming a driving space which is located either immediately above or below the targeted tray selected by the selector mechanism and into which the driving arm may be inserted.

* * * * *

UNITED STATES PATENT AND TRADEMARK OFFICE
CERTIFICATE OF CORRECTION

PATENT NO. : 6,226,253 B1
DATED : May 1, 2001
INVENTOR(S) : Hisashi Ogawa

It is certified that error appears in the above-identified patent and that said Letters Patent is hereby corrected as shown below:

<u>Title page,</u>
Item 75 Inventors, replace "Musashino" with -- Tokyo --.

Signed and Sealed this

Eighteenth Day of September, 2001

Attest:

*Nicholas P. Godici*

NICHOLAS P. GODICI
*Attesting Officer*   *Acting Director of the United States Patent and Trademark Office*